(12) United States Patent
Kajita

(10) Patent No.: US 7,099,390 B2
(45) Date of Patent: Aug. 29, 2006

(54) PREDICTION APPARATUS, ENCODING APPARATUS, INVERSE PREDICTION APPARATUS, DECODING APPARATUS, AND COMPUTING APPARATUS

(75) Inventor: Satoshi Kajita, Yukuhashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 801 days.

(21) Appl. No.: 10/329,618

(22) Filed: Dec. 27, 2002

(65) Prior Publication Data

US 2003/0123548 A1    Jul. 3, 2003

(30) Foreign Application Priority Data

Dec. 27, 2001    (JP)    ............... 2001-396180

(51) Int. Cl.
*H04N 7/12*    (2006.01)
(52) U.S. Cl. .................. 375/240.12; 382/238
(58) Field of Classification Search ........... 375/240.12, 375/240.11, 240.15, 240.17; 382/238; 348/699, 348/394.1
See application file for complete search history.

(56) References Cited

U.S. PATENT DOCUMENTS

| | | | | | |
|---|---|---|---|---|---|
| 5,581,308 | A | * | 12/1996 | Lee ........................... | 348/699 |
| 5,719,630 | A | * | 2/1998 | Senda .................... | 375/240.17 |
| 5,737,022 | A | * | 4/1998 | Yamaguchi et al. ... | 375/240.15 |
| 5,751,859 | A | * | 5/1998 | Howard ...................... | 382/238 |
| 5,923,783 | A | | 7/1999 | Kawauchi et al. | |
| 6,108,039 | A | * | 8/2000 | Linzer et al. .......... | 375/240.11 |

OTHER PUBLICATIONS

Bjontegaard G (Editor): H.26L Test Model Long Term No. 8 (TML-8) Drafto ITU Study Group 16-Video Coding Experts Group, vol. VCEG-M81, Apr. 2, 2001, pp. 1-2, 16, XP 002250455.
Tu-Chih Wang et al: "H.26L intra mode encoder architecture for digital camera application" International Conference on Consumer Electronics. 2001 Digest of Technical Papers. ICCE. Los Angeles, CA, Jun. 19-21, 2001, New York, NY: IEEE, US, Jun. 19, 2001, pp. 132-133, XP 010552100.

* cited by examiner

*Primary Examiner*—Gims Philippe
(74) *Attorney, Agent, or Firm*—Wenderoth, Lind & Ponack, L.L.P.

(57) ABSTRACT

A candidate prediction block storage unit stores candidate prediction pixel data {"a" to "p"} (a four-by-four area) and neighboring pixel data {"A" to "D"}. A neighboring pixel series-generating unit in receipt of the neighboring pixel data {"A" to "D"} from the candidate prediction block storage unit feeds a first neighboring pixel series {"A", "B", "C", and so on} and a second neighboring pixel series {"B", "C", "D", and so on} into first and second lines, respectively. A predictive processing unit in receipt of the candidate prediction pixel data {"a" to "p"} from the candidate prediction block storage unit multiplies the candidate prediction pixel data by two, thereby providing multiplied data. The predictive processing unit subtracts the first neighboring pixel series from the multiplied data, thereby providing subtracted data. The predictive processing unit subtracts the second neighboring pixel series from the subtracted data, thereby providing further subtracted data. The predictive processing unit divides the further subtracted data by two, thereby providing divided data. A predicted block storage unit stores the divided data as predicted pixel data {"a#", "b#", and so on}. As a result, steps of storing and generating predictive pixels are eliminated.

17 Claims, 26 Drawing Sheets

D$ = (B+2C+D) // 4
C$ = (A+2B+C) // 4
B$ = (I+2A+B) // 4
A$ = (E+2I+A) // 4
E$ = (F+2E+I) // 4
F$ = (G+2F+E) // 4
G$ = (H+2G+F) // 4

$A\flat = (A+B)/2$
$B\flat = (B+C)/2$
$C\flat = (C+D)/2$

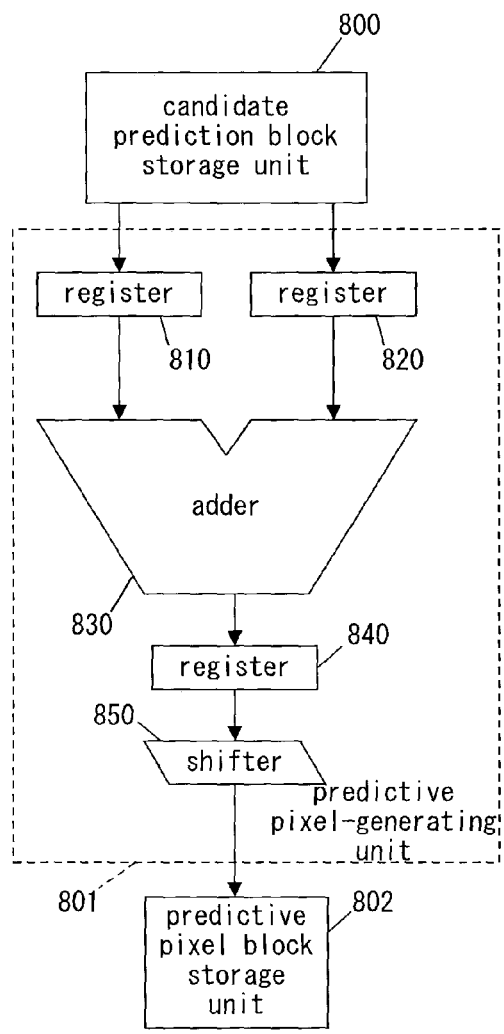
Fig. 28 (a) PRIOR ART
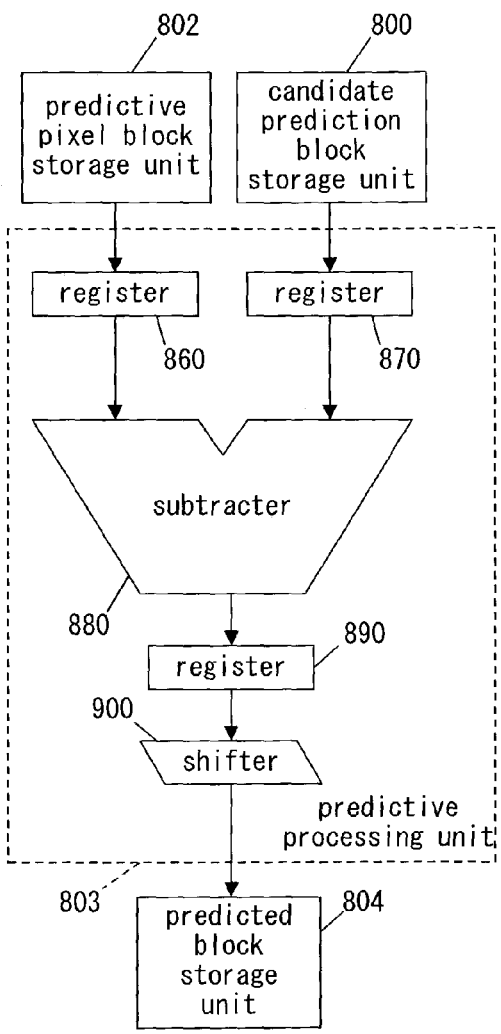
Fig. 28 (b) PRIOR ART

PREDICTION APPARATUS, ENCODING APPARATUS, INVERSE PREDICTION APPARATUS, DECODING APPARATUS, AND COMPUTING APPARATUS

BACKGROUND OF THE INVENTION

1. Field of the Invention

The present invention relates to a prediction apparatus for practicing predictive processing of image data to provide encoded image data, an inverse prediction apparatus for practicing inverse predictive processing of the encoded image data to provide decoded image data, and an art related thereto.

2. Description of the Related Art

In the International Telecommunications Union (ITU), an H.26L-coding system has been negotiated for standardization as a next-generation moving picture-encoding system.

In order to provide an enhanced encoding efficiency, the H.26L-coding system includes steps of dividing a frame into small block areas, practicing predictive processing of a candidate prediction block for each block using neighboring pixels around the block, and conducting the entropy encoding of residual information.

A prior art prediction apparatus for providing the predictive processing according to the H.26L-coding system is described with reference to the drawings.

Initially, a prior art prediction apparatus for practicing A-mode predictive processing according to the H.26L-coding system is described with reference to the drawings.

FIG. 27 is a block diagram, illustrating the prior art prediction apparatus. As illustrated in FIG. 27, the prior art prediction apparatus includes a candidate prediction block storage unit 800, a predictive pixel-generating unit 801, a predictive pixel block storage unit 802, a predictive processing wait 803, and a predicted block storage unit 804.

The candidate prediction block storage unit 800 stores a candidate prediction block "B1" and nine pieces of neighboring pixel data {"A" to "I"} adjacent to the candidate prediction block "B1". The candidate prediction block "B1" consists of sixteen pieces of candidate prediction pixel data {"a" to "p"}.

The predictive pixel-generating unit 801 generates sixteen pieces of predictive pixel data {A♭, B♭, C♭ . . . D, D, D} using the neighboring pixel data "A", "B", "C" and "D". The neighboring pixel data "A", "B", "C" and "D" are fed into the predictive pixel-generating unit 801 from the candidate prediction block storage unit 800.

The predictive pixel block storage unit 802 stores a predictive pixel block "B2" that consists of the sixteen pieces of predictive pixel data from the predictive pixel-generating unit 801.

The predictive processing unit 803 receives the sixteen pieces of candidate prediction pixel data {"a" to "p"}56 in sequence from the candidate prediction block storage unit 800. The predictive processing unit 803 also receives the sixteen pieces of predictive pixel data {"A♭" to "D"} in sequence from the predictive pixel block storage unit 802. The predictive processing unit 803 subtracts the predictive pixel data from the candidate prediction pixel data, thereby producing sixteen pieces of predicted pixel data {a–A♭, b–B♭, c–C♭, . . . , n–D, o–D, and p–D}.

The predicted block storage unit 804 stores a predicted block "B3" that consists of the sixteen pieces of predicted pixel data {"a–A" to "p–D"} from the predictive processing unit 803.

The predictive pixel data can be expressed by the following expressions: A♭=(A+B)/2; B♭=(B+C)/2; and C♭=(C+D)/2.

The following discusses in details how the prior art prediction apparatus as discussed above practices the A-mode predictive processing.

FIG. 28 is a detailed block diagram, illustrating the predictive pixel-generating unit 801 of FIG. 27 and the predictive processing unit 803 of FIG. 27. In FIG. 28, the same components as those of FIG. 27 are identified by the same reference numerals, and therefore descriptions related thereto are omitted.

FIG. 28(a) is a detailed block diagram, illustrating the predictive pixel-generating unit 801 of FIG. 27. FIG. 28(b) is a detailed block diagram, illustrating the predictive processing unit 803 of FIG. 27.

As illustrated in FIG. 28(a), the predictive pixel-generating unit 801 includes registers 810, 820, 840, an adder 830, and a shifter 850.

As illustrated in FIG. 28(b), the predictive processing unit 803 includes registers 860, 870, 890, a subtracter 880, and a shifter 900.

The predictive processing is now described in detail by taking the candidate prediction pixel data "a" of FIG. 27 as an example.

As illustrated in FIG. 28(a), the candidate prediction block storage unit 800 reads out the neighboring pixel data "A", "B", "C", and "D" into the registers 810, 820.

The adder 830 adds the neighboring pixel data "A" and "B" together. The neighboring pixel data "A" and "B" are entered through the registers 810 and 820, respectively. As a result, added data "A+B" is provided.

The register 840 receives the added data "A+B" from the adder 830. The shifter 850 in receipt of the added data "A+B" from the register 840 divides the added data "A+B" by two, thereby producing predictive pixel data "A♭".

The predictive pixel block storage unit 802 stores the predictive pixel data "A♭" from the shifter 850. Similarly, other predictive pixel data "B♭", "C♭" are generated. As a result, the predictive pixel block storage unit 802 stores the sixteen pieces of predictive pixel data.

Turning now to FIG. 28(b), the register 860 receives the predictive pixel data "A♭" from the predictive pixel block storage unit 802.

The register 870 receives the candidate prediction pixel data "a" from the candidate prediction block storage unit 800.

The subtracter 880 subtracts the predictive pixel data "A♭" from the candidate prediction pixel data "a". The predictive pixel data "A♭" and the candidate prediction pixel data "a" come from the registers 860 and 870, respectively. As a result, predicted pixel data "a–A♭" is provided.

The predicted block storage unit 804 stores the predicted pixel data "a–A♭" after the predicted pixel data "a–A♭" is passed through the register 890 and the shifter 900.

In this way, the predictive processing unit 803 produces the remaining predicted pixel data "b–B♭" to "p–D" in sequence.

The following describes how many operation steps are required for the A-mode predictive processing using the prior art prediction apparatus.

The readout of the neighboring pixel data "A", "B", "C", and "D" involves fours steps. Three steps for addition and three steps for division are required to produce the predictive pixel data "A♭", "B♭", and "C♭" using the predictive pixel-generating unit 801.

Sixteen steps are required to store the sixteen pieces of predictive pixel data using the predictive pixel block storage unit 802. Eighteen steps are required to practice the predictive processing using the predictive processing unit 803.

As a result, the A-mode predictive processing using the prior art prediction apparatus involves a total of forty-four operation steps.

The subtracter 880 in the predictive processing unit 803 supports vector instructions. In this case, the number of operation steps is two plus the number of pixels to be processed.

A prior art prediction apparatus for practicing B-mode predictive processing according to the H.26L-coding system is briefly described.

The predictive pixel-generating unit 801 of FIG. 27 is replaced by another predictive pixel-generating unit that includes a multiplier, two adders, and a divider. This replacement realizes the B-mode predictive processing.

More specifically, in B-mode, the predictive pixel-generating unit constructed as described above generates sixteen pieces of predictive pixel data $\{\alpha, \beta, \gamma, \delta, \epsilon, \alpha, \beta, \gamma, \zeta, \epsilon, \alpha, \beta, \eta, \zeta, \epsilon,$ and $\alpha\}$ using nine pieces of neighboring pixel data $\{$"A" to "I"$\}$.

The predictive processing unit 803 generates sixteen pieces of predicted pixel data $\{$a-$\alpha$, b-$\beta$, c-$\gamma$, d-$\delta$, e-$\epsilon$, f-$\alpha$, g-$\beta$, h-$\gamma$, i-$\zeta$, j-$\epsilon$, k-$\alpha$, l-$\beta$, m-$\eta$, n-$\zeta$, o-$\epsilon$, and p-$\alpha\}$.

The predictive pixel data can be expressed as follows: $\alpha = (E+2I+A)//4$; $\beta = (I+2A+B)//4$; $\gamma = (A+2B+C)//4$; $\delta = (B+2C+D)//4$; $\epsilon = (F+2E+I)//4$; $\zeta = (G+2F+E)//4$; and $\eta = (H+2G+F)//4$. The symbol "//" denotes round-off after division.

The following discusses how many operation steps are required for the B-mode predictive processing using the prior art prediction apparatus.

The readout of the nine pieces of neighboring pixel data $\{$"A" to "I"$\}$ involves nine steps. Fourteen steps for addition and seven steps for multiplication are required to produce the predictive pixel data "$\alpha$", "$\beta$", "$\gamma$", "$\delta$", "$\epsilon$", "$\zeta$", and "$\eta$" using the predictive pixel-generating unit.

Sixteen steps are required to store the sixteen pieces of predictive pixel data using the predictive pixel block storage unit 802. Eighteen steps are required to practice the predictive processing using the predictive processing unit 803.

As a result, the B-mode predictive processing using the prior art prediction apparatus involves a total of seventy-one operation steps.

OBJECTS AND SUMMARY OF THE INVENTION

The A-mode predictive processing using the prior art prediction apparatus as described above requires the number of operation steps nearly three times as many as the number of candidate prediction pixels or rather the sixteen pieces of candidate prediction pixels. Similarly, A-mode inverse predictive processing requires the number of operation steps nearly three times as many as the number of inverse candidate prediction pixels.

The B-mode predictive processing using the prior art prediction apparatus requires the number of operation steps nearly four times as many as the number of candidate prediction pixels. Similarly, B-mode inverse predictive processing requires the number of operation steps nearly four times as many as the number of inverse candidate prediction pixels.

Accordingly, the prior art prediction and inverse prediction apparatuses involve a problem of many operation steps in both of the A- and B-modes, with a consequential reduction in processing performance.

In view of the above, an object of the present invention is to provide prediction and inverse prediction apparatuses that require fewer operation steps and that provide a high level of processing performance, and an art related thereto.

A first aspect of the present invention provides a prediction apparatus comprising a plurality of candidate prediction pixel data, a plurality of neighboring pixel data adjacent to a candidate prediction block that consists of the plurality of candidate prediction pixel data, in which the prediction apparatus performs predictive processing based on the plurality of candidate prediction pixel data and the plurality of neighboring pixel data in accordance with a predetermined algebraic expression, a neighboring pixel series-generating unit for, upon receipt of the plurality of neighboring pixel data, selecting the data from the plurality of neighboring pixel data in the order in which the plurality of neighboring pixel data is arithmetically operated to experience the predictive processing, such a data selection being made for each series that corresponds to an algebra included in the predetermined algebraic expression, the neighboring pixel series-generating unit for outputting the selected data for each of the series in the order in which the plurality of neighboring pixel data is arithmetically operated to experience the predictive processing, and a predictive processing unit for practicing the predictive processing based on the plurality of candidate prediction pixel data received by the predictive processing unit in the order in which the plurality of candidate prediction pixel data is arithmetically operated to experience the predictive processing, and the selected data received by the predictive processing unit from the neighboring pixel series-generating unit for each of the series in the order in which the plurality of neighboring pixel data is arithmetically operated to experience the predictive processing.

This structure allows the data selected from the plurality of neighboring pixel data in the order in which the plurality of neighboring pixel data is arithmetically operated for the predictive processing to be entered into the predictive processing unit in the order in which the plurality of neighboring pixel data is arithmetically operated for the predictive processing.

This feature eliminates steps of storing and generating predictive pixel data, and consequently provides the prediction apparatus that requires fewer operation steps and that provides a high level of processing performance.

A second aspect of the present invention provides a prediction apparatus as defined in the first aspect of the present invention, wherein the neighboring pixel series-generating unit includes a neighboring pixel storage unit and a neighboring pixel-selecting unit, in which the neighboring pixel storage unit stores the plurality of neighboring pixel data upon receipt of the plurality of neighboring pixel data, and the neighboring pixel-selecting unit selects the data from the plurality of neighboring pixel data that are parallel-fed from the neighboring pixel storage unit, such a data selection being made for each of the series in the order in which the plurality of neighboring pixel data is arithmetically operated to experience the predictive processing, the neighboring pixel-selecting unit feeding the selected data into each series-related line in the order in which the plurality of neighboring pixel data is arithmetically operated to experience the predictive processing, and wherein the predictive processing unit receives the selected data from the neighboring pixel-selecting unit through each of the series-related lines.

This structure allows the data selected by the neighboring pixel-selecting unit from the plurality of neighboring pixel data in the order in which the plurality of neighboring pixel data is arithmetically operated for the predictive processing to be entered into the predictive processing unit for each of the series in the order in which the plurality of neighboring pixel data is arithmetically operated for the predictive processing.

This feature eliminates steps of storing and generating predictive pixel data, and consequently provides the prediction apparatus that requires fewer operation steps and that provides a high level of processing performance.

A third aspect of the present invention provides a prediction apparatus as defined in the first aspect of the present invention, wherein the neighboring pixel series-generating unit includes a neighboring pixel-selecting unit for feeding each of the neighboring pixel data into a neighboring pixel data-related line, and a neighboring pixel series storage unit disposed for each of the series, in which each of the neighboring pixel series storage units in receipt of the plurality of neighboring pixel data through the neighboring pixel data-related lines stores the plurality of neighboring pixel data as corresponding series-related data at predetermined storage positions, the neighboring pixel data-related lines being wired to the predetermined storage positions in the order in which the plurality of neighboring pixel data is arithmetically operated to experience the predictive processing, and each of the neighboring pixel series storage units feeds the stored plurality of neighboring pixel data into a corresponding series-related line in the order in which the plurality of neighboring pixel data is arithmetically operated to experience the predictive processing, and wherein the predictive processing unit receives the stored plurality of neighboring pixel data from the neighboring pixel series storage units through the series-related lines.

This structure allows the data selected from the plurality of neighboring pixel data in the order in which the plurality of neighboring pixel data is arithmetically operated for the predictive processing to be entered into the predictive processing unit from the neighboring pixel series storage unit for each of the series in the order in which the plurality of neighboring pixel data is arithmetically operated for the predictive processing.

This feature eliminates steps of storing and generating predictive pixel data, and consequently provides the prediction apparatus that requires fewer operation steps and that provides a high level of processing performance.

A fourth aspect of the present invention provides a prediction apparatus as defined in the first aspect of the present invention, wherein the series includes first and second series, and wherein the predictive processing unit includes a multiplying unit, first and second subtracting units, and a dividing unit, in which the multiplying unit in receipt of the candidate prediction pixel data multiplies the candidate prediction pixel data by a predetermined multiplier, thereby providing multiplied data that is then sent to the first subtracting unit, the first subtracting unit subtracts first series-related neighboring pixel data from the multiplied data, thereby providing first subtracted data that is then sent to the second subtracting unit, the second subtracting unit subtracts second series-related neighboring pixel data from the first subtracted data, thereby providing second subtracted data that is then sent to the dividing unit, and the dividing unit divides the second subtracted data by a predetermined divisor, the first and second series-related neighboring pixel data being the neighboring pixel data that are related to the first and second series, respectively, and that are entered from the neighboring pixel series-generating unit into the predictive processing unit.

This structure makes it feasible to realize high-speed processing that is assumed as A-mode predictive processing according to H.26L-coding system.

A fifth aspect of the present invention provides a prediction apparatus as defined in the first aspect of the present invention, wherein the series includes first and second series, and wherein the predictive processing unit includes a multiplying unit, a subtracting unit, and a dividing unit, in which the multiplying unit in receipt of the candidate prediction pixel data multiplies the candidate prediction pixel data by a predetermined multiplier, thereby providing multiplied data that is then sent to the subtracting unit, the subtracting unit subtracts first series-related neighboring pixel data from the multiplied data, thereby providing subtracted data, the subtracting unit subtracts second series-related neighboring pixel data from the subtracted data, thereby providing ultimately subtracted data that is then sent to the dividing unit, and the dividing unit divides the ultimately subtracted data by a predetermined divisor, the first and second series-related neighboring pixel data being the neighboring pixel data that are related to the first and second series, respectively, and that are entered from the neighboring pixel series-generating unit into the predictive processing unit.

This structure makes it feasible to realize high-speed processing that is assumed as A-mode predictive processing according to H.26L-coding system.

The above structure practices the predictive processing using the single triple-input subtracting unit, and consequently eliminates one register, when compared with the use of the two double-input subtracting units in order to practice the same predictive processing.

This feature provides the prediction apparatus that requires fewer operation steps and that provides a higher level of processing performance than when the two double-input subtracting units are used to practice the same predictive processing.

A sixth aspect of the present invention provides a prediction apparatus as defined in the first aspect of the present invention, wherein the series includes first, second, and third series, and wherein the predictive processing unit includes first and second multiplying units, first, second, and third subtracting units, and a dividing unit, in which the first multiplying unit in receipt of the candidate prediction pixel data multiplies the candidate prediction pixel data by a predetermined first multiplier, thereby providing first multiplied data that is then sent to the first subtracting unit, the first subtracting unit subtracts first series-related neighboring pixel data from the first multiplied data, thereby providing first subtracted data that is then sent to the second subtracting unit, the second multiplying unit multiplies second series-related neighboring pixel data by a predetermined second multiplier, thereby providing second multiplied data that is then sent to the second subtracting unit, the second subtracting unit subtracts the second multiplied data from the first subtracted data, thereby providing second subtracted data that is then sent to the third subtracting unit, the third subtracting unit subtracts third series-related neighboring pixel data from the second subtracted data, thereby providing third subtracted data that is then sent to the dividing unit, and the dividing unit divides the third subtracted data by a predetermined divisor, the first, second, and third series-related neighboring pixel data being the neighboring pixel data that are related to the first, second, and third series, respectively, and that are entered from the neighboring pixel series-generating unit into the predictive processing unit.

This structure makes it feasible to realize high-speed processing that is assumed as B-mode predictive processing according to H.26L-coding system.

A seventh aspect of the present invention provides a prediction apparatus as defined in the first aspect of the present invention, wherein the series includes first, second, and third series, and wherein the predictive processing unit includes first and second multiplying units, a subtracting unit, and a dividing unit, in which the first multiplying unit in receipt of the candidate prediction pixel data multiplies the candidate prediction pixel data by a predetermined first multiplier, thereby providing first multiplied data that is then sent to the subtracting unit, the second multiplying unit multiplies second series-related neighboring pixel data by a predetermined second multiplier, thereby providing second multiplied data that is then sent to the subtracting unit, the subtracting unit subtracts first series-related neighboring pixel data from the first multiplied data, thereby providing subtracted data, the subtracting unit subtracts the second multiplied data from the subtracted data, thereby providing further subtracted data, the subtracting unit subtracts third series-related neighboring pixel data from the further subtracted data, thereby providing ultimately subtracted data that is then sent to the dividing unit, and the dividing unit divides the ultimately subtracted data by a predetermined divisor, the first, second, and third series-related neighboring pixel data being the neighboring pixel data that are related to the first, second, and third series, respectively, and that are entered from the neighboring pixel series-generating unit into the predictive processing unit.

This structure makes it feasible to realize high-speed processing that is assumed as B-mode predictive processing according to H.26L-coding system.

The above structure practices the predictive processing using the single quadruple-input subtracting unit, and consequently eliminates two registers, when compared with the use of the three double-input subtracting units in order to practice the same predictive processing.

This feature provides the prediction apparatus that requires fewer operation steps and that provides a higher level of processing performance than when the three double-input subtracting units are used to practice the same predictive processing.

An eighth aspect of the present invention provides an encoding apparatus comprising a plurality of candidate prediction pixel data, a plurality of neighboring pixel data adjacent to a candidate prediction block that consists of the plurality of candidate prediction pixel data, a prediction unit for practicing predictive processing based on the plurality of candidate prediction pixel data and the plurality of neighboring pixel data in accordance with a predetermined algebraic expression, thereby providing predicted pixel data, an orthogonal transform unit for orthogonally transforming the predicted pixel data from the prediction unit, thereby providing orthogonally transformed data, a quantizing unit for quantizing the orthogonally transformed data from the orthogonal transform unit, thereby providing quantized data, and a variable length-encoding unit for variable length encoding the quantized data from the quantizing unit, wherein the prediction unit includes a neighboring pixel series-generating unit for, upon receipt of the plurality of neighboring pixel data, selecting the data from the plurality of neighboring pixel data in order in which the plurality of neighboring pixel data is arithmetically operated to experience the predictive processing, such a data selection being made for each series that corresponds to an algebra included in the predetermined algebraic expression, the neighboring pixel series-generating unit for outputting the selected data for each of the series in the order in which the plurality of neighboring pixel data is arithmetically operated to experience the predictive processing, and a predictive processing unit for practicing the predictive processing based on the plurality of candidate prediction pixel data received by the predictive processing unit in the order in which the plurality of candidate prediction pixel data is arithmetically operated to experience the predictive processing, and the selected data received by the predictive processing unit from the neighboring pixel series-generating unit for each of the series in the order in which the plurality of neighboring pixel data is arithmetically operated to experience the predictive processing.

This structure allows the data selected from the plurality of neighboring pixel data in the order in which the plurality of neighboring pixel data is arithmetically operated for the predictive processing to be entered into the predictive processing unit for each of the series in the order in which the plurality of neighboring pixel data is arithmetically operated for the predictive processing.

The feature eliminates steps of storing and generating predictive pixel data using the prediction unit, and consequently provides the prediction unit that requires fewer operation steps and that provides a high level of processing performance. As a result, the encoding apparatus having enhanced processing performance is realized.

A nine aspect of the present invention provides an inverse prediction apparatus comprising a plurality of inverse candidate prediction pixel data, a plurality of neighboring pixel data adjacent to an inverse candidate prediction block that consists of the plurality of inverse candidate prediction pixel data, in which the inverse prediction apparatus performs inverse predictive processing based on the plurality of inverse candidate prediction pixel data and the plurality of neighboring pixel data in accordance with a predetermined algebraic expression, a neighboring pixel series-generating unit for, upon receipt of the plurality of neighboring pixel data, selecting the data from the plurality of neighboring pixel data in the order in which the plurality of neighboring pixel data is arithmetically operated to experience the inverse predictive processing, such a data selection being made for each series that corresponds to an algebra included in the predetermined algebraic expression, the neighboring pixel series-generating unit for outputting the selected data for each of the series in the order in which the plurality of neighboring pixel data is arithmetically operated to experience the inverse predictive processing, and an inverse predictive processing unit for practicing the inverse predictive processing based on the plurality of inverse candidate prediction pixel data received by the inverse predictive processing unit in the order in which the plurality of inverse candidate prediction pixel data is arithmetically operated to experience the inverse predictive processing, and the selected data received by the inverse predictive processing unit from the neighboring pixel series-generating unit for each of the series in the order in which the plurality of neighboring pixel data is arithmetically operated to experience the inverse predictive processing.

This structure allows the data selected from the plurality of neighboring pixel data in the order in which the plurality of neighboring pixel data is arithmetically operated for the inverse predictive processing to be entered into the inverse predictive processing unit in the order in which the plurality of neighboring pixel data is arithmetically operated for the inverse predictive processing.

This feature eliminates steps of storing and generating inverse predictive pixel data, and consequently provides the inverse prediction apparatus that requires fewer operation steps and that provides a high level of processing performance.

A tenth aspect of the present invention provides an inverse prediction apparatus as defined in the ninth aspect of the present invention, wherein the neighboring pixel series-generating unit includes a neighboring pixel storage unit and a neighboring pixel-selecting unit, in which the neighboring pixel storage unit stores the plurality of neighboring pixel data upon receipt of the plurality of neighboring pixel data, and the neighboring pixel-selecting unit selects the data from the plurality of neighboring pixel data that is parallel-fed from the neighboring pixel storage unit, such a data selection being made for each of the series in the order in which the plurality of neighboring pixel data is arithmetically operated to experience the inverse predictive processing, the neighboring pixel-selecting unit feeding the selected data into each series-related line in the order in which the plurality of neighboring pixel data is arithmetically operated to experience the inverse predictive processing, and wherein the inverse predictive processing unit receives the selected data from the neighboring pixel-selecting unit through each of the series-related lines.

This structure allows the data selected by the neighboring pixel-selecting unit from the plurality of neighboring pixel data in the order in which the plurality of neighboring pixel data is arithmetically operated for the inverse predictive processing to be entered into the inverse predictive processing unit for each of the series in the order in which the plurality of neighboring pixel data is arithmetically operated for the inverse predictive processing.

This feature eliminates steps of storing and generating inverse predictive pixel data, and consequently provides the inverse prediction apparatus that requires fewer operation steps and that provides a high level of processing performance.

An eleventh aspect of the present invention provides an inverse prediction apparatus as defined in the ninth aspect of the present invention, wherein the neighboring pixel series-generating unit includes a neighboring pixel-selecting unit for feeding each of the neighboring pixel data into a neighboring pixel data-related line, and a neighboring pixel series storage unit disposed for each of the series, in which each of the neighboring pixel series storage units in receipt of the plurality of neighboring pixel data through the neighboring pixel data-related lines stores the neighboring pixel data as corresponding series-related data at predetermined storage positions, the neighboring pixel data-related lines being wired to the predetermined storage positions in the order in which the plurality of neighboring pixel data is arithmetically operated to experience the inverse predictive processing, and each of the neighboring pixel series storage units feeds the stored plurality of neighboring pixel data into a corresponding series-related line in the order in which the plurality of neighboring pixel data is arithmetically operated to experience the inverse predictive processing, and wherein the inverse predictive processing unit receives the stored plurality of neighboring pixel data from the neighboring pixel series storage units through the series-related lines.

This structure allows the data selected from the plurality of neighboring pixel data in the order in which the plurality of neighboring pixel data is arithmetically operated for the inverse predictive processing to be entered into the inverse predictive processing unit from the neighboring pixel series storage unit for each of the series in the order in which the plurality of neighboring pixel data is arithmetically operated for the inverse predictive processing.

This feature eliminates steps of storing and generating inverse predictive pixel data, and consequently provides the inverse prediction apparatus that requires fewer operation steps and that provides a high level of processing performance.

A twelfth aspect of the present invention provides an inverse prediction apparatus as defined in the ninth aspect of the present invention, wherein the series includes first and second series, and wherein the inverse predictive processing unit includes a multiplying unit, first and second adding units, and a dividing unit, in which the multiplying unit in receipt of the inverse candidate prediction pixel data multiplies the inverse candidate prediction pixel data by a predetermined multiplier, thereby providing multiplied data that is then sent to the first adding unit, the first adding unit adds the multiplied data to first series-related neighboring pixel data, thereby providing first added data that is then sent to the second adding unit, the second adding unit adds the first added data to second series-related neighboring pixel data, thereby providing second added data that is then sent to the dividing unit, and the dividing unit divides the second added data by a predetermined divisor, the first and second series-related neighboring pixel data being the neighboring pixel data that are related to the first and second series, respectively, and that are entered from the neighboring pixel series-generating unit into the inverse predictive processing unit.

This structure makes it feasible to realize high-speed inverse predictive processing matched to processing that is assumed as A-mode predictive processing according to H.26L-coding system.

A thirteenth aspect of the present invention provides an inverse prediction apparatus as defined in the ninth aspect of the present invention, wherein the series includes first and second series, and wherein the inverse predictive processing unit includes a multiplying unit, an adding unit, and a dividing unit, in which the multiplying unit in receipt of the inverse candidate prediction pixel data multiplies the inverse candidate prediction pixel data by a predetermined multiplier, thereby providing multiplied data that is then sent to the adding unit, the adding unit adds the multiplied data to first series-related neighboring pixel data, thereby providing added data, the adding unit adds the added data to second series-related neighboring pixel data, thereby providing ultimately added data that is then sent to the dividing unit, and the dividing unit divides the ultimately added data by a predetermined divisor, the first and second series-related neighboring pixel data being the neighboring pixel data that are related to the first and second series, respectively, and that are entered from the neighboring pixel series-generating unit into the inverse predictive processing unit.

This structure makes it feasible to realize high-speed inverse predictive processing matched to processing that is assumed as A-mode predictive processing according to H.26L-coding system.

The above structure practices the inverse predictive processing using the single triple-input adding unit, and consequently eliminates one register, when compared with the use of the two double-input adding units in order to practice the same inverse predictive processing.

This feature provides the inverse prediction apparatus that requires fewer operation steps and that provides a higher level of processing performance than when the two double-input adding units are used to practice the same inverse predictive processing.

A fourteenth aspect of the present invention provides an inverse prediction apparatus as defined in the ninth aspect of the present invention, wherein the series includes first, second, and third series, and wherein the inverse predictive processing unit includes first and second multiplying units, first, second, and third adding units, and a dividing unit, in which the first multiplying unit in receipt of the inverse candidate prediction pixel data multiplies the inverse candidate prediction pixel data by a predetermined first multiplier, thereby providing first multiplied data that is then sent to the first adding unit, the first adding unit adds the first multiplied data to first series-related neighboring pixel data, thereby providing first added data that is then sent to the second adding unit, the second multiplying unit multiplies second series-related neighboring pixel data by a predetermined second multiplier, thereby providing second multiplied data that is then sent to the second adding unit, the second adding unit adds the second multiplied data and the first added data together, thereby providing second added data that is then sent to the third adding unit, the third adding unit adds the second added data to third series-related neighboring pixel data, thereby providing third added data that is then sent to the dividing unit, and the dividing unit divides the third added data by a predetermined divisor, the first, second, and third series-related neighboring pixel data being the neighboring pixel data that are related to the first, second, and third series, respectively, and that are entered from the neighboring pixel series-generating unit into the inverse predictive processing unit.

This structure makes it feasible to realize high-speed inverse predictive processing matched to processing that is assumed as B-mode predictive processing according to H.26L-coding system.

A fifteenth aspect of the present invention provides an inverse prediction apparatus as defined in the ninth aspect of the present invention, wherein the series includes first, second, and third series, and wherein the inverse predictive processing unit includes first and second multiplying units, an adding unit, and a dividing unit, in which the first multiplying unit in receipt of the inverse candidate prediction pixel data multiplies the inverse candidate prediction pixel data by a predetermined first multiplier, thereby providing first multiplied data that is then sent to the adding unit, the second multiplying unit multiplies second series-related neighboring pixel data by a predetermined second multiplier, thereby providing second multiplied data that is then sent to the adding unit, the adding unit adds the first multiplied data to first series-related neighboring pixel data, thereby providing added data, the adding unit adds the added data to the second multiplied data, thereby providing further added data, the adding unit adds the further added data to third series-related neighboring pixel data, thereby providing ultimately added data that is then sent to the dividing unit, and the dividing unit divides the ultimately added data by a predetermined divisor, the first, second, and third series-related neighboring pixel data being the neighboring pixel data that are related to the first, second, and third series, respectively, and that are entered from the neighboring pixel series-generating unit into the inverse predictive processing unit.

This structure makes it feasible to realize high-speed inverse predictive processing matched to processing that is assumed as B-mode predictive processing according to H.26L-coding system.

The above structure practices the inverse predictive processing using the single quadruple-input adding units, and consequently eliminates two registers, when compared with the use of the three double-input adding units in order to practice the same inverse predictive processing.

This feature provides the inverse prediction apparatus that requires fewer operation steps and that provides a higher level of processing performance than when the three double-input adding units are used to practice the same inverse predictive processing.

A sixteenth aspect of the present invention provides a decoding apparatus comprising a plurality of inverse candidate prediction pixel data, a plurality of neighboring pixel data adjacent to an inverse candidate prediction block that consists of the plurality of inverse candidate prediction pixel data, in which the decoding apparatus performs inverse predictive processing based on the plurality of inverse candidate prediction pixel data and the plurality of neighboring pixel data in accordance with a predetermined algebraic expression in order to decode encoded data, a variable length-decoding unit for variable length decoding the encoded data, thereby providing decoded data, an inverse quantizing unit for inversely quantizing the decoded data, thereby providing inversely quantized data, an inverse orthogonal transform unit for inversely ortogonally transforming the inversely quantized data, thereby providing inversely orthogonally transformed data, and an inverse prediction unit for practicing inverse predictive processing of the inverse candidate prediction pixel data that is the inversely orthogonally transformed data, wherein the inverse prediction unit includes a neighboring pixel series-generating unit for, upon receipt of the plurality of neighboring pixel data, selecting the data from the plurality of neighboring pixel data in the order in which the plurality of neighboring pixel data is arithmetically operated to experience inverse predictive processing, such a data selection being made for each series that corresponds to an algebra included in the predetermined algebraic expression, the neighboring pixel series-generating unit for outputting the selected data for each of the series in the order in which the plurality of neighboring pixel data is arithmetically operated to experience the inverse predictive processing, and an inverse predictive processing unit for practicing the inverse predictive processing based on the plurality of inverse candidate prediction pixel data received by the inverse predictive processing unit in the order in which the plurality of inverse candidate prediction pixel data is arithmetically operated to experience the inverse predictive processing, and the selected data received by the inverse predictive processing unit from the neighboring pixel series-generating unit for each of the series in the order in which the plurality of neighboring pixel data is arithmetically operated to experience the inverse predictive processing.

This structure allows the data selected from the plurality of neighboring pixel data in the order in which the plurality of neighboring pixel data is arithmetically operated for the inverse predictive processing to be entered into the inverse predictive processing unit for each of the series in the order in which the plurality of neighboring pixel data is arithmetically operated for the inverse predictive processing.

The feature eliminates steps of storing and generating inverse predictive pixel data using the inverse prediction unit, and consequently provides the inverse prediction unit that requires fewer operation steps and that provides a high level of processing performance. As a result, a decoding apparatus having enhanced processing performance is realized.

A seventeenth aspect of the present invention provides a computing apparatus comprising a computing unit for performing arithmetical operation in accordance with a predetermined algebraic expression, and a series data-generating unit for feeding data into the computing unit for each series that corresponds to an algebraic expression included in the predetermined algebraic expression, wherein the series data-generating unit in receipt of a plurality of first data selects the data from the plurality of first data for each of the series in the order in which the plurality of first data is arithmetically operated, and the series data-generating unit feeds the selected data into the computing unit for each of the series in the order in which the plurality of first data is arithmetically operated, and wherein the computing unit arithmetically operates together a plurality of second data received by the computing unit in the order in which the plurality of second data is arithmetically operated, and the selected data received by the computing unit from the series data-generating unit in the order in which the plurality of first data is arithmetically operated.

This system allows the data selected from the plurality of first data in the order in which the plurality of first data is arithmetically operated to be entered into the computing unit for each of the series in the order in which the plurality of first data is arithmetically operated.

This feature realizes the computing apparatus that requires fewer operation steps and that provides a high level of processing performance.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 28($a$) is a block diagram, illustrating a prior art predictive pixel-generating unit; and FIG. 28($b$) is a block diagram, illustrating a prior ail predictive processing unit.

DETAILED DESCRIPTION OF THE PREFERRED EMBODIMENTS

Embodiments of the present invention will now be described with reference to the drawings.

Embodiment 1

A first embodiment is described by taking A-mode predictive processing according to H.26L-coding system as an example.

Figure 1:
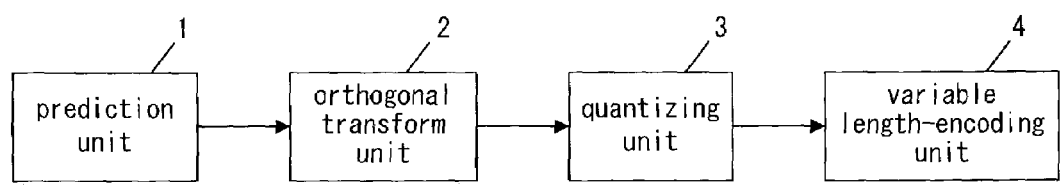
FIG. 1 is a block diagram, illustrating an exemplary encoding apparatus according to a first embodiment of the present invention.

FIG. 1 is a block diagram, illustrating an exemplary encoding apparatus according to the first embodiment. As illustrated in FIG. 1, the encoding apparatus includes a prediction unit 1, an orthogonal transform unit 2, a quantizing unit 3, and a variable length-encoding unit 4.

The prediction unit 1 performs predictive processing based on a plurality of candidate prediction pixel data and a plurality of neighboring pixel data adjacent to a candidate prediction block in accordance with a predetermined algebraic expression. The candidate prediction block consists of the plurality of candidate prediction pixel data. The way in which the prediction unit 1 works is described later in detail.

The orthogonal transform unit 2 orthogonally transforms the predicted pixel data from the prediction unit 1. The orthogonal transform unit 2 employs, e.g., discrete cosine transformation (DCT) in order to orthogonally transform the predicted pixel data.

The quantizing unit 3 quantizes the orthogonally transformed data from the orthogonal transform unit 2.

The variable length-encoding unit 4 practices the variable-length encoding of the quantized data from the quantizing unit 3.

Figure 2:
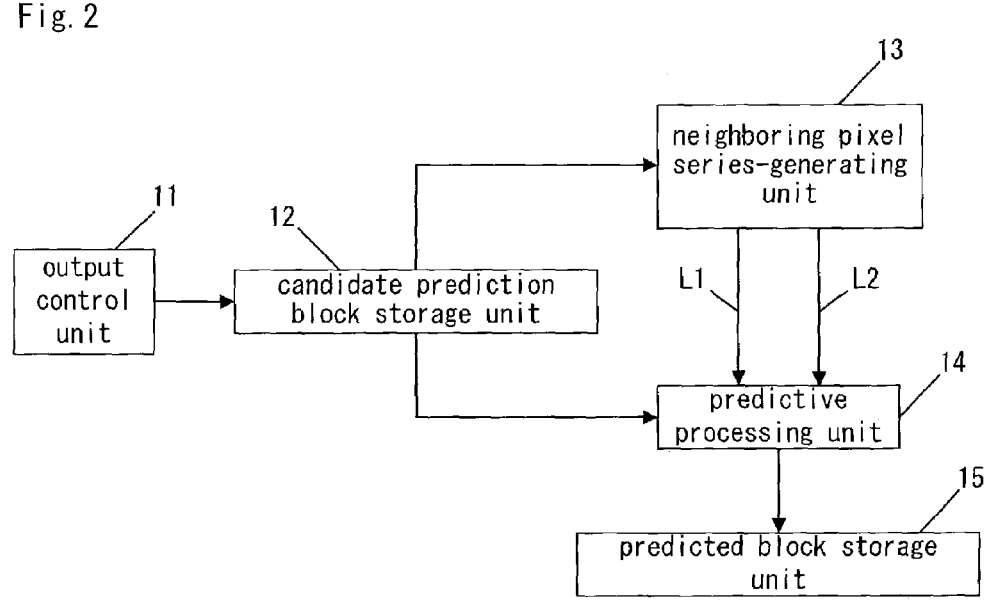
FIG. 2 is a block diagram, illustrating an exemplary prediction apparatus of FIG. 1.

FIG. 2 is a block diagram, illustrating the exemplary prediction unit 1 of FIG. 1. As illustrated in FIG. 2, the prediction unit 1 includes an output control unit 11, a candidate prediction block storage unit 12, a neighboring pixel series-generating unit 13, a predictive processing unit 14, and a predicted block storage unit 15.

Figure 3:
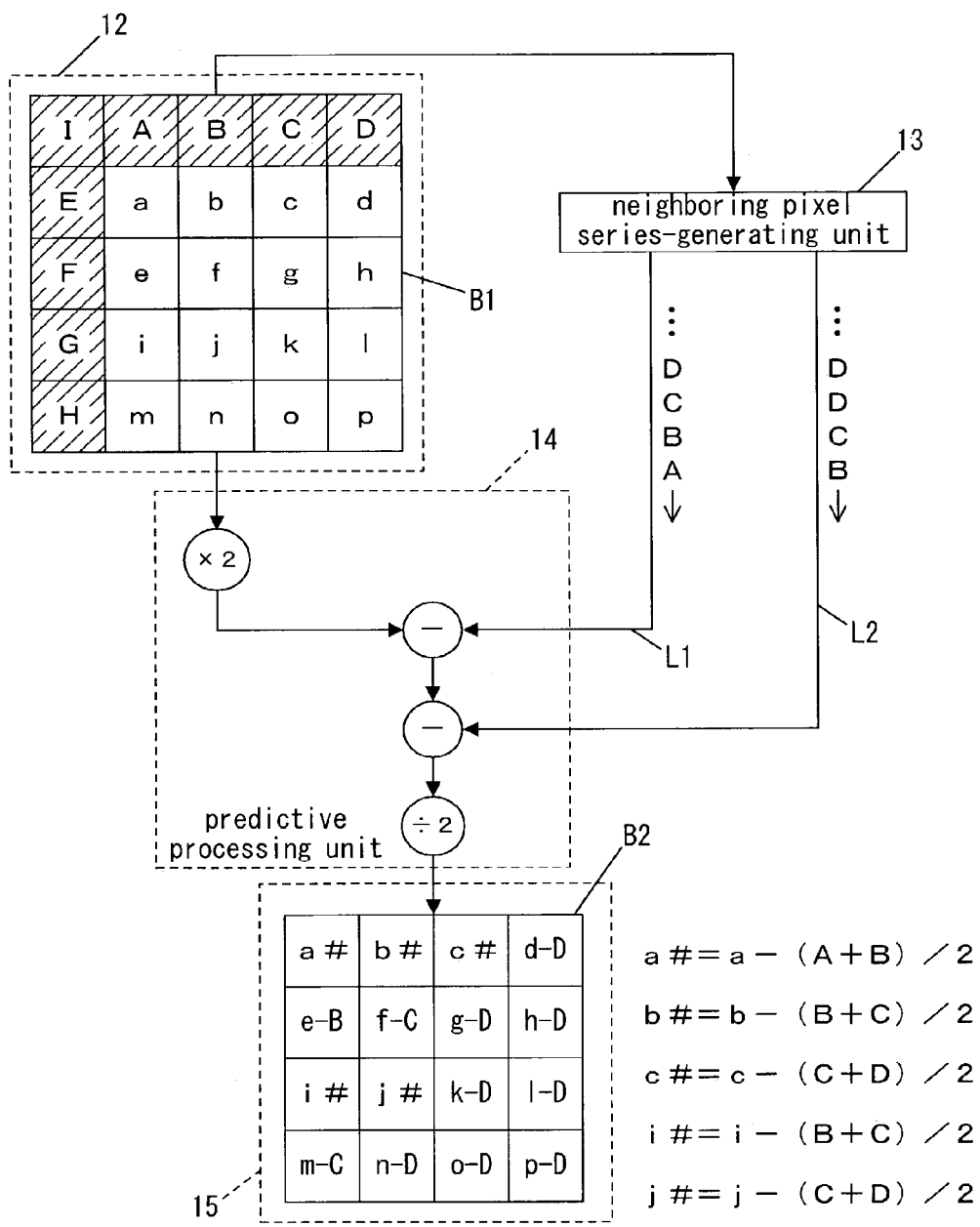
FIG. 3 is a descriptive illustration, showing the prediction apparatus.

FIG. 3 is a descriptive illustration, showing how the exemplary components of FIG. 2 work. In FIG. 3, the same components as those of FIG. 2 are identified by the same reference characters, and descriptions related thereto are omitted.

The following describes, with reference to FIGS. 2 and 3, how the prediction unit 1 of FIG. 1 works.

As illustrated in FIG. 3, the candidate prediction block storage unit 12 stores sixteen pieces (a four-by-four area) of candidate prediction pixel data {a, b, c, d, e, f. g, h, i, j, k, l, m, n, o, and p}. These sixteen pieces of data form a candidate prediction block B1.

The candidate prediction block storage unit 12 further stores nine pieces of neighboring pixel data {A, B, C, D, E, F, G, H, and I} adjacent to the candidate prediction block B1.

The candidate prediction block storage unit 12 is a memory that outputs the stored candidate prediction pixel data or stored neighboring pixel data in response to address signals that are fed from the output control unit 11.

More specifically, the candidate prediction block storage unit 12 feeds the candidate prediction pixel data {a, b, c, d, e, f. g, h, i, j, k, l, m, n, o, and p} into the predictive processing unit 14 in response to the address signals from the output control unit 11. At this time, the candidate prediction pixel data {a, b, c, d, e, f. g, h, i, j, k, l, m, n, o, and p} are entered into the predictive processing unit 14 in the order in which the predictive processing unit 14 arithmetically operates these data.

The predictive processing unit 14 arithmetically operates the candidate prediction pixel data in the order of a, b, c, d, e, f. g, h, i, j, k, l, m, n, o, and p.

The candidate prediction block storage unit 12 feeds the neighboring pixel data "A", "B", "C", and "D" into the neighboring pixel series-generating unit 13 in response to the address signals from the output control unit 11.

The neighboring pixel series-generating unit 13 in receipt of the neighboring pixel data "A", "B", "C", and "D" selects the data therefrom in the order in which the predictive processing unit 14 arithmetically operates the neighboring pixel data "A", "B", "C", and "D". At this time, such a data selection is made for each series that corresponds to an algebra included in the predetermined algebraic expression. The neighboring pixel series-generating unit 13 feeds the selected data into the predictive processing unit 14 for each of the series in the order in which the predictive processing unit 14 arithmetically operates the neighboring pixel data "A", "B", "C", and "D".

The predetermined algebraic expression is $((2X-Y-Z)/2)$, where X, Y, and Z are algebras.

The predetermine algebraic expression is set to produce predicted pixel data {"a#" to "p-D"} of FIG. 3 using the candidate prediction pixel data {"a" to "p"} of FIG. 3 and the neighboring pixel data "A", "B", "C", and "D" of FIG. 3.

Such predictive processing for producing the predicted pixel data {"a#" to "p-D"} of FIG. 3 using the candidate prediction pixel data {"a" to "p"} of FIG. 3 and the neighboring pixel data "A", "B", "C", and "D" of FIG. 3 is A-mode predictive processing that would possibly be incorporated by the H.26L-encoding system.

The algebraic expression as given above provides one series that corresponds to algebra "Y" (called "a first series" according to the present embodiment) and another that corresponds to algebra "Z" (called "a second series" according to the present embodiment).

More specifically, the neighboring pixel series-generating unit 13 produces a first neighboring pixel series {A, B, C, D, B, C, D, D, B, C, D, D, C, D, D, and D} in accordance with the data selected from the neighboring pixel data "A", "B", "C", and "D" in the order in which the predictive processing unit 14 arithmetically operates the first series. The neighboring pixel series-generating unit 13 feeds the first neighboring pixel series {A, B, C, D, B, C, D, D, B, C, D, D, C, D, D, and D} into a first series-related line "L1".

For the first series, the predictive processing unit 14 arithmetically operates the neighboring pixel data in the first neighboring pixel series in sequence from "A" to "D".

The neighboring pixel series-generating unit 13 produces a second neighboring pixel series {B, C, D, D, B, C, D, D, C, D, D, D, C, D, D, and D} in accordance with the data selected from the neighboring pixel data "A", "B", "C", and "D" in the order in which the predictive processing unit 14 arithmetically operates the second series. The neighboring pixel series-generating unit 13 feeds the second neighboring pixel series {B, C, D, D, B, C, D, D, C, D, D, D, C, D, D, and D} into a second series-related line "L2".

For the second series, the predictive processing unit 14 arithmetically operates the neighboring pixel data in the second neighboring pixel series in sequence from "B" to "D".

The predictive processing unit 14 carries out the predictive processing in accordance with the predetermined algebraic expression as mentioned above. The following more specifically discusses the predictive processing.

The predictive processing unit 14 receives the candidate prediction pixel data {"a" to "p"} in the order in which these data are arithmetically operated.

The predictive processing unit 14 receives the first neighboring pixel series {"A" to "D"} through the first series-related line "L1" in the order in which these data are arithmetically operated.

The predictive processing unit 14 receives the second neighboring pixel series {"B" to "D"} through the second series-related line "L2" in the order in which these data are arithmetically operated.

The predictive processing unit 14 subtracts the respective neighboring pixel data in the first and second neighboring pixel series from multiplied data that is obtained by multiplying the candidate prediction pixel data by two. As a result, subtracted data is provided. The predictive processing unit 14 divides the subtracted data by two, thereby providing predicted pixel data {a#, b#, c#, d-D, e-B, f-C, g-D, h-D, i#, j#, k-D, I-D, m-c, n-D, o-D, and p-D}.

These sixteen pieces of predicted pixel data {"a#" to "p-D"} form a predicted block B2.

The predicted block storage unit 15 stores the predicted block B2 that is provided by the predictive processing unit 14. The predicted block storage unit 15 is a gang of registers, or alternatively a memory that outputs the data in response to the address signals.

The predicted pixel data {"a#", "b#", "c#", "i#", and "j#"} are expressed as follows: $a\#=a-(A+B)/2$; $b\#=b-(B+C)/2$; $c\#=c-(C+D)/2$; $i\#=i-(B+C)/2$; and $j\#=j-(C+D)/2$.

The following describes details of the neighboring pixel series-generating unit 13 of FIG. 3. A first example of the neighboring pixel series-generating unit 13 is initially discussed.

Figure 4:
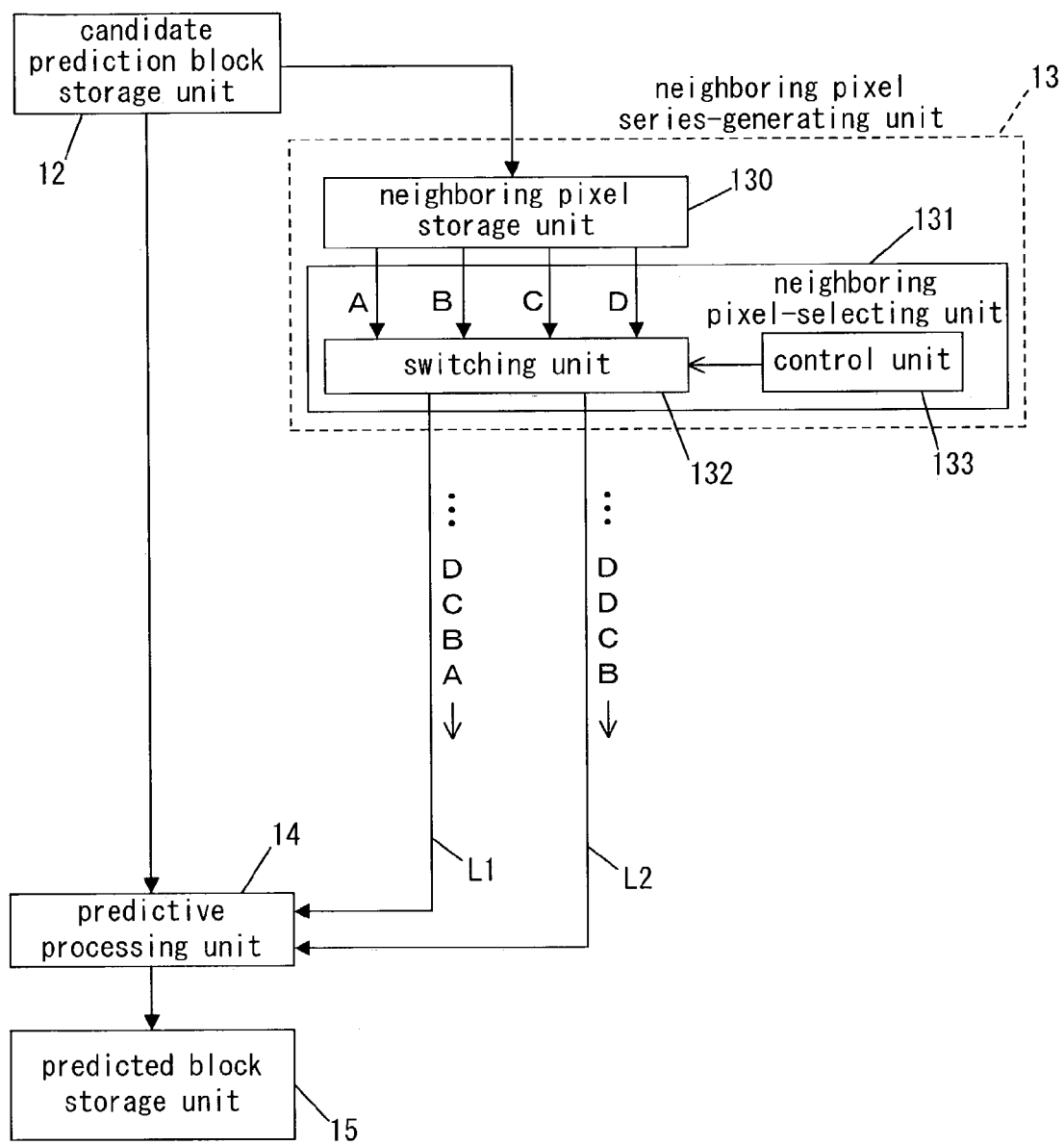
FIG. 4 is an illustration, showing an exemplary example of a neighboring pixel series-generating unit of FIG. 2.

FIG. 4 is an illustration, showing an exemplary first example of the neighboring pixel series-generating unit 13 of FIG. 3. In FIG. 4, the same components as those of FIG. 3 are identified by the same reference characters, and descriptions related thereto are omitted.

As illustrated in FIG. 4, the neighboring pixel series-generating unit 13 includes a neighboring pixel storage unit 130 and a neighboring pixel-selecting unit 131.

The neighboring pixel-selecting unit 131 includes a switching unit 132 and a control unit 133.

The neighboring pixel series-generating unit 13 receives the four pieces of neighboring pixel data "A", "B", "C", and "D" in sequence from the candidate prediction block storage unit 12.

The neighboring pixel storage unit 130 stores the sequentially entered neighboring pixel data "A", "B", "C", and "D". The neighboring pixel storage unit 130 is a gang of registers.

The neighboring pixel storage unit 130 parallel-feeds the neighboring pixel data "A", "B", "C", and "D" into the switching unit 132.

The switching unit 132 connects each line selected from four lines in which the neighboring pixel data "A", "B", "C", and "D" are entered, to the first series-related line "L1" in response to instructions from the control unit 133. At this time, such a line selection is made in the order in which the predictive processing unit 14 arithmetically operates the first series.

As a result, the neighboring pixel data are fed into the line "L1" in the order in which the first series is arithmetically operated.

More specifically, the data selected in the order in which the first series is arithmetically operated provide the first neighboring pixel series {A, B, C, D, B, C, D, D, B, C, D, D, C, D, D, and D}. The first neighboring pixel series is entered into the first series-related line L1.

The switching unit 132 connects each line selected from the four lines in which the neighboring pixel data "A", "B", "C", and "D" are entered, to the second series-related line "L2" in response to instructions from the control unit 133. At this time, such a line selection is made in the order in which the predictive processing unit 14 arithmetically operates the second series.

As a result, the neighboring pixel data are fed into the line "L2" in the order in which the second series is arithmetically operated.

More specifically, the data selected in the order in which the second series is arithmetically operated provide the second neighboring pixel series {B, C, D, D, B, C, D, D, C, D, D, D, C, D, D, and D}. The second neighboring pixel series is entered into the second series-related line "L2"

The first neighboring pixel series is delayed by the control of the control unit 133, thereby feeding the delayed first neighboring pixel series into the line "L1" from the switching unit 132. This step is described later in detail.

The second neighboring pixel series is delayed by the control of the control unit 133, thereby feeding the delayed second neighboring pixel series into the line "L2" from the switching unit 132. This step is described later in detail.

Next, a second example of the neighboring pixel series-generating unit 13 of FIG. 3 is described.

Figure 5:
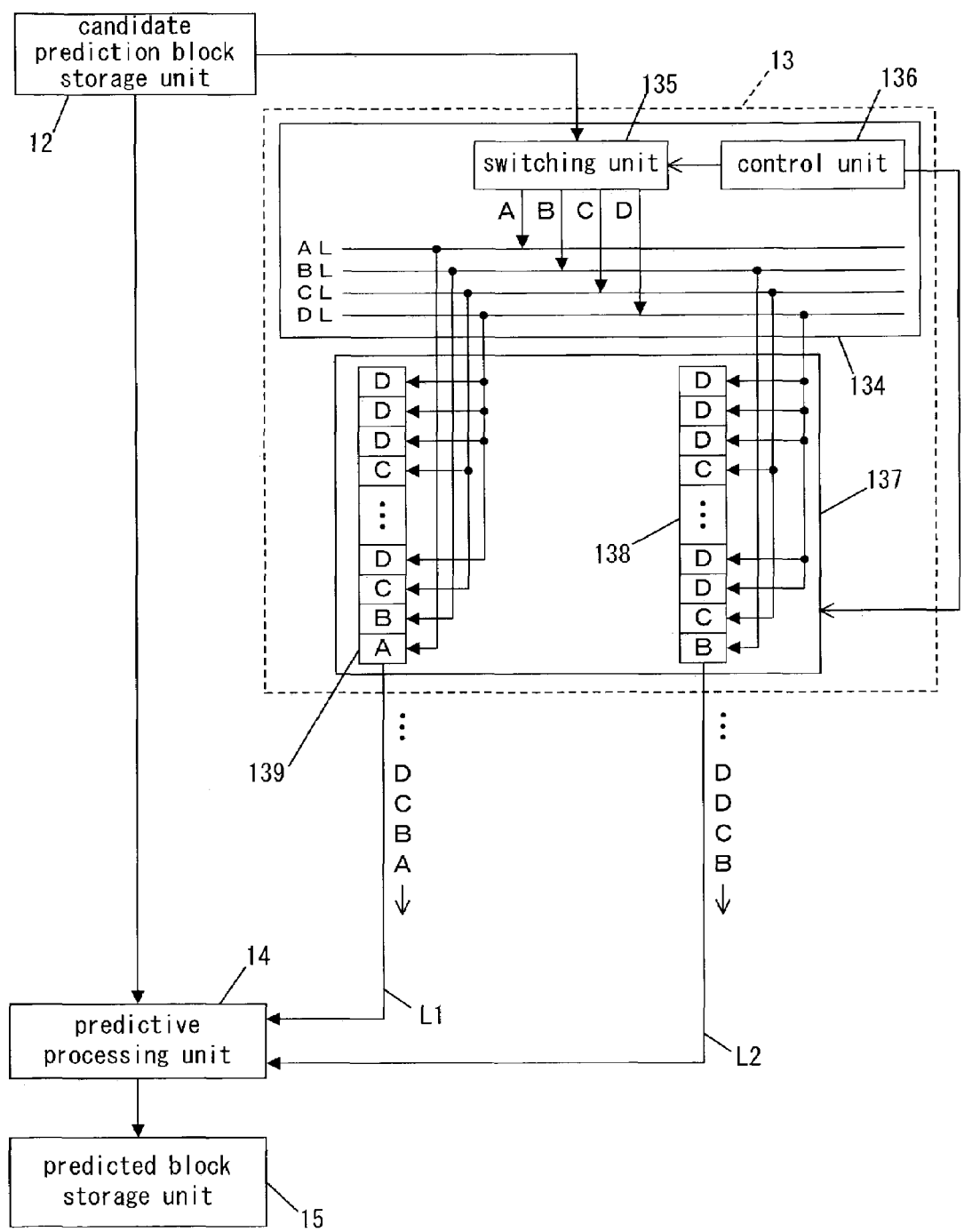
FIG. 5 is an illustration, showing another exemplary example of the neighboring pixel series-generating unit.

FIG. 5 is an illustration, showing the exemplary second example of the neighboring pixel series-generating unit 13 of FIG. 3. In FIG. 5, the same components as those of FIG. 3 are identified by the same reference characters, and descriptions related thereto are omitted.

As illustrated in FIG. 5, the neighboring pixel series-generating unit 13 includes a neighboring pixel-selecting unit 134 and a neighboring pixel storage unit 137.

The neighboring pixel-selecting unit 134 includes a switching unit 135 and a control unit 136.

The neighboring pixel storage unit 137 includes neighboring pixel series storage units 139, 138 that correspond to the lines "L1", "L2", respectively.

The neighboring pixel series-generating unit 13 receives the four pieces of neighboring pixel data "A", "B", "C", and "D" in sequence from the candidate prediction block storage unit 12.

When the neighboring pixel data "A" enters the neighboring pixel series-generating unit 13, then the switching unit 135 connects a line in which the neighboring pixel data "A" is entered, to a line "AL" in response to instructions from the control unit 136.

When the neighboring pixel data "B" enters the neighboring pixel series-generating unit 13, then the switching unit 135 connects a line in which the neighboring pixel data "B" is entered, to a line "BL" in response to instructions from the control unit 136.

When the neighboring pixel data "C" enters the neighboring pixel series-generating unit 13, then the switching unit 135 connects a line in which the neighboring pixel data "C" is entered, to a line "CL" in response to instructions from the control unit 136.

When the neighboring pixel data "D" enters the neighboring pixel series-generating unit 13, then the switching unit 135 connects a line in which the neighboring pixel data "D" is entered, to a line "DL", in response to instructions from the control unit 136.

In this way, the switching unit 135 feeds the neighboring pixel data "A", "B", "C", and "D" into the lines "AL", "BL", "CL," and "DL" that correspond to the neighboring pixel data "A", "B", "C", and "D", respectively.

The lines "AL", "BL", "CL," and "DL" are wired to the first series-related neighboring pixel series storage unit 139 at predetermined storage positions in the order in which the predictive processing unit 14 arithmetically operates the first series. The lines "BL", "CL," and "DL" are also wired to the second series-related neighboring pixel series storage unit 138 at predetermined storage positions in the order in which the predictive processing unit 14 arithmetically operates the second series.

Accordingly, the first series-related neighboring pixel series storage unit 139 stores the neighboring pixel data in the order in which the first series is arithmetically operated.

More specifically, the first series-related neighboring pixel series storage unit 139 stores the first neighboring pixel series {A, B, C, D, B, C, D, D, B, C, D, D, C, D, D, and D} that consists of the neighboring pixel data aligned in the order in which the first series is arithmetically operated.

Similarly, the second series-related neighboring pixel series storage unit 138 stores the neighboring pixel data in the order in which the second series is arithmetically operated.

More specifically, the second series-related neighboring pixel series storage unit 138 stores the second neighboring pixel series {B, C, D, D, B, C, D, D, C, D, D, D, C, D, D, and D} that consists of the neighboring pixel data aligned in the order in which the second series is arithmetically operated.

The wired lines "AL", "BL", "CL", and "DL" as described above permit the neighboring pixel data "B" to be concurrently written to the neighboring pixel series storage units 138, 139 at corresponding storage positions. Similarly, the other neighboring pixel data "C" and "D" are concurrently written to the neighboring pixel series storage units 138, 139 at corresponding storage positions.

This means that the neighboring pixel data "B" can be written at a single step to the neighboring pixel series storage units 138, 139 at corresponding storage positions. Similarly, the remaining neighboring pixel data "A", "C", and "D" can be written at a single step thereto at corresponding storage positions.

The first series-related neighboring pixel series storage unit 139 feeds the stored neighboring pixel data into the first series-related line "L1" in the order in which these data are subjected to the predictive processing.

More specifically, the firs series-related neighboring pixel series storage unit 139 feeds the stored first neighboring pixel series into the first series-related line "L1".

Similarly, the second series-related neighboring pixel series storage unit 138 feeds the stored neighboring pixel data into the second series-related line "L2" in the order in which these data are subjected to the predictive processing More specifically, the second series-related neighboring pixel series storage unit 138 feeds the stored second neighboring pixel series into the second series-related line "L2".

The first neighboring pixel series is delayed by the control of the control unit 136, thereby feeding the delayed first neighboring pixel series into the line "L1" from the neighboring pixel series storage unit 139. This step is described later in detail.

The second neighboring pixel series is delayed by the control of the control unit 136 thereby feeding the delayed second neighboring pixel series into the line "L2" from the neighboring pixel series storage unit 138. This step is described later in detail.

Next, details of the predictive processing unit 14 of FIG. 3 are described. A first example of the predictive processing unit 14 of FIG. 3 is initially described. In the following description, the candidate prediction pixel data "a" of FIG. 3 is illustrated as data subject to the predictive processing.

Figure 6:
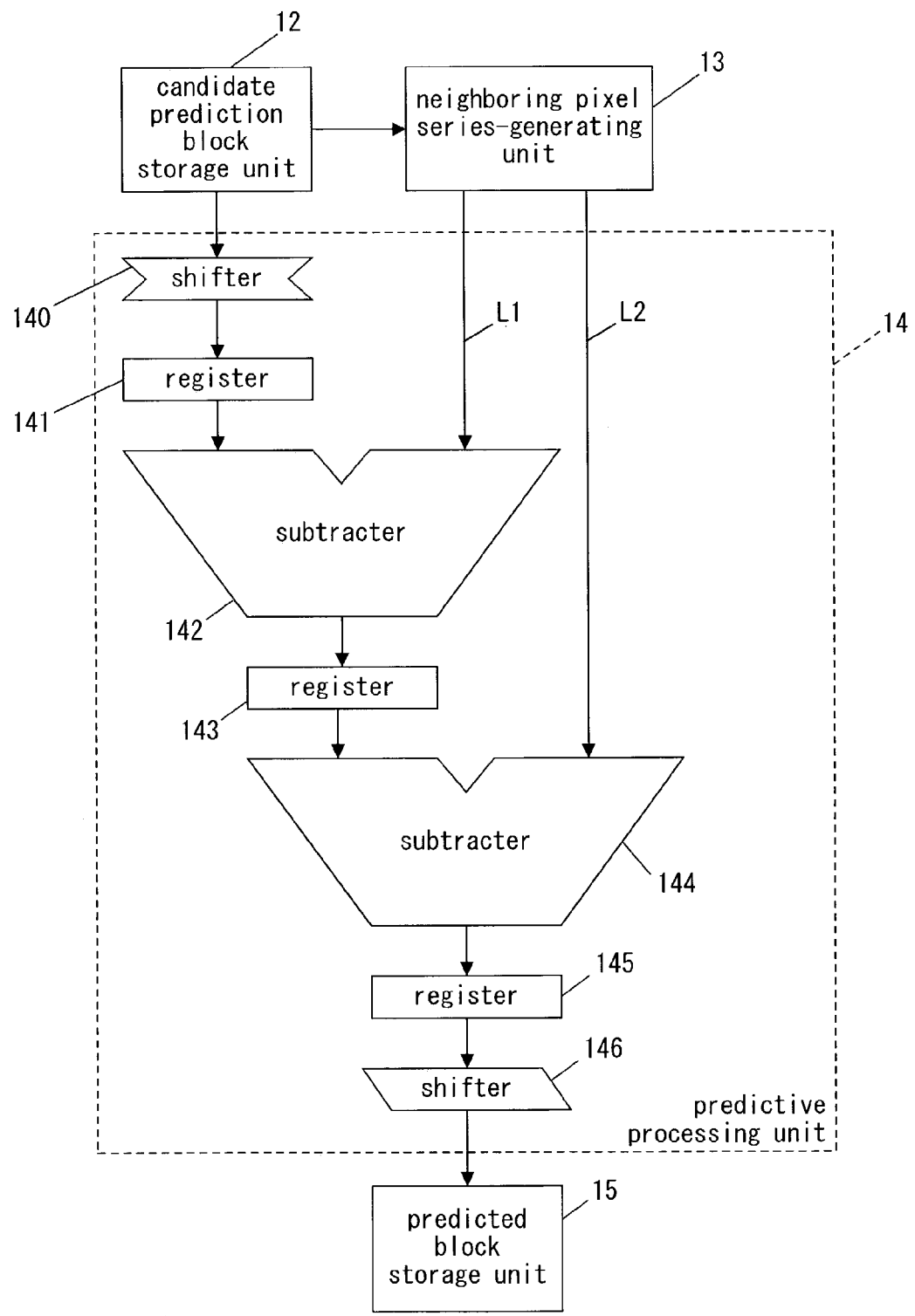
FIG. 6 is an illustration, showing an exemplary example of a predictive processing unit of FIG. 2.

FIG. 6 is an illustration, showing the exemplary first example of the predictive processing unit 14 of FIG. 3. In FIG. 6, the same components as those of FIG. 3 are identified by the same reference characters, and descriptions related thereto are omitted.

As illustrated in FIG. 6, the predictive processing unit 14 includes a shifter 140, registers 141, 143, and 145, double-input subtracters 142 and 144, and a shifter 146.

As illustrated in FIG. 6, the candidate prediction block storage unit 12 reads out the candidate prediction pixel data "a" into the shifter 140.

The shifter 140 is shifted leftward by an amount of one bit, and then multiplies the candidate prediction pixel data "a" by two, thereby providing multiplied data "2a". The shifter 140 is a multiplying unit. The shifter 140 is able to horizontally shift.

The shifter 140 feeds the multiplied data "2a" into the register 141.

The subtracter 142 receives the multiplied data "2a" from the register 141. The subtracter 142 also receives the neighboring pixel data "A" from the first neighboring pixel series through the first series-related line "L1".

At this time, the first neighboring pixel series is delayed by time "t" with reference to the output of the candidate prediction pixel data from the candidate prediction block storage unit 12, thereby supplying the delayed first neighboring pixel series to the subtracter 142. Accordingly, the subtracter 142 concurrently receives the multiplied data "2a" from the shifter 140 and the neighboring pixel data "A" from the first neighboring pixel series.

The subtracter 142 subtracts the neighboring pixel data "A" from the multiplied data "2a", thereby providing subtracted data "2a−A".

The subtracter 142 feeds the subtracted data "2a−A" into the register 143.

The subtracter 144 receives the subtracted data "2a−A" from the register 143. The subtracter 144 also receives the neighboring pixel data "B" from the second neighboring pixel series through the second series-related line "L2".

At this time, the second neighboring pixel series is delayed by time "t" with reference to the output of the subtracted data from the subtracter 142, thereby supplying the delayed second neighboring pixel series to the subtracter 144. Accordingly, the subtracter 144 concurrently receives the subtracted data "2a−A" from the subtracter 142 and the neighboring pixel data "B" from the second neighboring pixel series.

The subtracter 144 subtracts the neighboring pixel data "B" from the subtracted data "2a−A", thereby providing subtracted data "2a−A−B".

The subtracter 144 feeds the subtracted data "2a−A−B" into the register 145.

The shifter 146 receives the subtracted data "2a−A−B" from the register 145.

The shifter 146 is shifted rightward by an amount of one bit, and then divides the subtracted data "2a−A−B" by two, thereby providing predicted pixel data "a−(A+B)/2". The shifter 146 is a dividing unit. The shifter 146 is limited to rightward shifting.

The shifter 146 feeds the predicted pixel data "a−(A+B)/2" into the predicted block storage unit 15.

In this way, the predictive processing unit 14 arithmetically operates together the sequentially entered candidate prediction pixel data, the sequentially entered neighboring pixel data from the first neighboring pixel series, and the sequentially entered neighboring pixel data from the second neighboring pixel series. As a result, the predicted pixel data are produced in sequence.

Next, a second example of the predictive processing unit 14 of FIG. 3 is described. In this example, the candidate prediction pixel data "a" of FIG. 3 is illustrated as data subject to the predictive processing.

Figure 7:
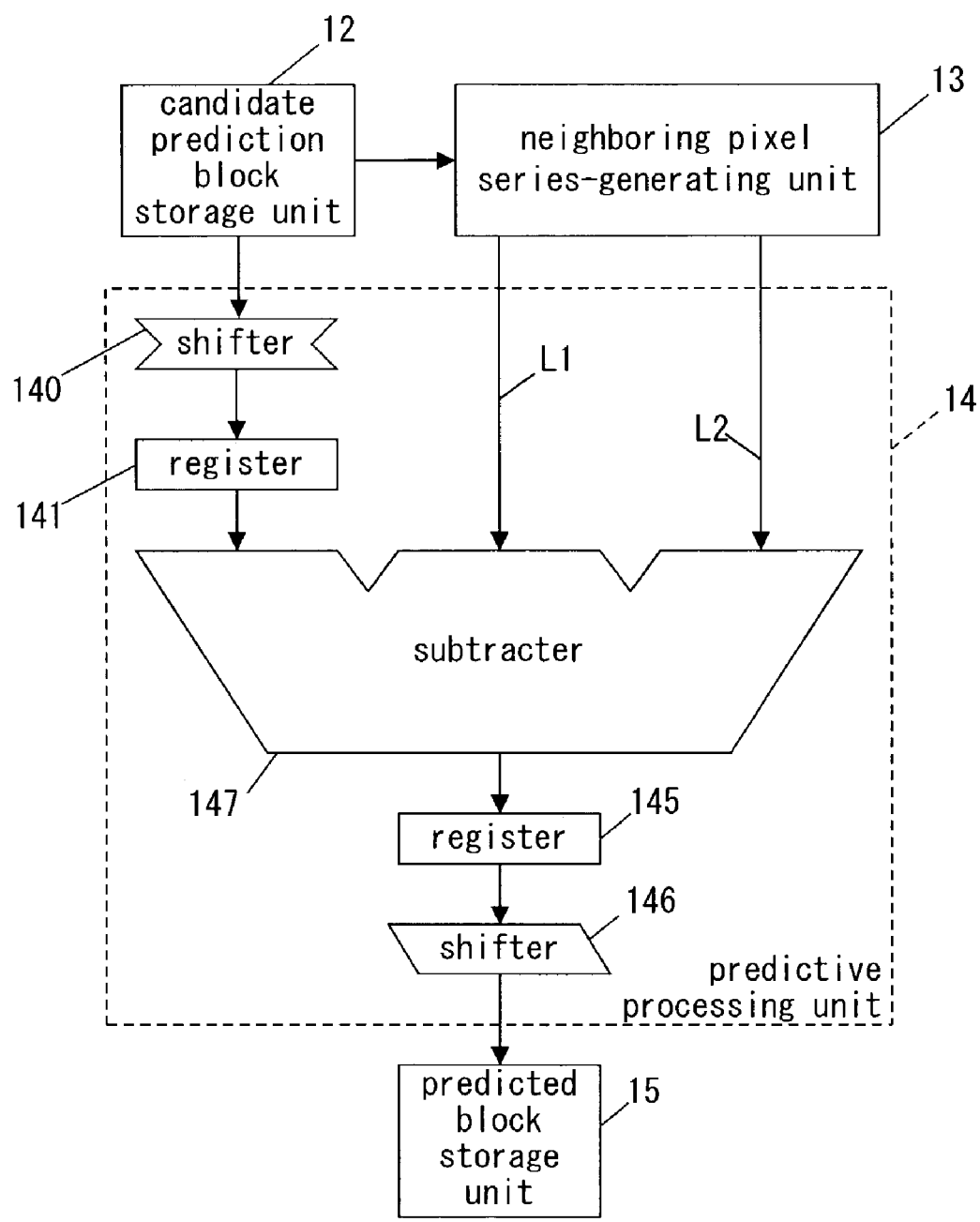
FIG. 7 is an illustration, showing another exemplary example of the predictive processing unit.

FIG. 7 is an illustration, showing the exemplary second example of the predictive processing unit 14 of FIG. 3. In FIG. 7, the same components as those of FIG. 3 or FIG. 6 are identified by the same reference characters, and description related thereto are omitted.

As illustrated in FIG. 7, the predictive processing unit 14 includes a shifter 140, registers 141 and 145, a triple-input subtracter 147, and a shifter 146.

As illustrated in FIG. 7, the subtracter 147 receives the multiplied data "2a" from the shifter 140 through the register 141. The subtracter 142 also receives the neighboring pixel data "A" from the first neighboring pixel series through the first series-related line "L1" and the neighboring pixel data "B" from the second neighboring pixel series through the second series-related line "L2".

At this time, the first and second neighboring pixel series are delayed by time "t" with reference to the output of the candidate prediction pixel data from the candidate prediction block storage unit 12, thereby supplying the delayed first and second neighboring pixel series to the subtracter 147. Accordingly, the subtracter 147 concurrently receives the multiplied data "2a" from the shifter 140 and the neighboring pixel data "A" from the first neighboring pixel series, and the neighboring pixel data "B" from the second neighboring pixel series.

The subtracter 147 subtracts the neighboring pixel data "A" from the multiplied data "2a", thereby providing subtracted data "2a−A". The subtracter 142 then subtracts the neighboring pixel data "B" from the subtracted data "2a−A", thereby providing ultimately subtracted data "2a−A−B".

The subtracter 147 feeds the ultimately subtracted data "2a−A−B" into the register 145.

The shifter 146 receives the ultimately subtracted data "2a−A−B" from the register 145.

The shifter 146 is shifted rightward by an amount of one bit, and then divides the ultimately subtracted data "2a−A−B" by two, thereby providing predicted pixel data "a−(A+B)/2".

The shifter 146 feeds the predicted pixel data "a−(A+B)/2" into the predicted block storage unit 15.

In this way, the predictive processing unit 14 arithmetically operates together the sequentially entered candidate prediction pixel data, the sequentially entered neighboring pixel data from the first neighboring pixel series, and the sequentially entered neighboring pixel data from the second neighboring pixel series. As a result, the predicted pixel data are produced in sequence.

Next, the number of operation steps is discussed for the predictive processing using the predictive processing unit 14 of FIG. 6, which includes the two double-input subtracters.

The readout of the neighboring pixel data "A", "B", "C", and "D" from the candidate prediction block storage unit 12 of FIG. 4 involves four steps.

Four steps are required to store the neighboring pixel data "A", "B", "C", and "D" using the neighboring pixel storage unit 130 of FIG. 4.

Nineteen steps are required to conduct the predictive processing using the predictive processing unit 14 of FIG. 6.

As a result, the A-mode predictive processing using the prediction unit 1 of FIG. 1 involves a total of twenty-seven operation steps when the predictive processing unit 14 of FIG. 6 is employed.

The subtracters 142, 144 in the predictive processing unit 14 of FIG. 6 support vector instructions. In this case, the number of operation steps is equal to three plus the number of pixels to be processed.

The use of the neighboring pixel series-generating unit 13 of FIG. 5 instead of the neighboring pixel series-generating unit 13 of FIG. 4 involves four steps to store the neighboring pixel data "A", "B", "C", and "D" using the neighboring pixel series storage units 138, 139.

Similar to the use of the neighboring pixel series-generating unit 13 of FIG. 4, four steps are required to read out the neighboring pixel data "A", "B", "C", and "D" from the neighboring pixel series-generating unit 13 of FIG. 5. The predictive processing using the predictive processing unit 14 of FIG. 6 requires nineteen steps.

As a result, the use of the neighboring pixel series-generating unit 13 of FIG. 5 instead of the neighboring pixel series-generating unit 13 of FIG. 4 also results in a total of twenty-seven operation steps for the A-mode predictive processing using the prediction unit 1 of FIG. 1 when the predictive processing unit 14 of FIG. 6 is employed.

Figure 27:
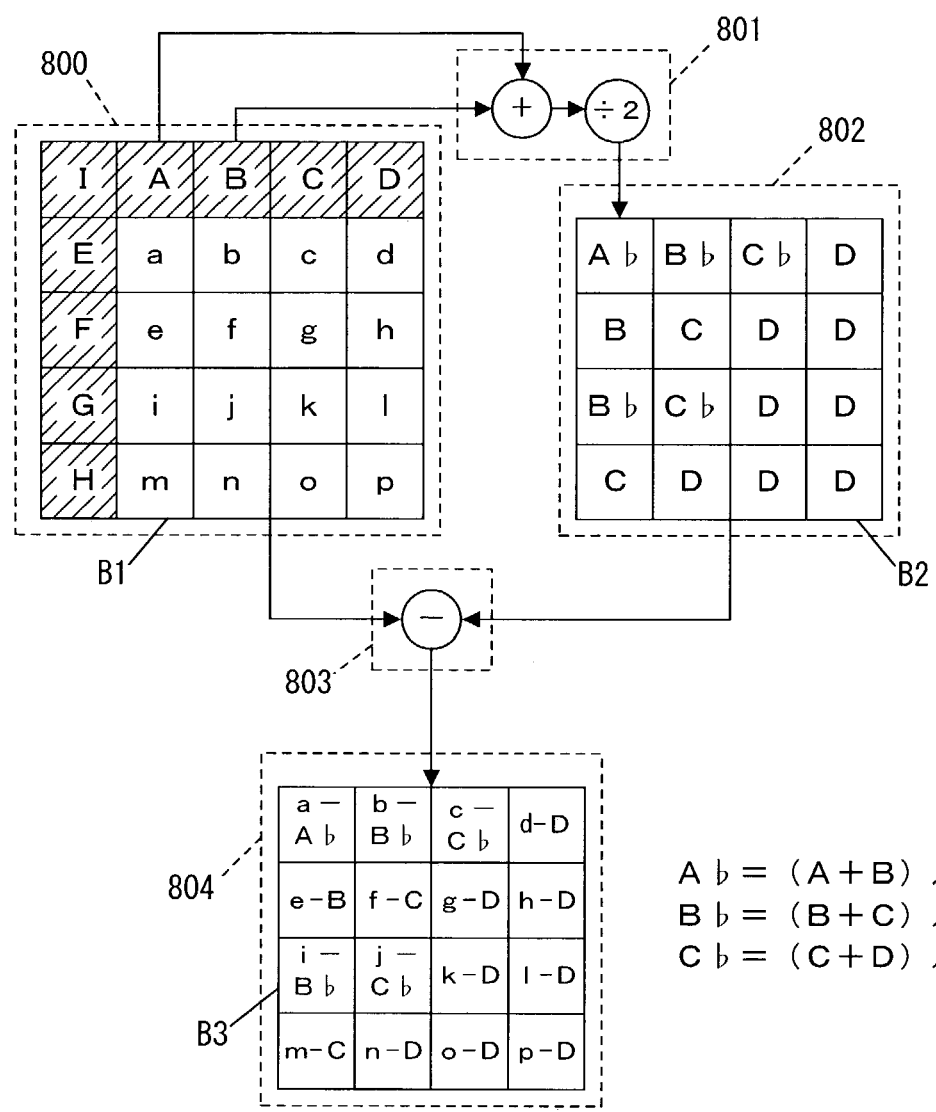
FIG. 27 is a descriptive illustration, showing a prior art prediction apparatus.

Meanwhile, A-mode predictive processing using the prior art prediction unit of FIG. 27 requires a total of forty-four steps.

As evidenced by the above, the present embodiment provides a substantially reduced number of operation steps for the A-mode predictive processing, and thus provides a high level of processing performance.

Another discussion is now made as to the number of operation steps for the predictive processing using the predictive processing unit 14 of FIG. 7, which includes the single triple-input subtracter.

The readout of the neighboring pixel data "A", "B", "C", and "D" from the candidate prediction block storage unit 12 of FIG. 4 involves four steps.

Four steps are required to store the neighboring pixel data "A", "B", "C", and "D" using the neighboring pixel storage unit 130 of FIG. 4.

Eighteen steps are required to conduct the predictive processing using the predictive processing unit 14 of FIG. 7.

As a result, the A-mode predictive processing using the prediction unit 1 of FIG. 1 involves a total of twenty-six operation steps when the predictive processing unit 14 of FIG. 7 is employed.

When the single triple-input subtracter 147 is used as practiced in the predictive processing unit 14 of FIG. 7, then the number of operation steps results in two plus the number of pixels to be processed.

The use of the neighboring pixel series-generating unit 13 of FIG. 5 instead of the neighboring pixel series-generating unit 13 of FIG. 4 also results in a total of twenty-six operation steps for the A-mode predictive processing using the prediction unit 1 of FIG. 1 when the predictive processing unit 14 of FIG. 7 is employed.

As seen from the above, in the two-stage subtraction processing using the predictive processing unit 14, the use of the single triple-input subtracter (FIG. 7) eliminates one register (the register 143 of FIG. 6), when compared with use of the two double-input subtracters (FIG. 6). This feature reduces the total number of operation steps by one step, and thus provides a higher lever of processing performance.

As discussed above, in the prediction unit 1 according to the present embodiment, the neighboring pixel series-generating unit 13 in receipt of the neighboring pixel data "A", "B", "C", and "D" selects the data therefrom in the order in which the neighboring pixel data "A", "B", "C", and "D" are arithmetically operated. At this time, such a data selection is made for each of the series (the first and second series) that correspond to algebraic vales "Y" and "Z", respectively. The algebras "Y" and "Z" are included in the predetermined algebraic expression $((2X-Y-Z)/2)$. The neighboring pixel series-generating unit 13 feeds the selected data into the predictive processing unit 14 for each of the series (the first and second series) in the order in which the neighboring pixel data "A", "B", "C", and "D" are arithmetically operated.

More specifically, the neighboring pixel series-generating unit 13 generates the first and second neighboring pixel series, and then feeds them into the predictive processing unit 14.

The predictive processing unit 14 receives the candidate prediction pixel data in the order in which these data are arithmetically operated. The predictive processing unit 14 also receives the neighboring pixel data that are fed from the neighboring pixel series-generating unit 13 for each of the series in the order in which the neighboring pixel data are arithmetically operated. The predictive processing unit 14 arithmetically operates the received candidate prediction pixel data and the received neighboring pixel data together.

More specifically, the predictive processing unit 14 receives the candidate prediction pixel data in the order in which these data are arithmetically operated, and further receives the first and second neighboring pixel series. The received candidate prediction pixel data and the received the first and second neighboring pixel series are arithmetically operated together in the predictive processing unit 14.

In this way, the prediction unit 1 according to the present embodiment produces the first and second neighboring pixel series, thereby practicing the predictive processing.

As a result, steps of storing and generating predictive pixel data as practiced by the prior art prediction apparatus are eliminated. This feature provides the prediction unit 1 (prediction apparatus) that requires fewer operation steps and that provides a high level of processing performance.

The encoding apparatus of FIG. 1 incorporating the prediction unit 1 therein realizes enhanced processing performance.

In the present embodiment, the step of entering the neighboring pixel data "A", "B", "C", and "D" into the neighboring pixel series-generating unit 13 in order to practice vertical predictive processing is described as an example. Alternatively, the neighboring pixel data "E", "F", "G", and "H" may be fed into the neighboring pixel series-generating unit 13 in order to practice horizontal predictive processing.

In the present embodiment, the candidate prediction block storage unit 12 of FIG. 3 is described as a memory, but alternatively may be a gang of registers.

Such an alternative eliminates the switching unit 135 of FIG. 5, and connects the input line for the neighboring pixel data "A", read out from the gang of registers, to the line "AL". Similarly, the input lines for the neighboring pixel data "B", and "C", "D" are connected to the lines "BL", "CL", and "DL", respectively.

In the present embodiment, the neighboring pixel storage unit 130 of FIG. 4 is described as a gang of registers, but alternatively may be a memory that outputs the stored data according to the address signals.

In such an alternative, the switching unit 132 follows a gang of registers in order to permit the gang of registers to retain the neighboring pixel data that are read out from the memory. The gang of registers feeds the retained neighboring pixel data into the switching unit 132.

In the present embodiment, the candidate prediction block storage unit 12 stores the five-by-five pixel area to perform the predictive processing. Alternatively, the candidate prediction block storage unit 12 may store a seventeen-by-seventeen pixel area to conduct the predictive processing in order to process a sixteen-by-sixteen pixel area. A moving picture is encoded for each of the sixteen-by-sixteen pixel areas. This alternative provides similar beneficial effects.

In the present embodiment, the expression $((2X-Y-Z)/2)$ is described as a predetermined algebraic expression. This expression is exemplified as being suitable for the A-mode predictive processing that would possibly be incorporated by the H.26L-coding system.

Accordingly, the predetermined algebraic expression can be set to meet the predictive processing that is decided on being incorporated by the H.26L-coding system.

The predetermined algebraic expression is not limited to meeting the predictive processing according to the H.26L-coding system.

Accordingly, any algebraic expression may be set as a predetermined algebraic expression. As a result, a series that corresponds to each algebra included in the algebraic expression can be set.

For example, a predetermined algebraic expression can be set to satisfy any predictive processing incorporated by another coding system.

In the predetermined algebraic expression $((2X-Y-Z)/2)$ as an illustration, the multiplier 2 for multiplying "X" is an example of a predetermined multiplier. The divisor 2 is an example of a predetermined divisor.

Embodiment 2

A second embodiment is now described by taking B-mode predictive processing according to the H.26L-coding system as an example.

An encoding apparatus according to the present embodiment is similar in entire construction to that according to the previous embodiment as illustrated in FIG. 1.

Therefore, the encoding apparatus of FIG. 1 is hereinafter described as one according to the present embodiment.

Figure 8:
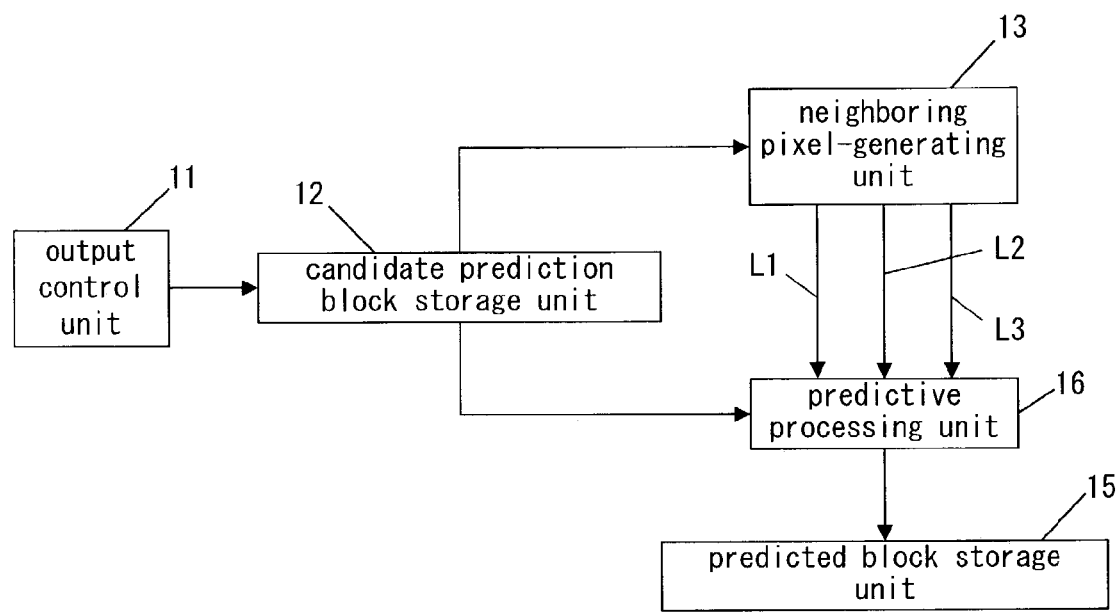
FIG. 8 is a block diagram, illustrating an exemplary prediction unit according to a second embodiment.

FIG. 8 is a block diagram, illustrating an exemplary prediction unit 1 according to the present embodiment. In FIG. 8, components similar to those of FIG. 2 are identified by the same reference characters, and descriptions related thereto are omitted.

As illustrated in FIG. 8, the prediction unit 1 includes an output control unit 11, a candidate prediction block storage unit 12, a neighboring pixel series-generating unit 13, a predictive processing unit 16, and a predicted block storage unit 15.

Figure 9:
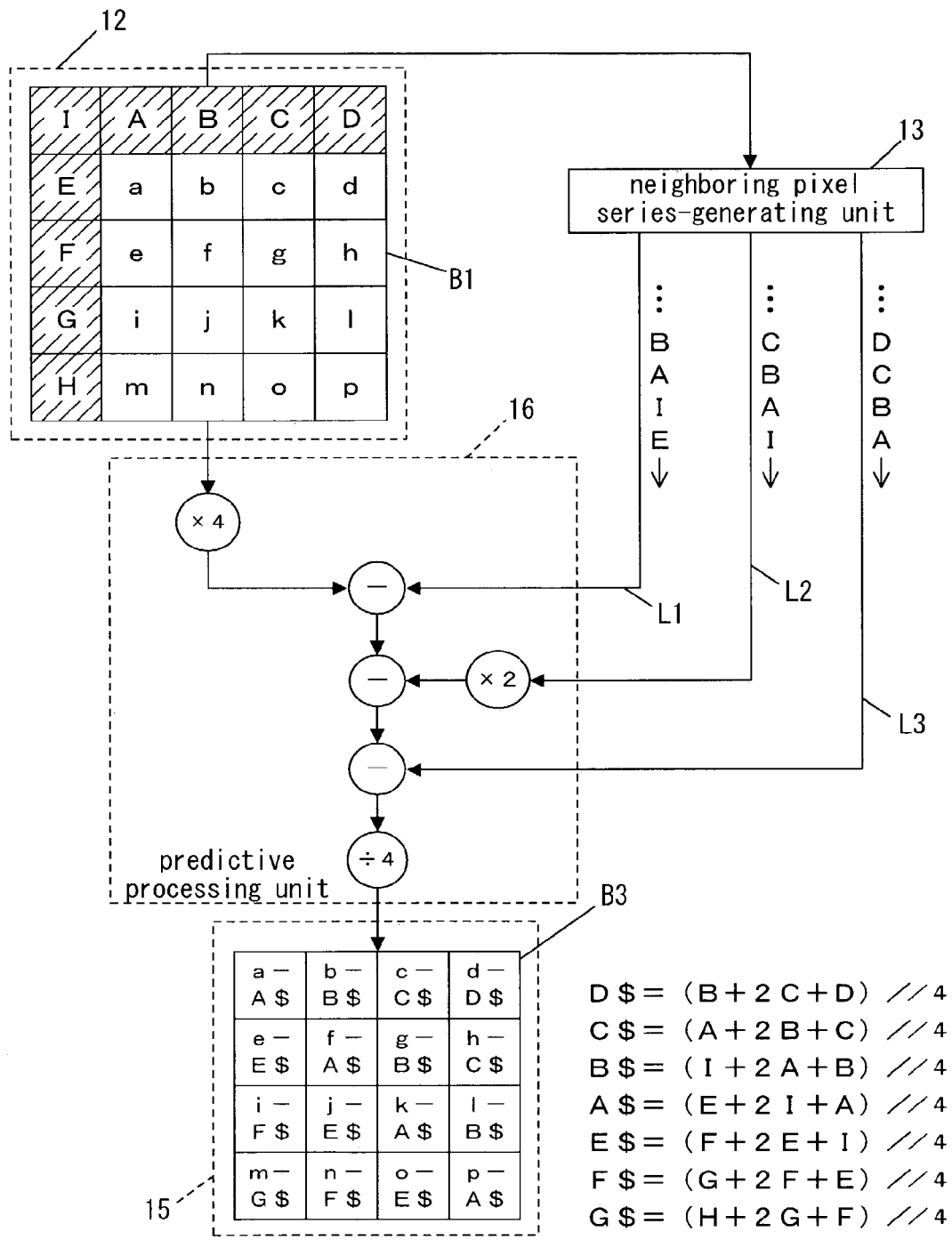
FIG. 9 is a descriptive illustration, showing the prediction unit.

FIG. 9 is a descriptive illustration, showing how the exemplary components of FIG. 8 work. In FIG. 9, the same components as those of FIG. 8 are identified by the same reference characters, and descriptions related thereto are omitted.

The following describes, with reference to FIGS. 8 and 9, how the prediction unit 1 of FIG. 1 works.

As illustrated in FIG. 9, the candidate prediction block storage unit 12 feeds candidate prediction pixel data {a, b, c, d, e, f. g, h, i, j, k, l, m, n, o, and p} into the predictive processing unit 16 in response to address signals from the output control unit 11. At this time, the candidate prediction pixel data {a, b, c, d, e, f. g, h, i, j, k, l, m, n, o, and p} are entered into the predictive processing unit 16 in the order in which the predictive processing unit 16 arithmetically operates these data.

The predictive processing unit 16 arithmetically operates the candidate prediction pixel data in the order of a, b, c, d, e, f. g, h, i, j, k, l, m, n, o, and p.

The candidate prediction block storage unit 12 feeds the neighboring pixel data {A, B, C, D, E, F, G, H, and I} into the neighboring pixel series-generating unit 13 in response to the address signals from the output control unit 11.

The neighboring pixel series-generating unit 13 in receipt of the neighboring pixel data {A, B, C, D, E, F, G, H, and I} selects the data therefrom in the order in which the predictive processing unit 16 arithmetically operate the neighboring pixel data {A, B, C, D, E, F, G, H, and I}. At this time, such a data selection is made for each series that corresponds to an algebra included in a predetermined algebraic expression. The neighboring pixel series-generating unit 13 feeds the selected data into the predictive processing unit 16 for each of the series in the order in which the predictive processing unit 14 arithmetically operates the neighboring pixel data {A, B, C, D, E, F, G, H, and I}.

The predetermined algebraic expression is $((4R-X-2Y-Z)/4)$, where R, X, Y, and Z are algebras.

The predetermine algebraic expression is set to produce predicted pixel data {"a–A\$" to "p–A\$"} of FIG. 9 using the candidate prediction pixel data {"a" to "p"} of FIG. 9 and the neighboring pixel data {"A" to "I"} of FIG. 9.

Such predictive processing for producing the predicted pixel data "a–A\$" to "p–A\$"} of FIG. 9 using the candidate prediction pixel data {"a" to "p"} of FIG. 9 and the neighboring pixel data {"A" to "I"} of FIG. 9 is B-mode predictive processing that would possibly be incorporated by the H.26L-encoding system.

The above algebraic expression as given above provides one series that corresponds to algebra X (called "a first series" according to the present embodiment), another series that corresponds to algebra "Y" (called "a second series"), and yet another series that corresponds to algebra "Z" (called "a third series").

More specifically, the neighboring pixel series-generating unit 13 selects the data from the neighboring pixel data {A, B, C, D, E, F, G, H, and I} in the order in which the predictive processing unit 16 arithmetically operates the first series, and then produces a first neighboring pixel series {E, I, A, B, F, E, I, A, G, F, E, I, H, G, F, and E} in accordance with the selected data. The neighboring pixel series-generating unit 13 feeds the first neighboring pixel series {E, I, A, B, F, E, I, A, G, F, E, I, H, G, F, and E} into a first series-related line "L1".

For the first series, the predictive processing unit 16 arithmetically operates the neighboring pixel data in the first neighboring pixel series in sequence from "E" to "E".

The neighboring pixel series-generating unit 13 selects the data from the neighboring pixel data {A, B, C, D, E, F, G, H, and I} in the order in which the predictive processing unit 16 arithmetically operates the second series, and then produces a second neighboring pixel series {I, A, B, C, E, I, A, B, F, E, I, A, G, F, E, and I} in accordance with the selected data. The neighboring pixel series-generating unit 13 feeds the second neighboring pixel series {I, A, B, C, E, I, A, B, F, E, I, A, G, F, E, and I} into a second series-related line "L2".

For the second series, the predictive processing unit 16 arithmetically operates the neighboring pixel data in the second neighboring pixel series in sequence from "I" to "I".

The neighboring pixel series-generating unit 13 selects the data from the neighboring pixel data {A, B, C, D, E, F, G, H, and I} in the order in which the predictive processing unit 16 arithmetically operates the third series, and then produces a third neighboring pixel series {A, B, C, D, I, A, B, C, E, I, A, B, F, E, I, and A} in accordance with the selected data. The neighboring pixel series-generating unit 13 feeds the third neighboring pixel series {A, B, C, D, I, A, B, C, E, I, A, B, F, E, I, and A} into a third series-related line "L3".

For the third series, the predictive processing unit 16 arithmetically operates the neighboring pixel data in the third neighboring pixel series in sequence from "A" to "A".

The predictive processing unit 16 carries out the predictive processing in accordance with the predetermined algebraic expression as mentioned above. The following more specifically discusses the predictive processing.

The predictive processing unit 16 receives the candidate prediction pixel data {"a" to "p"} in the order in which these data are arithmetically operated.

The predictive processing unit 16 receives the first neighboring pixel series {"E" to "E"} through the first series-related line "L1" in the order in which these data are arithmetically operated.

The predictive processing unit 16 receives the second neighboring pixel series {"I" to "I"} through the second series-related line "L2" in the order in which these data are arithmetically operated.

The predictive processing unit 16 receives the third neighboring pixel series {"A" to "A"} through the third series-related line "L3" in the order in which these data are arithmetically operated.

The predictive processing unit 16 subtracts the neighboring pixel data in the first neighboring pixel series from multiplied data that is obtained by multiplying the candidate prediction pixel data by four. As a result, subtracted data is provided.

The predictive processing unit 16 subtracts, from the subtracted data, multiplied data that is obtained by multiplying the neighboring pixel data in the second neighboring pixel series by two. As a result, further subtracted data is provided.

The predictive processing unit 16 subtracts the neighboring pixel data in the third neighboring pixel series from the further subtracted data, thereby providing ultimately subtracted data.

The predictive processing unit 16 divides the ultimately subtracted data by four, thereby providing predicted pixel data {a−A$, b−B$, c−C$, d−D$, e−E$, f−A$, g−B$, h−C$, i−F$, j−E$, k−A$, l−B$, m−G$, n−F$, o−E$, and p−A$}.

These sixteen pieces of predicted pixel data {"a−A$" to "p−A$"} form a predicted block B3.

The predicted block storage unit 15 stores the predicted block B3 that is provided by the predictive processing unit 16. The predicted block storage unit 15 is a gang of registers, or alternatively a memory that outputs the data in response to the address signals.

The predicted pixel data {"D$", "C$", "B$", "A$", "E$", "F$", and "G$"} are expressed as follows: D$=(B+2C+D)//4; C$=(A+2B+C)//4; B$=(1+2A+B)//4; A$=(E+2I+A)//4; E$=(F+2E+I)//4; F$=(G+2F+E)//4; and G$=(H+2G+F)//4. The symbol "//" denotes round-off after division.

The following describes details of the neighboring pixel series-generating unit 13 of FIG. 9. A first example of the neighboring pixel series-generating unit 13 is initially discussed.

Figure 10:
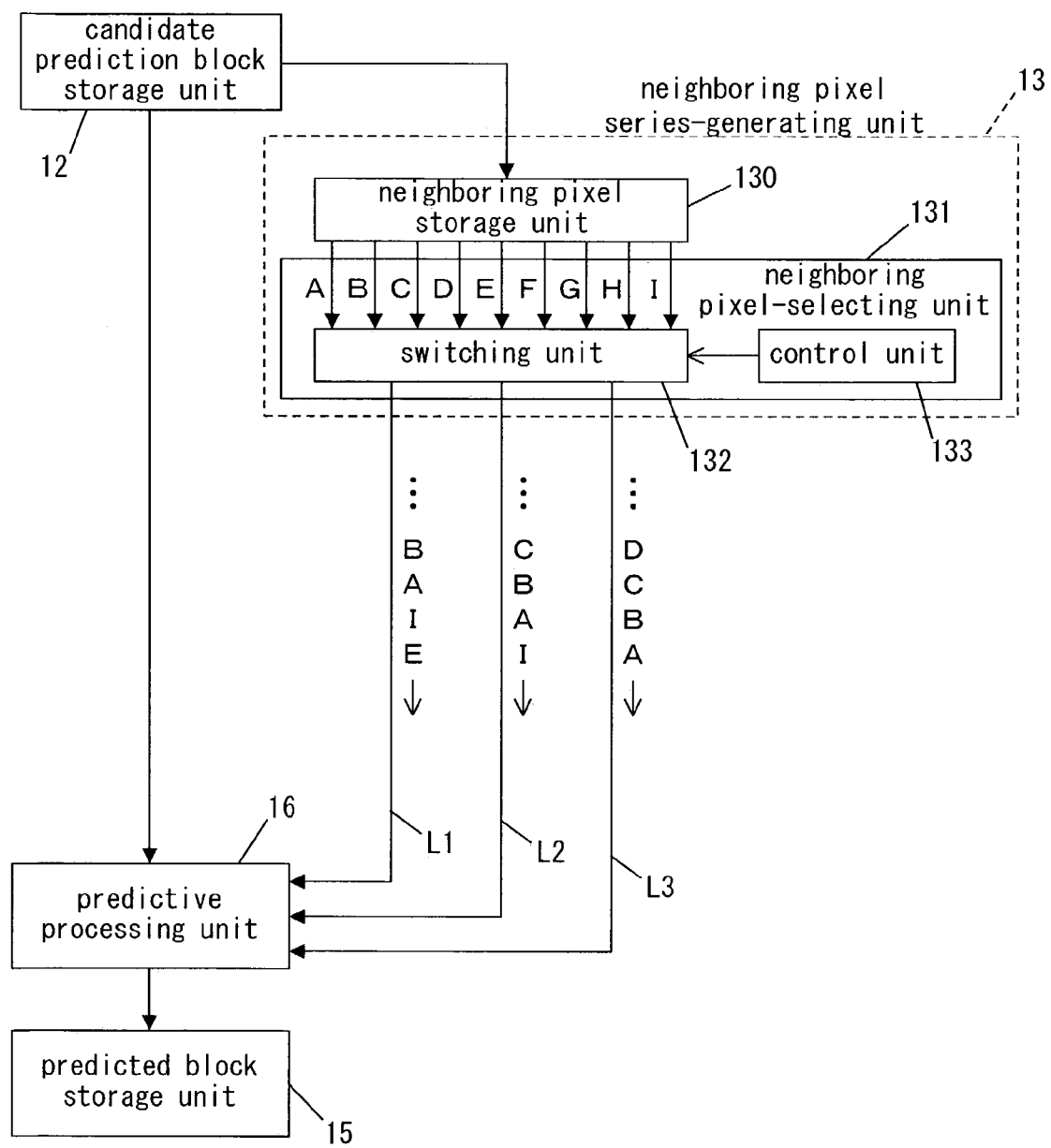
FIG. 10 is an illustration, showing an exemplary example of a neighboring pixel series-generating unit of FIG. 8.

FIG. 10 is an illustration, showing an exemplary first example of the neighboring pixel series-generating unit 13 of FIG. 9. In FIG. 10, the same components as those of FIG. 9 are identified by the same reference characters, and descriptions related thereto are omitted.

As illustrated in FIG. 10, the neighboring pixel series-generating unit 13 includes a neighboring pixel storage unit 130 and a neighboring pixel-selecting unit 131.

The neighboring pixel-selecting unit 131 includes a switching unit 132 and a control unit 133.

The neighboring pixel series-generating unit 13 receives the nine pieces of neighboring pixel data {A, B, C, D, E, F, G, H, and I} in sequence from the candidate prediction block storage unit 12.

The neighboring pixel storage unit 130 stores the sequentially entered neighboring pixel data {A, B, C, D, E, F, G, H, and I}. The neighboring pixel storage unit 130 is a gang of registers.

The neighboring pixel storage unit 130 parallel-feeds the neighboring pixel data {A, B, C, D, E, F, G, H, and I} into the switching unit 132.

The switching unit 132 connects each line selected from nine lines in which the neighboring pixel data {A, B, C, D, E, F, G, H, and I} are entered, to the first series-related line "L1" in response to instructions from the control unit 133. At this time, such a line selection is made in the order in which the predictive processing unit 16 arithmetically operates the first series.

As a result the neighboring pixel data are fed into the line "L1" in the order in which the first series is arithmetically operated.

More specifically, the data selected in the order in which the first series is arithmetically operated provide the first neighboring pixel series {"E" to "E"}. The first neighboring series {"E" to "E"} is entered into the first series-related line "L1".

The switching unit 132 connects each line selected from the nine lines in which the neighboring pixel data {A, B, C, D, E, F, G, H, and I} are entered, to the second series-related line "L2" in response to instructions from the control unit 133. At this time, such a line selection is made in the order in which the predictive processing unit 16 arithmetically operates the second series.

As a result the neighboring pixel data are fed into the line "L2" in the order in which the second series is arithmetically operated.

More specifically, the data selected in the order in which the second series is arithmetically operated provide the second neighboring pixel series {"I" to "I"}. The second neighboring pixel series {I"I" to "I"} is entered into the second series-related line "L2"

The switching unit 132 connects each line selected from the nine lines in which the neighboring pixel data {A, B, C, D, E, F, G, H, and I} are entered, to the third series-related line "L3" in response to instructions from the control unit 133. At this time, such a line selection is made in the order in which the predictive processing unit 16 arithmetically operates the third series.

As a result, the neighboring pixel data are fed into the line "L3" in the order in which the third series is arithmetically operated.

More specifically, the data selected in the order in which the third series is arithmetically operated provide the third neighboring pixel series {A"A" to "A"}. The third neighboring pixel series {"A" to "A"} is entered into the third series-related line "L3"

The first, second, and third neighboring pixel series are delayed by the control of the control unit 133, thereby feeding the delayed first, second, and third neighboring pixel series into the lines "L1", "L2", and "L3" from the switching unit 132, respectively. This step is described later in detail.

A second example of the neighboring pixel series-generating unit 13 of FIG. 9 is now described.

Figure 11:
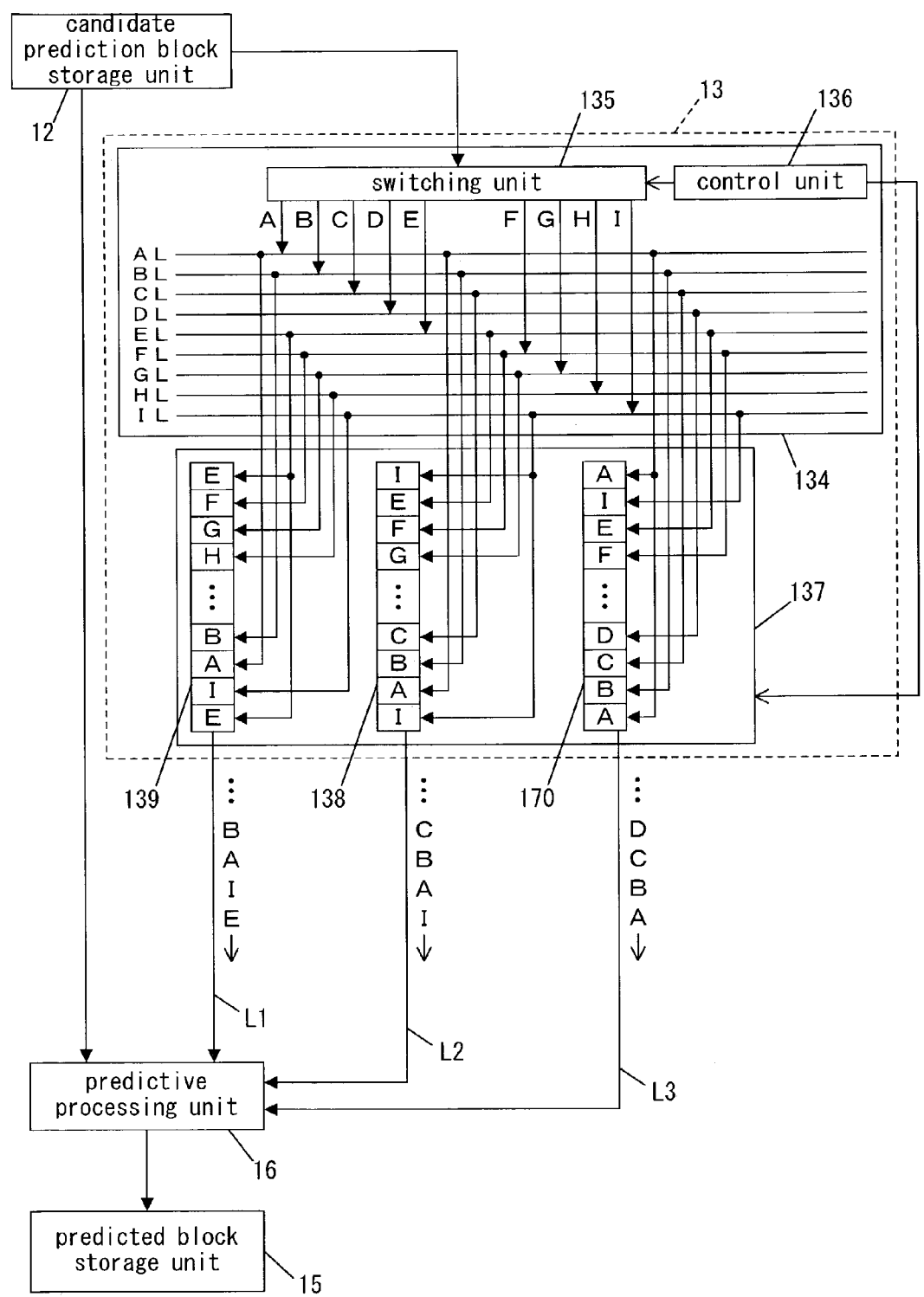
FIG. 11 is an illustration, showing another exemplary example of the neighboring pixel series-generating unit.

FIG. 11 is an illustration, showing the exemplary second example of the neighboring pixel series-generating unit 13 of FIG. 9. In FIG. 11, the same components as those of FIG. 9 are identified by the same reference characters, and descriptions related thereto are omitted.

As illustrated in FIG. 11, the neighboring pixel series-generating unit 13 includes a neighboring pixel-selecting unit 134 and a neighboring pixel storage unit 137.

The neighboring pixel-selecting unit 134 includes a switching unit 135 and a control unit 136.

The neighboring pixel storage unit 137 includes neighboring pixel series storage units 139, 138, and 170 that correspond to the lines "L1", "L2", and "L3", respectively.

When the neighboring pixel data "A" enters the neighboring pixel series-generating unit 13, then the switching unit 135 connects a line in which the neighboring pixel data "A" is entered, to a line "AL" in response to instructions from the control unit 136.

When the neighboring pixel data "B" enters the neighboring pixel series-generating unit 13, then the switching unit 135 connects a line in which the neighboring pixel data "B" is entered, to a line "BL" in response to instructions from the control unit 136.

When the neighboring pixel data "C" enters the neighboring pixel series-generating unit 13, then the switching unit 135 connects a line in which the neighboring pixel data "C" is entered, to a line "CL" in response to instructions from the control unit 136.

When the neighboring pixel data "D" enters the neighboring pixel series-generating unit 13, then the switching unit 135 connects a line in which the neighboring pixel data "D" is entered, to a line "DL" in response to instructions from the control unit 136.

When the neighboring pixel data "E" enters the neighboring pixel series-generating unit 13, then the switching unit 135 connects a line in which the neighboring pixel data "E" is entered, to a line "EL" in response to instructions from the control unlit 136.

When the neighboring pixel data "F" enters the neighboring pixel series-generating unit 13, then the switching unit 135 connects a line in which the neighboring pixel data "F" is entered, to a line "FL" in response to instructions from the control unit 136.

When the neighboring pixel data "G" enters the neighboring pixel series-generating unit 13, then the switching unit 135 connects a line in which the neighboring pixel data "G" is entered, to a line "GL" in response to instructions from the control unit 136.

When the neighboring pixel data "H" enters the neighboring pixel series-generating unit 13, then the switching unit 135 connects a line in which the neighboring pixel data "H" is entered, to a line "HL" in response to instructions from the control unit 136.

When the neighboring pixel data "I" enters the neighboring pixel series-generating unit 13, then the switching unit 135 connects a line in which the neighboring pixel data "I" is entered, to a line "IL" in response to instructions from the control unit 136.

As described above, the switching unit 135 feeds the neighboring pixel data {A, B, C, D, E, F, G, H, and I} into the lines "AL" to "IL" that correspond to the neighboring pixel data A, B, C, D, E, F, G, H, and I, respectively.

Some of the lines "AL" to "IL" are wired to the first series-related neighboring pixel series storage unit 139 at predetermined storage positions in the order in which the predictive processing unit 16 arithmetically operates the first series. Some of the lines "AL" to "IL" are wired to the second series-related neighboring pixel series storage unit 138 at predetermined storage positions in the order in which the predictive processing unit 16 arithmetically operates the second series. Some of the lines "AL" to "IL" are wired to the third series-related neighboring pixel series storage unit 170 at predetermined storage positions in the order in which the predictive processing unit 16 arithmetically operates the third series.

Accordingly, the first series-related neighboring pixel series storage unit 139 stores the neighboring pixel data in the order in which the first series is arithmetically operated.

More specifically, the first series-related neighboring pixel series storage unit 139 stores the first neighboring pixel series {"E" to "E"} that consists of the neighboring pixel data aligned in the order in which the first series is arithmetically operated. Similarly, the second series-related neighboring pixel series storage unit 138 stores the neighboring pixel data in the order in which the second series is arithmetically operated.

More specifically, the second series-related neighboring pixel series storage unit 138 stores the second neighboring pixel series {"I" to "I"} that consists of the neighboring pixel data aligned in the order in which the second series is arithmetically operated.

The third series-related neighboring pixel series storage unit 170 stores the neighboring pixel data in the order in which the third series is arithmetically operated.

More specifically, the third series-related neighboring pixel series storage unit 170 stores the third neighboring pixel series {"A" to "A"} that consists of the neighboring pixel data aligned in the order in which the third series is arithmetically operated.

The wired lines "AL" to "IL" as described above permit the neighboring pixel data "A" to be concurrently written to the neighboring pixel series storage units 138, 139, and 170 at corresponding storage positions. Similarly, the other neighboring pixel data are concurrently written thereto at corresponding storage positions.

This means that the neighboring pixel data "A" can be written at a single step to the neighboring pixel series storage units 138, 139, and 170 at corresponding storage positions. Similarly, the remaining neighboring pixel data can be written at a single step thereto at corresponding storage positions.

The first series-related neighboring pixel series storage unit 139 feeds the stored neighboring pixel data into the first series-related line "L1" in the order in which these data are subjected to predictive processing.

More specifically, the first series-related neighboring pixel series storage unit 139 feeds the stored first neighboring pixel series into the first series-related line "L1".

Similarly, the second series-related neighboring pixel series storage unit 138 feeds the stored neighboring pixel data into the second series-related line "L2" in the order in which these data experience the predictive processing More specifically, the second series-related neighboring pixel series storage unit 138 feeds the stored second neighboring pixel series into the second series-related line "L2".

Similarly, the third series-related neighboring pixel series storage unit 170 feeds the stored neighboring pixel data into the third series-related line "L3" in the order in which these data experience the predictive processing More specifically, the third series-related neighboring pixel series storage unit 170 feeds the stored third neighboring pixel series into the third series-related line "L3".

The first, second, and third neighboring pixel series are delayed by the control of the control unit 136, thereby feeding the delayed first, second, and third neighboring pixel series into the lines "L1", "L2", and "L3" from the neighboring pixel series storage unit 139, 138, and 170, respectively. This step is described later in detail.

Next, details of the predictive processing unit 16 of FIG. 9 are described. A first example of the predictive processing unit 16 of FIG. 9 is initially described. In the following description, the candidate prediction pixel data "a" of FIG. 9 is illustrated as data subject to the predictive processing.

Figure 12:
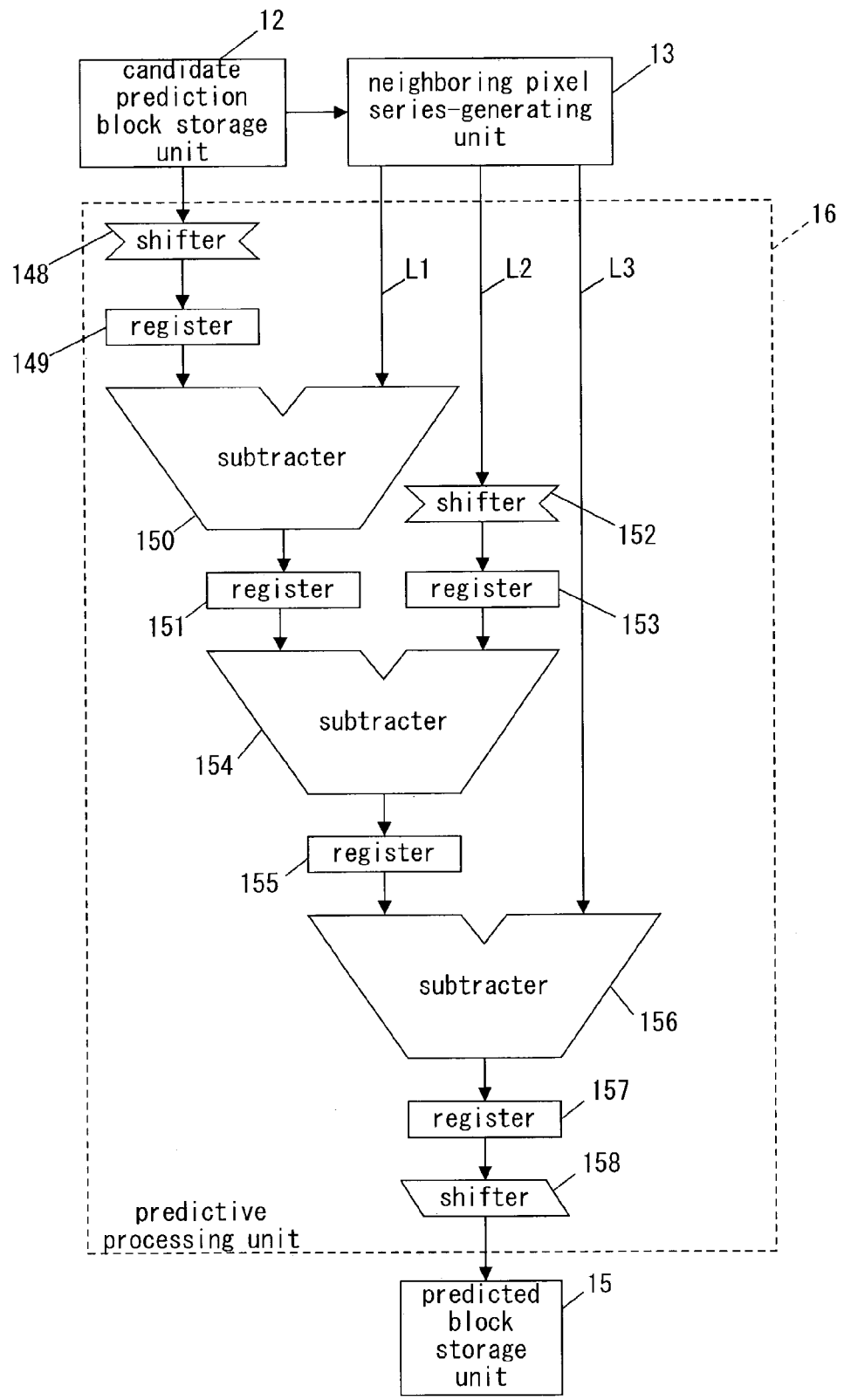
FIG. 12 is an illustration, showing an exemplary example of a predictive processing unit of FIG. 8.

FIG. 12 is an illustration, showing the exemplary first example of the predictive processing unit 16 of FIG. 9. In FIG. 12, the same components as those of FIG. 9 are identified by the same reference characters, and descriptions related thereto are omitted.

As illustrated in FIG. 12, the predictive processing unit 16 includes shifters 148 and 152, registers 149, 151, 153, 155, and 157, double-input subtracters 150, 154, and 156, and a shifter 158.

As illustrated in FIG. 12, the candidate prediction block storage unit 12 reads out the candidate prediction pixel data "a" into the shifter 148.

The shifter 148 multiplies the candidate prediction pixel data "a" by four, thereby providing multiplied data "4a". The shifter 148 is a multiplying unit. The shifter 148 is able to horizontally shift.

The shifter 148 feeds the multiplied data "4a" into the register 149.

The subtracter 150 receives the multiplied data "4a" from the register 149. The subtracter 150 also receives the neighboring pixel data "E" from the first neighboring pixel series through the first series-related line "L1".

At this time, the first neighboring pixel series is delayed by time "t" with reference to the output of the candidate prediction pixel data from the candidate prediction block storage unit 12, thereby supplying the delayed first neighboring pixel series to the subtracter 150. As a result, the subtracter 150 concurrently receives the multiplied data "4a" from the shifter 148 and the neighboring pixel data "E" from the first neighboring pixel series.

The subtracter 150 subtracts the neighboring pixel data "E" from the multiplied data "4a", thereby providing subtracted data "4a–E".

The subtracter 150 feeds the subtracted data "4a–E" into the register 151.

The shifter 152 receives the neighboring pixel data "I" from the second neighboring pixel series through the line "L2".

At this time, the second neighboring pixel series is delayed by time "t" with reference to the output of the candidate prediction pixel data from the candidate prediction block storage unit 12, thereby entering the delayed second neighboring pixel series into the shifter 152.

As a result, the neighboring pixel data "I" is entered into the shifter 152 from the second neighboring pixel series in simultaneous with the moment when the neighboring pixel data "E" is fed into the subtracter 150 from the first neighboring pixel series.

The shifter 152 multiplies the entered neighboring pixel data "I" by two, thereby providing multiplied data "2I".

The shifter 152 feeds the multiplied data "2I" into the register 153. The shifter 152 is a multiplying unit. The shifter 152 is designed for horizontal shifting.

The subtracter 154 simultaneously receives the subtracted data "4a–E" from the register 151 and the multiplied data "2I" from the register 153.

The subtracter 154 subtracts the multiplied data "2I" from the subtracted data "4a–E", thereby providing subtracted data "4a–E–2I".

The subtracter 154 feeds the subtracted data "4a–E–2I" into the register 155.

The subtracter 156 receives the subtracted data "4a–E–2I" from the register 155. The subtracter 156 also receives the neighboring pixel data "A" from the third neighboring pixel series through the line "L3".

At this time, the third neighboring pixel series is delayed by time "t" with reference to the output of the subtracted data from the subtracter 154, thereby supplying the delayed third neighboring pixel series to the subtracter 156. As a result, the subtracter 156 concurrently receives the subtracted data "4a–E–2I" from the subtracter 154 and the neighboring pixel data "A" from the third neighboring pixel series.

The subtracter 156 subtracts the neighboring pixel data "A" from the subtracted data "4a–E–2I", thereby providing subtracted data "4a–E–2I–A".

The subtracter 156 feeds the subtracted data "4a–E–2I–A" into the register 157.

The shifter 158 receives the subtracted data "4a–E–2I–A" from the register 157.

The shifter 158 divides the subtracted data "4a–E–2I–A" by four, thereby providing predicted pixel data "a–(E+2I+A)//4". The shifter 158 is a dividing unit. The shifter 158 is limited to rightward shifting.

The shifter 158 feeds the predicted pixel data "a–(E+2I+A)//4" into the predicted block storage unit 15.

In this way, the predictive processing unit 16 arithmetically operates together the sequentially entered candidate prediction pixel data, the sequentially entered neighboring pixel data from the first neighboring pixel series, the sequentially entered neighboring pixel data from the second neighboring pixel series, and the sequentially entered neighboring pixel data from the third neighboring pixel series. As a result, the predicted pixel data are produced in sequence.

Next, a second example of the predictive processing unit 16 of FIG. 9 is described. In this example, the candidate prediction pixel data "a" of FIG. 9 is illustrated as data subject to the predictive processing.

Figure 13:
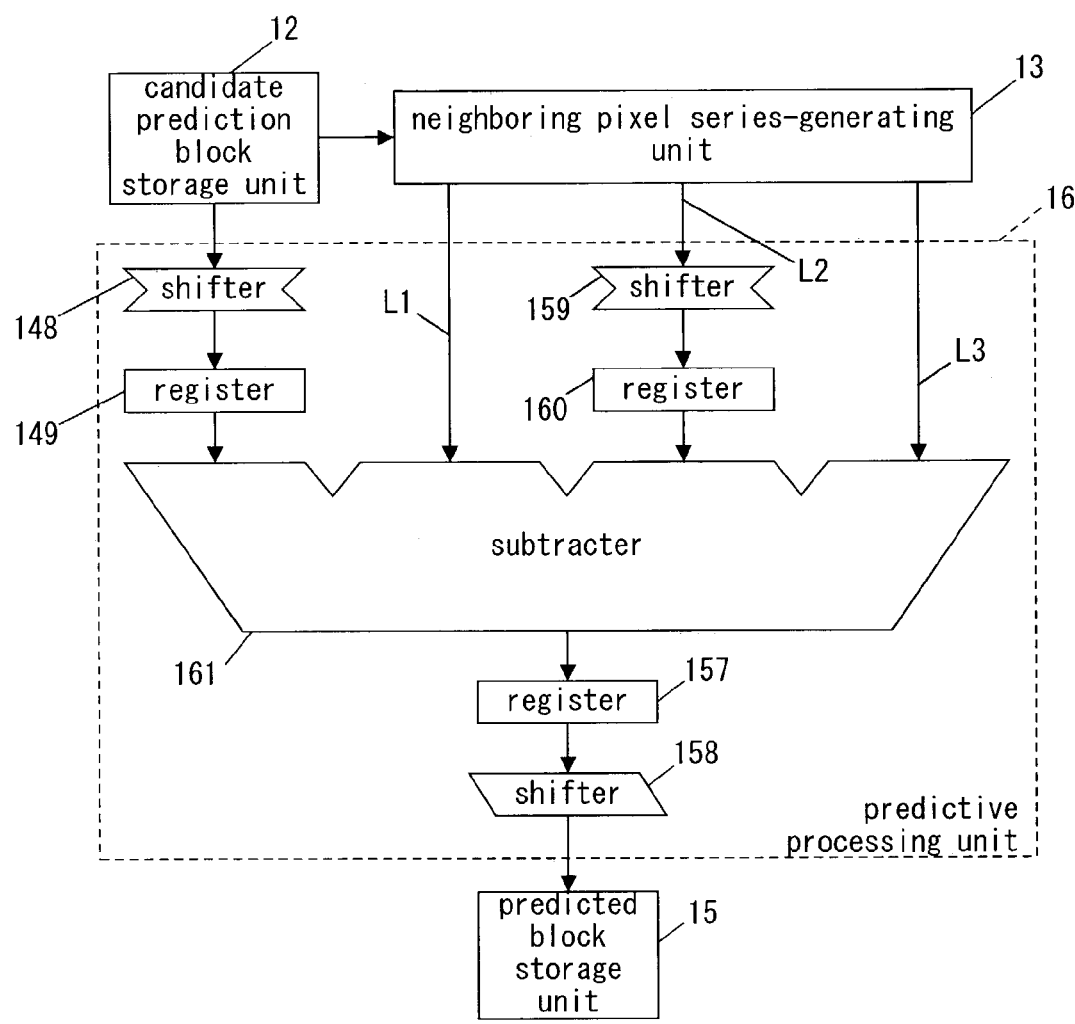
FIG. 13 is an illustration, showing another exemplary example of the predictive processing unit.

FIG. 13 is an illustration, showing the exemplary second example of the predictive processing unit 16 of FIG. 9. In FIG. 13, the same components as those of FIG. 9 or FIG. 12 are identified by the same reference characters, and description related thereto are omitted.

As illustrated in FIG. 13, the predictive processing unit 16 includes shifters 148 and 159, registers 149, 160, and 157, a quadruple-input subtracter 161, and a shifter 158.

As illustrated in FIG. 13, the shifter 159 receives the neighboring pixel data "I" from the second neighboring pixel series through the line "L2" in concurrent with the moment when the shifter 148 receives the candidate prediction pixel data "a".

The shifter 159 multiplies the neighboring pixel data "I" by two, thereby providing multiplied data "2I".

The shifter 159 feeds the multiplied data "2I" into the register 160. The shifter 159 is a multiplying unit. The shifter 159 is designed for horizontal shifting.

The subtracter 161 receives the following: multiplied data "4a" from the shifter 148 through the register 149; neighboring pixel data "E" from the first neighboring pixel series through the first series-related line "L1"; the multiplied data "2I" from the register 160; and neighboring pixel data "A" from the third neighboring pixel series through the third series-related line "L3".

At this time, the first and third neighboring pixel series are delayed by time "t" with reference to the output of the candidate prediction pixel data from the candidate prediction block storage unit 12, thereby supplying the delayed first and third neighboring pixel series to the subtracter 161. As a result, the subtracter 161 concurrently receives the multiplied data "4a", from the shifter 148, the neighboring pixel data "E" from the first neighboring pixel series, the multiplied data "2I" from the shifter 159, and the neighboring pixel data "A" from the third neighboring pixel series.

The subtracter 161 subtracts the neighboring pixel data "E" from the multiplied data "4a", thereby providing subtracted data "4a–E". The subtracter 161 then subtracts the multiplied data "2I" from the subtracted data "4a–E", thereby providing subtracted data "4a–E–2I". The subtracter 161 subtracts the neighboring pixel data "A" from the subtracted data "4a–E–2I", thereby providing ultimately subtracted data "4a–E–2I–A".

The subtracter 161 feeds the ultimately subtracted data "4a–E–2I–A" into the register 157.

The shifter 158 receives the ultimately subtracted data "4a–E–2I–A" from the register 157.

The shifter 158 divides the ultimately subtracted data "4a–E–2I–A" by four, thereby providing predicted pixel data "a–(E+2I+A)//4".

The shifter 158 feeds the predicted pixel data "a–(E+2I+A)//4" into the predicted block storage unit 15.

In this way, the predictive processing unit 16 arithmetically operates together the sequentially entered candidate prediction pixel data, the sequentially entered neighboring pixel data from the first neighboring pixel series, the sequentially entered neighboring pixel data from the second neighboring pixel series, and the sequentially entered neighboring pixel data from the third neighboring pixel series. As a result the predicted pixel data are produced in sequence.

Next, the number of operation steps is discussed for the predictive processing using the predictive processing unit 16 of FIG. 12, which includes the three double-input subtracters.

The readout of the neighboring pixel data {A, B, C, D, E, F, G, H, and I} from the candidate prediction block storage unit 12 of FIG. 10 involves nine steps.

Nine steps are required to store the neighboring pixel data {A, B, C, D, E, F, G, H, and I} using the neighboring pixel storage unit 130 of FIG. 10.

Twenty steps are required to conduct the predictive processing using the predictive processing unit 16 of FIG. 12.

As a result, the B-mode predictive processing using the prediction unit 1 of FIG. 1 involves a total of thirty-eight operation steps when the predictive processing unit 16 of FIG. 12 is employed.

The subtracters 150, 154, and 156 in the predictive processing unit 16 of FIG. 12 support vector instructions. In this case, the number of operation steps is equal to four plus the number of pixels to be processed.

The use of the neighboring pixel series-generating unit 13 of FIG. 11 instead of the neighboring pixel series-generating unit 13 of FIG. 10 involves nine steps to store the neighboring pixel data {A, B, C, D, E, F, G, H, and I} using permit the neighboring pixel series storage units 138, 139, and 170.

Similar to the use of the neighboring pixel series-generating unit 13 of FIG. 10, nine steps are required to read out the neighboring pixel data {A, B, C, D, E, F, G, H, and I} from the neighboring pixel series-generating unit 13 of FIG. 11. The predictive processing using the predictive processing unit 16 of FIG. 12 requires twenty steps.

As a result the use of the neighboring pixel series-generating unit 13 of FIG. 11 instead of the neighboring pixel series-generating unit 13 of FIG. 10 also results in a total of thirty-eight operation steps for the B-mode predictive processing using the prediction unit 1 of FIG. 1 when the predictive processing unit 16 of FIG. 12 is employed.

Meanwhile, B-mode predictive processing using the prior art prediction apparatus requires a total of seventy-one steps.

As evidenced by the above, the present embodiment provides a substantially reduced number of operation steps for the B-mode predictive processing, and thus provides a high level of processing performance.

Another discussion is now made as to the number of operation steps for the predictive processing using the predictive processing unit 16 of FIG. 13, which includes the single quadruple-input subtracter.

The readout of the neighboring pixel data {A, B, C, D, E, F, G, H, and I} from the candidate prediction block storage unit 12 of FIG. 10 involves nine steps.

Nine steps are required to store the neighboring pixel data {A, B, C, D, E, F, G, H, and I} using the neighboring pixel storage unit 130 of FIG. 10.

Eighteen steps are required to practice the predictive processing using the predictive processing unit 16 of FIG. 13.

As a result, the B-mode predictive processing using the prediction unit 1 of FIG. 1 involves a total of thirty-six operation steps when the predictive processing unit 16 of FIG. 13 is employed.

When the single quadruple-input subtracter 161 is used as practiced in the predictive processing unit 16 of FIG. 13, then the number of operation steps results in two plus the number of pixels to be processed.

The use of the neighboring pixel series-generating unit 13 of FIG. 11 instead of the neighboring pixel series-generating unit 13 of FIG. 10 also results in a total of thirty-six operation steps for the B-mode predictive processing using the prediction unit 1 of FIG. 1 when the predictive processing unit 16 of FIG. 13 is employed.

As seen from the above, in the three-stage subtraction processing using the predictive processing unit 16, the use of the single quadruple-input subtracter (FIG. 13) eliminates two registers (the registers 151, 155 of FIG. 12), when compared with use of the three double-input subtracters (FIG. 12). This feature reduces the total number of operation steps by two steps, and thus provides a higher level of processing performance.

As discussed above, in the prediction unit 1 according to the present embodiment, the neighboring pixel series-generating unit 13 in receipt of the neighboring pixel data {A, B, C, D, E, F, G, H, and I} selects the data therefrom in the order in which the neighboring pixel data {A, B, C, D, E, F, G, H, and I} are arithmetically operated. At this time, such a data selection is made for each of the series (the first second series, and third series) that correspond to algebraic vales "X", "Y", and "Z", respectively. The algebraic vales "X", "Y", and "Z" are included in the predetermined algebraic expression ((4R−X−2Y−Z)/4). The neighboring pixel series-generating unit 13 feeds the selected data into the predictive processing unit 16 for each of the series in the order in which the neighboring pixel data {A, B, C, D, E, F, G, H, and I} are arithmetically operated.

More specifically, the neighboring pixel series-generating unit 13 generates the first, second, and third neighboring pixel series, and then feeds them into the predictive processing unit 16.

The predictive processing unit 16 receives the candidate prediction pixel data in the order in which these data are arithmetically operated. The predictive processing unit 16 also receives the neighboring pixel data that are fed from the neighboring pixel series-generating unit 13 for each of the series in the order in which the neighboring pixel data are arithmetically operated. The predictive processing unit 16 arithmetically operates the received candidate prediction pixel data and the received neighboring pixel data together.

More specifically, the predictive processing unit 16 receives the candidate prediction pixel data in the order in which these data are arithmetically operated, and further receives the first, second, and third neighboring pixel series. As a result, the received candidate prediction pixel data and the received the first, second, and third neighboring pixel series are arithmetically operated together in the predictive processing unit 16.

As seen from the above, the prediction unit 1 according to the present embodiment generates the first, second, and third neighboring pixel series, thereby practicing the predictive processing.

As a result, steps of storing and generating predictive pixel data as practiced by the prior art prediction apparatus are eliminated. This feature provides the prediction unit 1 (prediction apparatus) that requires fewer operation steps and that provides a high level of processing performance.

The encoding apparatus of FIG. 1 that incorporates the prediction unit 1 therein realizes enhanced processing performance.

In the present embodiment, the candidate prediction block storage unit 12 of FIG. 9 is described as a memory, but alternatively may be a gang of registers.

Such an alternative eliminates the switching unit 135 of FIG. 11, and connects the input line for the neighboring pixel data "A", read out from the gang of registers, to the line "AL". Similarly, the input lines for the neighboring pixel data "B", "C", "D", "E", "F", "G", "H", and "I" are connected to the lines "BL", "CL", "DL", "EL", "FL", "GL", "HL", and "IL", respectively.

In the present embodiment, the neighboring pixel storage unit 130 of FIG. 10 is described as a gang of registers, but alternatively may be a memory that outputs the stored data according to the address signals.

In such an alternative, the switching unit 132 follows a gang of registers in order to permit the gang of registers to retain the neighboring pixel data that are read out from the memory. The gang of registers feeds the retained neighboring pixel data into the switching unit 132.

In the present embodiment, the candidate prediction block storage unit 12 stores the five-by-five pixel area to practice the predictive processing. Alternatively, the candidate prediction block storage unit 12 may store a seventeen-by-seventeen pixel area to practice the predictive processing in order to process a sixteen-by-sixteen pixel area. A moving picture is encoded for each of the sixteen-by-sixteen pixel areas. As a result, this alternative also provides similar beneficial effects.

The predictive processing unit 14 of FIG. 2 is used. The first and second neighboring pixel series as described in the first embodiment are produced using the neighboring pixel series-generating unit 13 of FIG. 8. The produced first and second neighboring pixel series are fed into the predictive processing unit 14 of FIG. 2. As a result, the A-mode predictive processing according to the H.26L-coding system is executable.

In the present embodiment the expression ((4R−X−2Y−Z)/4) is illustrated as a predetermined algebraic expression. This expression is exemplified as being suitable for the B-mode predictive processing that would possibly be incorporated by the H.26L-coding system.

Accordingly, the predetermined algebraic expression can be set to meet the predictive processing that is decided on being incorporated by the H.26L-coding system.

The predetermined algebraic expression is not limited to meeting the predictive processing according to the H.26L-coding system.

Accordingly, any algebraic expression may be set as a predetermined algebraic expression. As a result, a series that corresponds to each algebra included in the algebraic expression can be set.

For example, a predetermined algebraic expression can be set to satisfy any predictive processing incorporated by another coding system.

In the predetermined algebraic expression ((4R−X−2Y−Z)/4) as an illustration, the multiplier 4 for multiplying "R" is an example of a predetermined first multiplier. The multiplier 2 for multiplying "Y" is an example of a predetermined second multiplier. The divisor 4 is an example of a predetermined divisor.

Embodiment 3

A third embodiment illustrates a decoding apparatus for decoding encoded data that is obtained by orthogonally transforming, quantizing, and variable-length encoding predicted pixel data. The predicted pixel data are produced using the predictive processing according to the first embodiment, i.e., using the A-mode predictive processing according to the H.26L-coding system.

Figure 14:
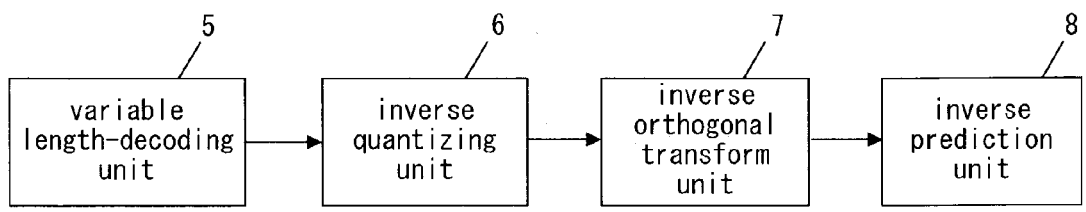
FIG. 14 is a block diagram, illustrating an exemplary decoding apparatus according to a third embodiment.

FIG. 14 is a block diagram, illustrating an exemplary decoding apparatus according to the third embodiment. As illustrated in FIG. 14, the decoding apparatus includes a variable length-encoding unit 5, an inverse quantizing unit 6, an inverse orthogonal transform unit 7, and an inverse prediction unit 8.

The variable length-decoding unit 5 executes the variable-length decoding of the encoded data. The inverse quantizing unit 6 inversely quantizes the decoded data from the variable length-decoding unit 5.

The inverse orthogonal transform unit 7 inversely orthogonally transforms the inversely quantized data from the inverse quantizing unit 6. In this instance, inverse discrete cosine transformation (IDCT), e.g., is employed as inverse orthogonal transformation.

The inverse prediction unit 8 performs the inverse predictive processing of the inversely orthogonally transformed data from the inverse orthogonal transform unit 7. The inversely orthogonally transformed data is inverse candidate prediction pixel data.

Figure 15:
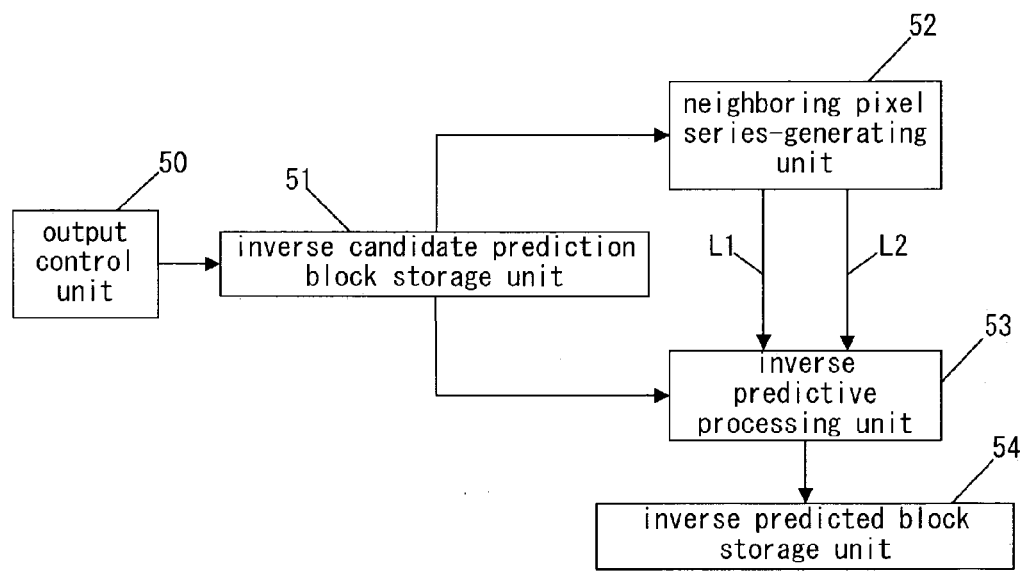
FIG. 15 is a block diagram, illustrating an exemplary inverse prediction unit of FIG. 14.

FIG. 15 is a block diagram, illustrating the exemplary inverse prediction unit 8 of FIG. 14. As illustrated in FIG. 15, the inverse prediction unit 8 includes an output control unit 50, an inverse candidate prediction block storage unit 51, a neighboring pixel series-generating unit 52, an inverse predictive processing unit 53, and an inverse predicted block storage unit 54.

Figure 16:
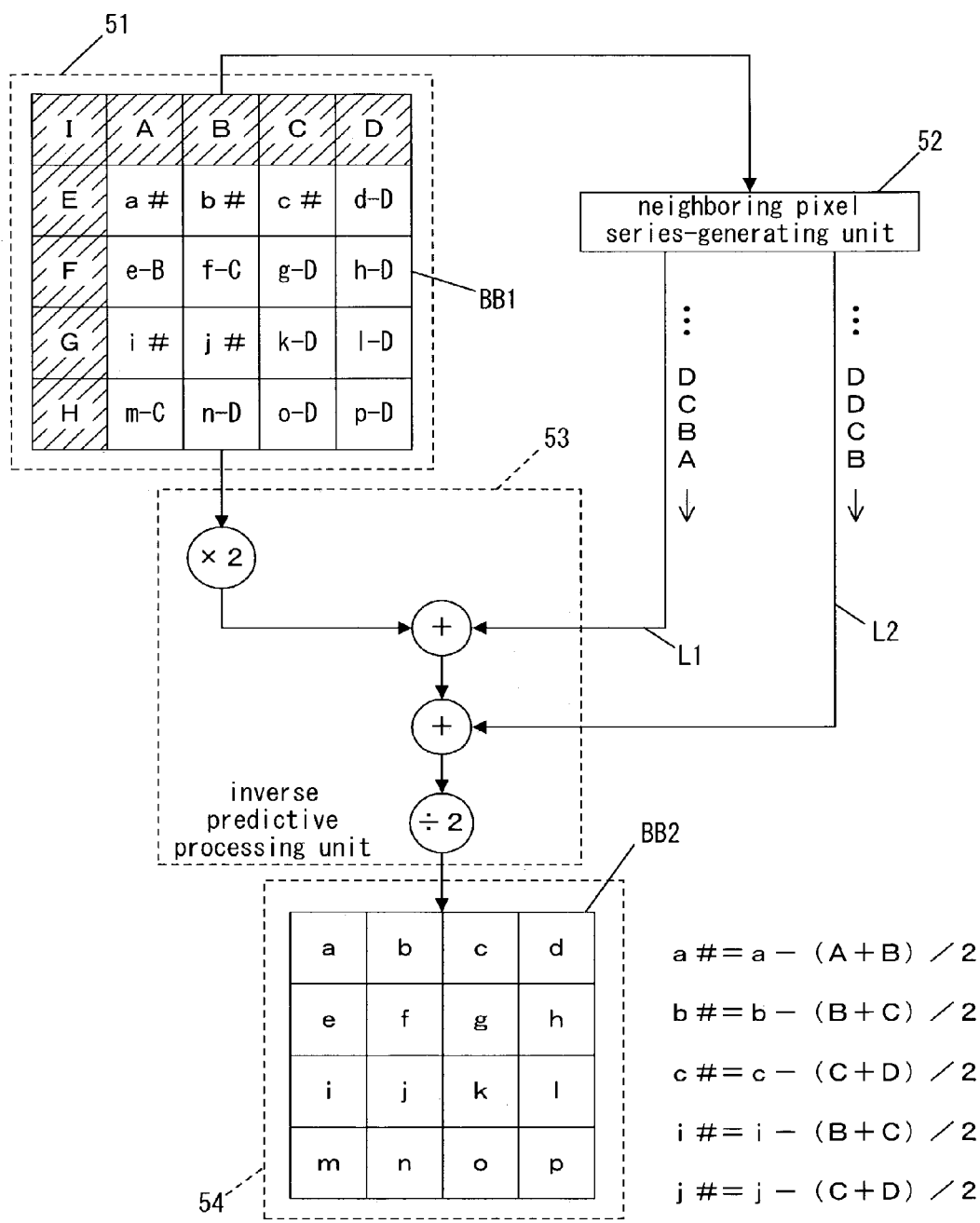
FIG. 16 is a descriptive illustration, showing the inverse prediction unit.

FIG. 16 is a descriptive illustration, showing the exemplary components of FIG. 15. In FIG. 16, the same components as those of FIG. 15 are identified by the same reference characters.

The following discusses, with reference to FIGS. 15 and 16, how the inverse prediction unit 8 of FIG. 14 works.

As illustrated in FIG. 16, the inverse candidate prediction block storage unit 51 stores sixteen pieces (a four-by-four area) of inverse candidate prediction pixel data {a#, b#, c#, d–D, e–B, f–C. g–D, h–D, i#, j#, k–D, l–D, m–c, n–D, o–D, and p–D}. The sixteen pieces of inverse candidate prediction pixel data form an inverse candidate prediction block BB1.

The inverse candidate prediction block storage unit 51 also stores nine pieces of neighboring pixel data {A, B, C, D, E, F, G, H, and I} adjacent to the inverse candidate prediction block BB1.

The inverse candidate prediction block storage unit 51 is a memory that outputs the stored inverse candidate prediction pixel data, or the stored neighboring pixel data in response to address signals that are fed from the output control unit 50 of FIG. 15.

More specifically, the inverse candidate prediction block storage unit 51 feeds the inverse candidate prediction pixel data {a#, b#, c#, d–D, e–B, f–C. g–D, h–D, i#, j#, k–D, l–D, m–c, n–D, o–D, and p–D} into the inverse predictive processing unit 53 in response to the address signals from the output control unit 50. At this time, the inverse candidate prediction pixel data {a#, b#, c#, d–D, e–B, f–C. g–D, h–D, i#, j#, k–D, l–D, m–c, n–D, o–D, and p–D} are entered into the inverse predictive processing unit 53 in the order in which the inverse predictive processing unit 53 arithmetically operates these data.

The inverse predictive processing unit 53 arithmetically operates the inverse candidate prediction pixel data in the order of "a#" to "p–D".

The inverse candidate prediction block storage unit 51 feeds the neighboring pixel data "A", "B", "C", and "D" into the neighboring pixel series-generating unit 52 in response to the address signals from the output control unit 50.

The neighboring pixel series-generating unit 52 in receipt of the neighboring pixel data "A", "B", "C", and "D" selects the data therefrom in the order in which the inverse predictive processing unit 53 arithmetically operates the neighboring pixel data "A", "B", "C", and "D". At this time, such a data selection is made for each series that corresponds to an algebra included in a predetermined algebraic expression. The neighboring pixel series-generating unit 52 feeds the selected data into the inverse predictive processing unit 53 for each of the series in the order in which the inverse predictive processing unit 53 arithmetically operates the neighboring pixel data "A", "B", "C", and "D".

The predetermined algebraic expression is $((2X+Y+Z)/2)$, where X, Y, and Z are algebras.

The predetermine algebraic expression is set to produce inverse predicted pixel data {"a" to "p"} of FIG. 16 using the inverse candidate prediction pixel data {"a#" to "p–D"} of FIG. 16 and the neighboring pixel data "A", "B", "C", and "D" of FIG. 16.

Such inverse predictive processing for producing the predicted pixel data {"a" to "p"} of FIG. 16 using the inverse candidate prediction pixel data {"a#" to "p–D"} of FIG. 16 and the neighboring pixel data "A", "B", "C", and "D" of FIG. 16 is matched to A-mode predictive processing that would possibly be incorporated by the H.26L-coding system.

The above algebraic expression provides one series that corresponds to algebra "Y" (called "a first series" according to the present embodiment) and another series that corresponds to algebra "Z" (called "a second series" according to the present embodiment).

More specifically, the neighboring pixel series-generating unit 52 selects the data from the neighboring pixel data "A", "B", "C", and "D" in the order in which the inverse predictive processing unit 53 arithmetically operates the first series, and then produces a first neighboring pixel series {A, B, C, D, B, C, D, D, B, C, D, D, C, D, D, and D} in accordance with the selected data. The neighboring pixel series-generating unit 52 feeds the first neighboring pixel series {A, B, C, D, B, C, D, D, B, C, D, D, C, D, D, and D} into a first series-related line "L1".

For the first series, the inverse predictive processing unit 53 arithmetically operates the neighboring pixel data in the first neighboring pixel series in sequence from "A" to "D".

The neighboring pixel series-generating unit 52 selects the data from the neighboring pixel data "A", "B", "C", and "D" in the order in which the inverse predictive processing unit 53 arithmetically operates the second series, and then produces a second neighboring pixel series {B, C, D, D, B, C, D, D, C, D, D, D, C, D, D, and D} in accordance with the selected data. The neighboring pixel series-generating unit 52 feeds the second neighboring pixel series {B, C, D, D, B, C, D, D, C, D, D, D, C, D, D, and D} into a second series-related line "L2".

For the second series, the inverse predictive processing unit 53 arithmetically operates the neighboring pixel data in the second neighboring pixel series in sequence from "B" to "D".

The inverse predictive processing unit 53 carries out the inverse predictive processing in accordance with the predetermined algebraic expression as mentioned above. The following more specifically discusses the inverse predictive processing.

The inverse predictive processing unit 53 receives the inverse candidate prediction pixel data {"a#" to "p–D"} in the order in which these data are arithmetically operated.

The inverse predictive processing unit 53 receives the first neighboring pixel series {"A" to "D"} through the first series-related line L1 in the order in which these data are arithmetically operated.

The inverse predictive processing unit 53 receives the second neighboring pixel series {"B" to "D"} through the second series-related line L2 in the order in which these data are arithmetically operated.

The inverse predictive processing unit 53 adds the following together: multiplied data that is obtained by multiplying the inverse candidate prediction pixel data by two; the neighboring pixel data in the first neighboring pixel series; and the neighboring pixel data in the second neighboring pixel series. The inverse predictive processing unit 53 divides such added data by two, thereby providing inverse predicted pixel data {a, b, c, d, e, f, g, h, i, j, k, l, m, n, o, and p}.

These sixteen pieces of inverse predicted pixel data {"a" to "p"} forms an inverse predicted block BB2.

The inverse predicted block storage unit 54 stores the inverse predicted block BB2 that is provided by the inverse predictive processing unit 53. The inverse predicted block storage unit 54 is a gang of registers, or alternatively a memory that outputs the data in response to the address signals.

The predicted pixel data {"a#", "b#", "c#", "i#", and "j#"} are expressed as follow: a#=a−(A+B)/2; b#=b−(B+C)/2; c#=c−(C+D)/2; i#=i−(B+C)/2; and j#=j−(C+D)2.

The following describes details of the neighboring pixel series-generating unit 52 of FIG. 16. A first example of the neighboring pixel series-generating unit 52 is initially discussed.

Figure 17:
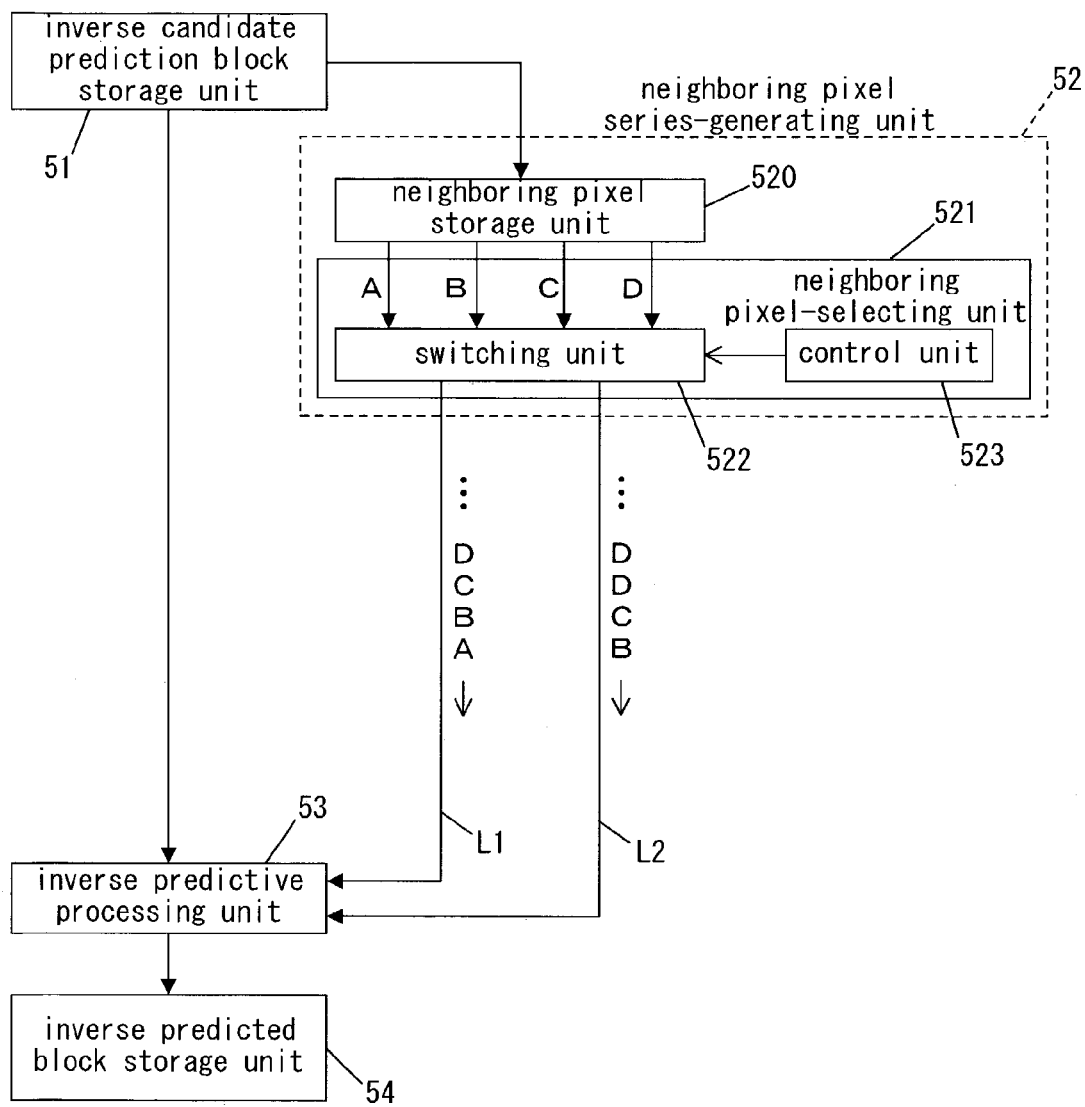
FIG. 17 is an illustration, showing an exemplary example of a neighboring pixel series-generating unit of FIG. 15.

FIG. 17 is an illustration, showing the exemplary first example of the neighboring pixel series-generating unit 52 of FIG. 16. In FIG. 17, the same components as those of FIG. 16 are identified by the same reference characters, and descriptions related thereto are omitted.

As illustrated in FIG. 17, the neighboring pixel series-generating unit 52 includes a neighboring pixel storage unit 520 and a neighboring pixel-selecting unit 521.

The neighboring pixel-selecting unit 521 includes a switching unit 522 and a control unit 523.

The neighboring pixel series-generating unit 52 receives the four pieces of neighboring pixel data "A", "B", "C", and "D" in sequence from the inverse candidate prediction block storage unit 51.

The neighboring pixel storage unit 520 stores the sequentially entered neighboring pixel data "A", "B", "C", and "D". The neighboring pixel storage unit 520 is a gang of registers.

The neighboring pixel storage unit 520 parallel-feeds the neighboring pixel data "A", "B", "C", and "D" into the switching unit 522.

The switching unit 522 connects each line selected from four lines in which the neighboring pixel data "A", "B", "C", and "D" are entered, to the first series-related line "L1" in response to instructions from the control unit 523. At this time, such a line selection is made in the order in which the inverse predictive processing unit 53 arithmetically operates the first series.

As a result, the neighboring pixel data are fed into the line "L1" in the order in which the first series is arithmetically operated.

More specifically, the data selected in the order in which the first series is arithmetically operated provide the first neighboring pixel series {A, B, C, D, B, C, D, D, B, C, D, D, C, D, D, and D}. The first neighboring pixel series {A, B, C, D, B, C, D, D, B, C, D, D, C, D, D, and D} is entered into the first series-related line "L1".

The switching unit 522 connects each line selected from the four lines in which the neighboring pixel data "A", "B", "C", and "D" are entered, to the second series-related line "L2" in response to instructions from the control unit 523. At this time, such a line selection is made in the order in which the inverse predictive processing unit 53 arithmetically operates the second series.

As a result, the neighboring pixel data are fed into the line "L2" in the order in which the second series is arithmetically operated.

More specifically, the data selected in the order in which the second series is arithmetically operated provide the second neighboring pixel series {B, C, D, D, B, C, D, D, C, D, D, D, C, D, D, and D}. The second neighboring pixel series {B, C, D, D, B, C, D, D, C, D, D, D, C, D, D, and D} is entered into the second series-related line "L2"

The first neighboring pixel series is delayed by the control of the control unit 523, thereby feeding the delayed first neighboring pixel series into the line "L1" from the switching unit 522. This step is described later in detail.

The second neighboring pixel series is delayed by the control of the control unit 523, thereby feeding the delayed second neighboring pixel series into the line "L2" from the switching unit 522. This step is described later in detail.

A second example of the neighboring pixel series-generating unit 52 of FIG. 16 is described.

Figure 18:
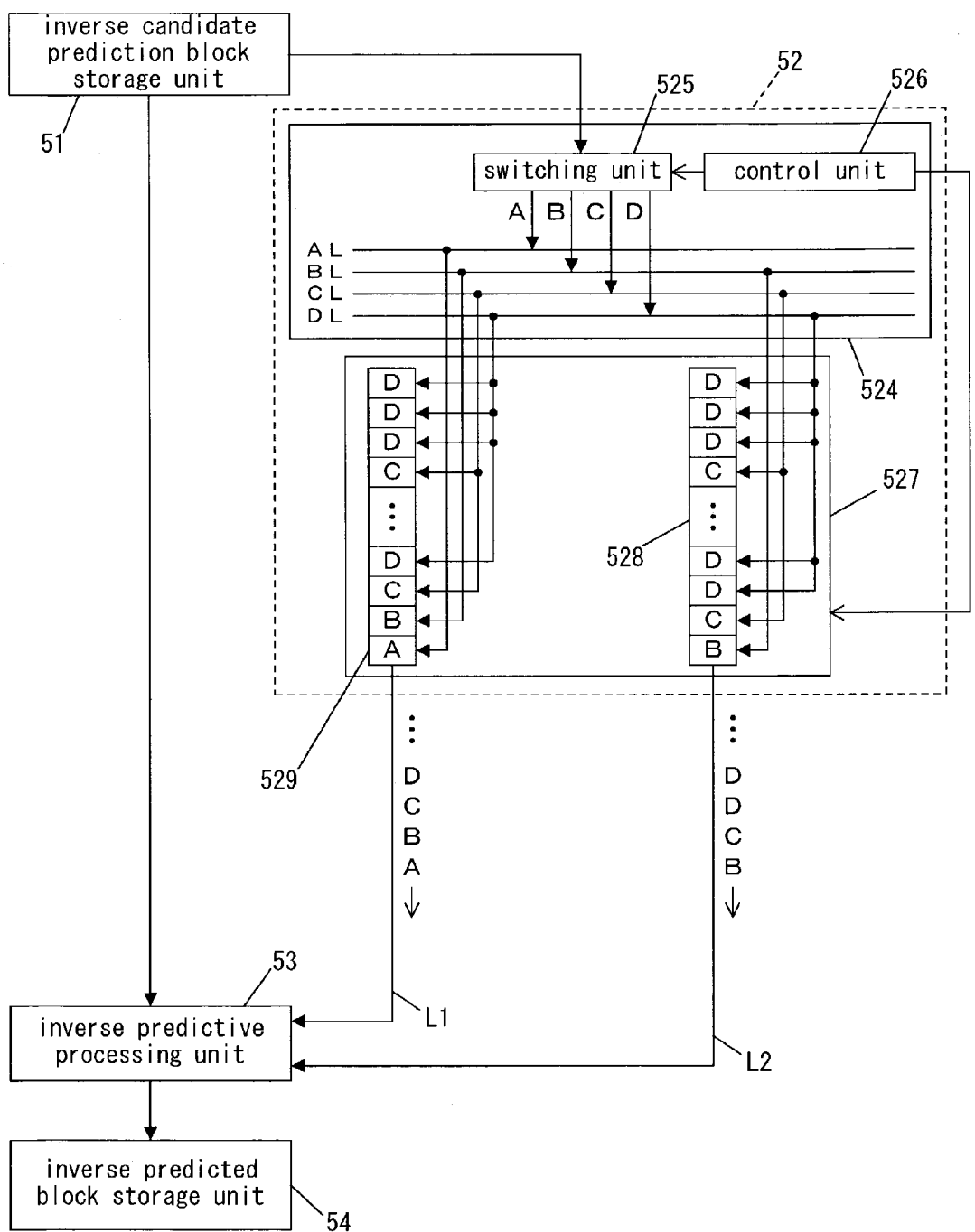
FIG. 18 is an illustration, showing another exemplary example of the neighboring pixel series-generating unit.

FIG. 18 is an illustration, showing the exemplary second example of the neighboring pixel series-generating unit 52 of FIG. 16. In FIG. 18, the same components as those of FIG. 16 are identified by the same reference characters, and descriptions related thereto are omitted.

As illustrated in FIG. 18, the neighboring pixel series-generating unit 52 includes a neighboring pixel-selecting unit 524 and a neighboring pixel storage unit 527.

The neighboring pixel-selecting unit 524 includes a switching unit 525 and a control unit 526.

The neighboring pixel storage unit 527 includes neighboring pixel series storage units 529, 528 that correspond to the lines "L1", "L2", respectively.

The neighboring pixel series-generating unit 52 receives the four pieces of neighboring pixel data "A", "B", "C", and "D" in sequence from the inverse candidate prediction block storage unit 51.

When the neighboring pixel data "A" enters the neighboring pixel series-generating unit 52, then the switching unit 525 connects a line in which the neighboring pixel data "A" is entered, to a line "AL" in response to instructions from the control unit 526.

When the neighboring pixel data "B" enters the neighboring pixel series-generating unit 52, then the switching unit 525 connects a line in which the neighboring pixel data "B" is entered, to a line "BL" in response to instructions from the control unit 526.

When the neighboring pixel data "C" enters the neighboring pixel series-generating unit 52, then the switching unit 525 connects a line in which the neighboring pixel data "C" is entered, to a line "CL" in response to instructions from the control unit 526.

When the neighboring pixel data "D" enters the neighboring pixel series-generating unit 52, then the switching unit 525 connects a line in which the neighboring pixel data "D" is entered, to a line "DL" in response to instructions from the control unit 526.

As described above, the switching unit 525 feeds the neighboring pixel data "A", "B", "C", and "D" into the lines "AL", "BL", "CL", and "DL" that correspond to the neighboring pixel data "A", "B", "C", and "D", respectively.

The lines "AL", "BL", "CL", and "DL" are wired to the first series-related neighboring pixel series storage unit 529 at predetermined storage positions in the order in which the inverse predictive processing unit 53 arithmetically operates the first series. The lines "BL", "CL", and "DL" are also wired to the second series-related neighboring pixel series storage unit 528 at predetermined storage positions in the order in which the inverse predictive processing unit 53 arithmetically operates the second series.

Accordingly, the first series-related neighboring pixel series storage unit 529 stores the neighboring pixel data in the order in which the first series is arithmetically operated.

More specifically, the first series-related neighboring pixel series storage unit 529 stores the first neighboring pixel series {A, B, C, D, B, C, D, D, B, C, D, D, C, D, D, and D} that consists of the neighboring pixel data aligned in the order in which the first series is arithmetically operated.

Similarly, the second series-related neighboring pixel series storage unit 528 stores the neighboring pixel data in the order in which the second series is arithmetically operated.

More specifically, the second series-related neighboring pixel series storage unit 528 stores the second neighboring pixel series {B, C, D, D, B, C, D, D, C, D, D, D, C, D, D, and D} that consists of the neighboring pixel data aligned in the order in which the second series is arithmetically operated.

The wired lines "AL", "BL", "CL", and "DL" as described above permit the neighboring pixel data "B" to be concurrently written to the neighboring pixel series storage units 528, 529 at corresponding storage positions.

Similarly, the other neighboring pixel data "C" and "D" are concurrently written thereto at corresponding storage positions.

This means that the neighboring pixel data "B" can be written at a single step to the neighboring pixel series storage units 528, 529 at corresponding storage positions. Similarly, the remaining neighboring pixel data "A", "C", and "D" can be written at a single step to the neighboring pixel series storage units 528, 529 at corresponding storage positions.

The first series-related neighboring pixel series storage unit 529 feeds the stored neighboring pixel data into the first series-related line "L1" in the order in which these data are subjected to predictive processing.

More specifically, the first series-related neighboring pixel series storage unit 529 feeds the stored first neighboring pixel series into the first series-related line "L1".

Similarly, the second series-related neighboring pixel series storage unit 528 feeds the stored neighboring pixel data into the second series-related line "L2" in the order in which these data are subjected to the predictive processing More specifically, the second series-related neighboring pixel series storage unit 528 feeds the stored second neighboring pixel series into the second series-related line "L2".

The first neighboring pixel series is delayed by the control of the control unit 526, thereby feeding the delayed first neighboring pixel series into the line "L1" from the neighboring pixel series storage unit 529. This step is described later in detail.

The second neighboring pixel series is delayed by the control of the control unit 526, thereby feeding the delayed second neighboring pixel series into the line "L2" from the neighboring pixel series storage unit 528. This step is described later in detail.

Next, details of the inverse predictive processing unit 53 of FIG. 16 are described. A first example of the inverse predictive processing unit 53 of FIG. 16 is initially described. In the following description, the inverse candidate prediction pixel data "a" of FIG. 16 is illustrated as data subject to the inverse predictive processing.

Figure 19:
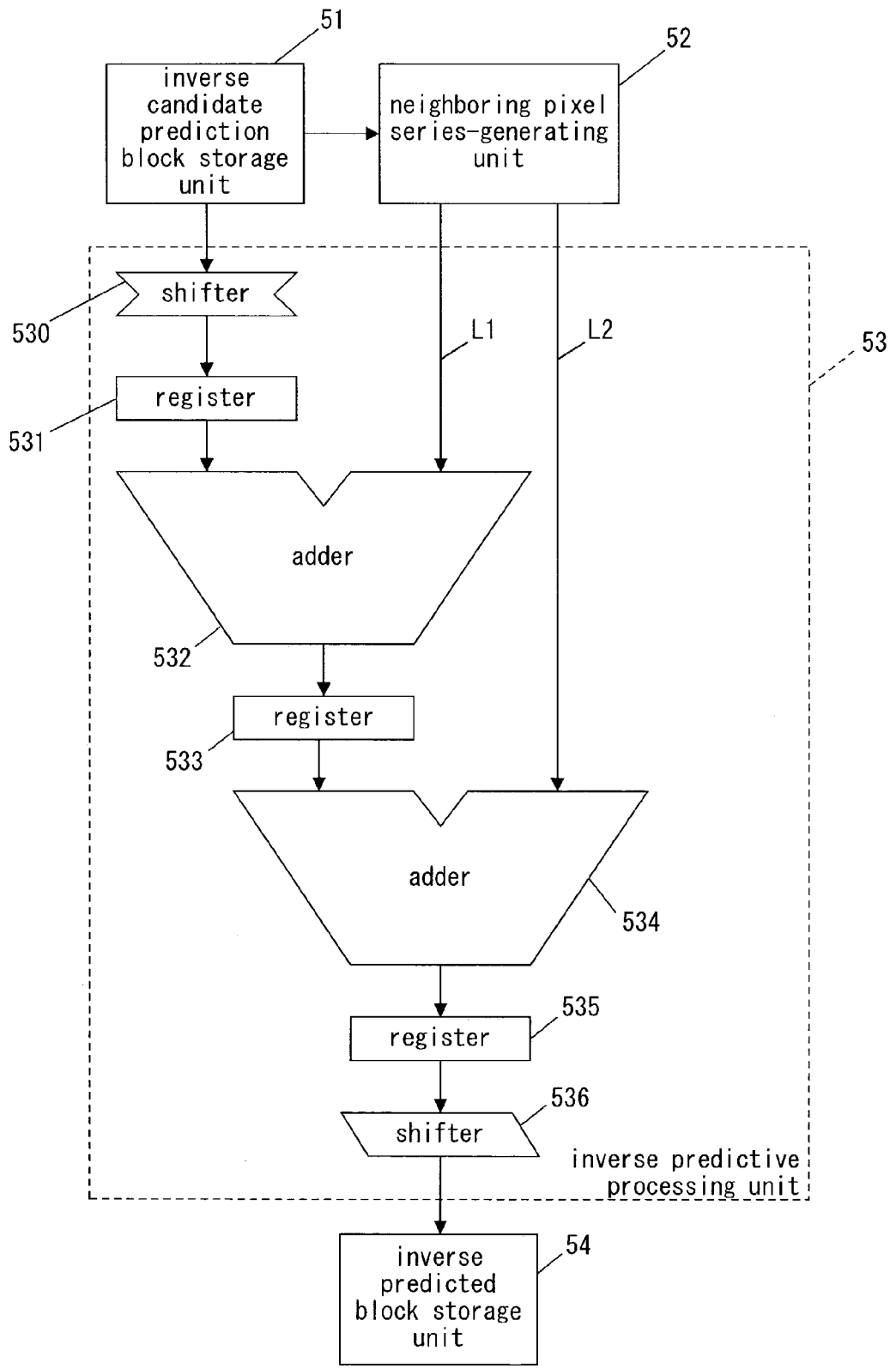
FIG. 19 is an illustration, showing an exemplary example of an inverse predictive processing unit of FIG. 15.

FIG. 19 is an illustration, showing the exemplary first example of the inverse predictive processing unit 53 of FIG. 16. In FIG. 19, the same components as those of FIG. 16 are identified by the same reference characters, and descriptions related thereto are omitted.

As illustrated in FIG. 19, the inverse predictive processing unit 53 includes a shifter 530, registers 531, 533, and 535, double-input adders 532 and 534, and a shifter 536.

As illustrated in FIG. 19, the inverse candidate prediction block storage unit 51 reads out the inverse candidate prediction pixel data "a#=a−(A+B)/2" into the shifter 530.

The shifter 530 is shifted leftward by an amount of one bit, and then multiplies the inverse candidate prediction pixel data "a#=a−(A+B)/2" by two, thereby providing multiplied data "2a−A−B". The shifter 530 is a multiplying unit. The shifter 530 is designed for horizontal shifting.

The shifter 530 feeds the multiplied data "2a−A−B" into the register 531.

The adder 532 receives the multiplied data "2a−A−B" from the register 531. The adder 532 also receives the neighboring pixel data "A" from the first neighboring pixel series through the first series-related line "L1".

At this time, the first neighboring pixel series is delayed by time "t" with reference to the output of the inverse candidate prediction pixel data from the inverse candidate prediction block storage unit 51, thereby supplying the delayed first neighboring pixel series to the adder 532. As a result, the adder 532 concurrently receives the multiplied data "2a−A−B" from the shifter 530 and the neighboring pixel data "A" from the first neighboring pixel series.

The adder 532 adds the neighboring pixel data "A" and the multiplied data "2a−A−B" together, thereby providing added data "2a−B".

The adder 532 feeds the added data "2a−B" into the register 533.

The adder 534 receives the added data "2a−B" from the register 533. The adder 534 also receives the neighboring pixel data "B" from the second neighboring pixel series through the second series-related line "L2".

At this time, the second neighboring pixel series is delayed by time "t" with reference to the output of the added data from the adder 532, thereby supplying the delayed second neighboring pixel series to the adder 534. As a result, the adder 534 concurrently receives the added data "2a−B" from the adder 532 and the neighboring pixel data "B" from the second neighboring pixel series.

The adder 534 adds the neighboring pixel data "B" and the added data "2a–B" together, thereby providing added data "2a".

The adder 534 feeds the added data "2a" into the register 535.

The shifter 536 receives the added data "2a" from the register 535.

The shifter 536 is shifted rightward by an amount of one bit, and then divides the added data "2a" by two, thereby producing inverse predicted pixel data "a". The shifter 536 is a dividing unit. The shifter 536 is limited to rightward shifting.

The shifter 536 feeds the inverse predicted pixel data "a" into the inverse predicted block storage unit 54.

In this way, the inverse predictive processing unit 53 arithmetically operates together the sequentially entered inverse candidate prediction pixel data, the sequentially entered neighboring pixel data from the first neighboring pixel series, and the sequentially entered neighboring pixel data from the second neighboring pixel series. As a result, the inverse predicted pixel data are produced in sequence.

Next, a second example of the inverse predictive processing unit 53 of FIG. 16 is described. In this example, the inverse candidate prediction pixel data "a#" of FIG. 16 is illustrated as data subject to the inverse predictive processing.

Figure 20:
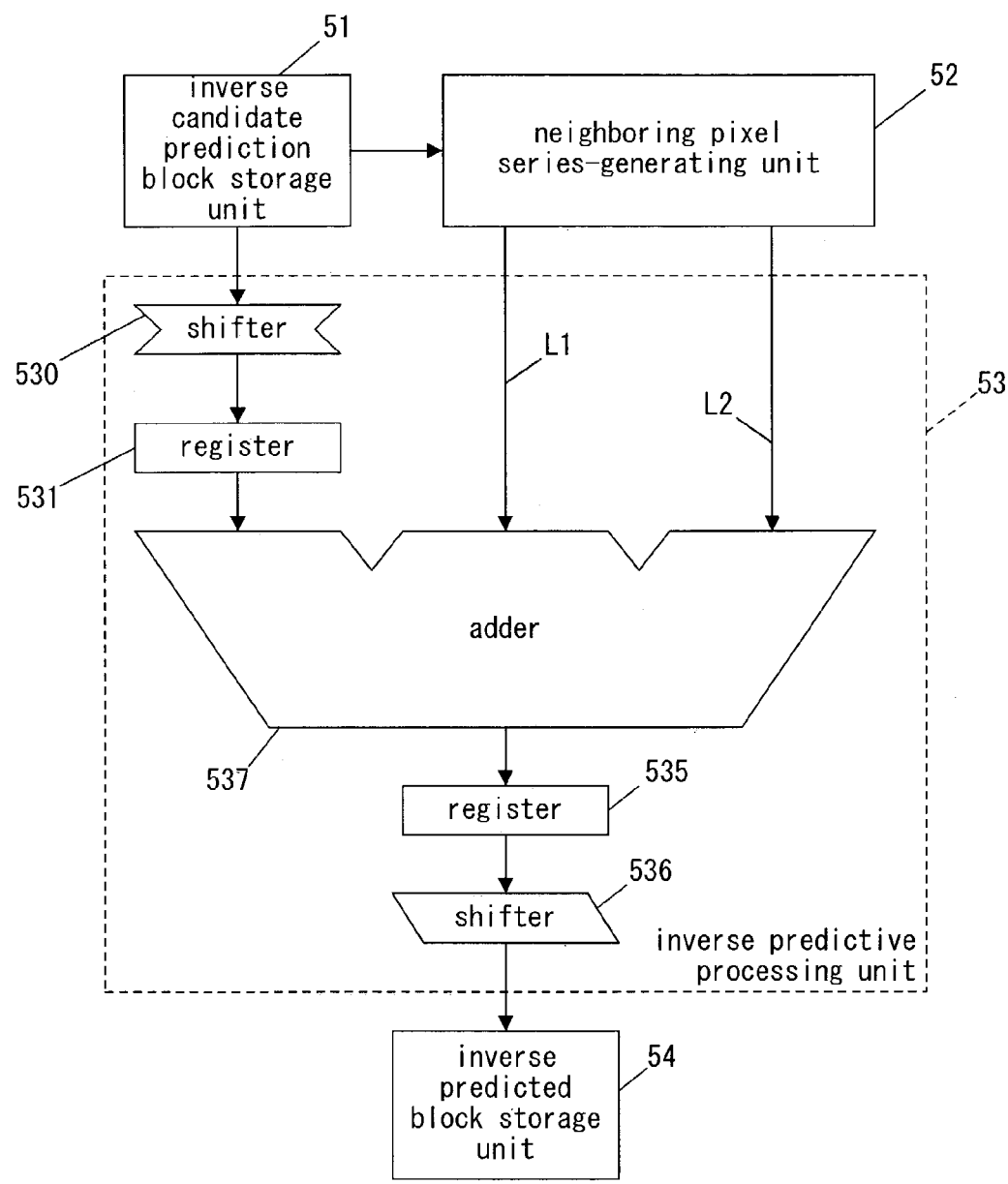
FIG. 20 is an illustration, showing another exemplary example of the inverse predictive processing unit.

FIG. 20 is an illustration, showing the exemplary second example of the inverse predictive processing unit 53 of FIG. 16. In FIG. 20, the same components as those of FIG. 16 or FIG. 19 are identified by the same reference characters, and description related thereto are omitted.

As illustrated in FIG. 20, the inverse predictive processing unit 53 includes a shifter 530, registers 531 and 535, a triple-input adder 537, and a shifter 536.

As illustrated in FIG. 20, the adder 537 receives multiplied data "2a–A–B" from the shifter 530 through the register 531. The adder 537 also receives the neighboring pixel data "A" from the first neighboring pixel series through the first series-related line "L1" and the neighboring pixel data "B" from the second neighboring pixel series through the second series-related line "L2.

At this time, the first and second neighboring pixel series are delayed by time "t" with reference to the output of the inverse candidate prediction pixel data from the inverse candidate prediction block storage unit 51, thereby supplying the delayed first and second neighboring pixel series to the adder 537. As a result, the adder 537 concurrently receives multiplied data "2a–A–B" from the shifter 530, the neighboring pixel data "A" from the first neighboring pixel series, and the neighboring pixel data "B" from the second neighboring pixel series.

The adder 537 adds the neighboring pixel data "A" and the multiplied data "2a–A–B" together, thereby providing added data "2a–B". The adder 142 then adds the added data "2a–B" and the neighboring pixel data "B" together, thereby providing ultimately added data "2a".

The adder 537 feeds the ultimately added data "2a" into the register 535.

The shifter 536 receives the ultimately added data "2a" from the register 535.

The shifter 536 is shifted rightward by an amount of one bit, and then divides the ultimately added data "2a" by two, thereby providing inverse predicted pixel data "a".

The shifter 536 feeds the inverse predicted pixel data "a" into the inverse predicted block storage unit 54.

In this way, the predictive processing unit 53 arithmetically operates together the sequentially entered inverse candidate prediction pixel data, the sequentially entered neighboring pixel data from the first neighboring pixel series, and the sequentially entered neighboring pixel data from the second neighboring pixel series. As a result, the inverse predicted pixel data are produced in sequence.

Next, the number of operation steps is discussed for the predictive processing using the inverse predictive processing unit 53 of FIG. 19, which includes the two double-input adders.

The readout of the neighboring pixel data "A", "B", "C", and "D" from the inverse candidate prediction block storage unit 51 of FIG. 17 involves four steps.

Four steps are required to store the neighboring pixel data "A", "B", "C", and "D" using the neighboring pixel storage unit 520 of FIG. 17.

Nineteen steps are required to conduct the inverse predictive processing using the inverse predictive processing unit 53 of FIG. 19.

As a result the A-mode inverse predictive processing using the inverse prediction unit 8 of FIG. 14 involves a total of twenty-seven operation steps when the inverse predictive processing unit 53 of FIG. 19 is employed.

The adders 532, 534 in the inverse predictive processing unit 53 of FIG. 19 support vector instructions. In this case, the number of operation steps is equal to three plus the number of pixels to be processed.

The use of the neighboring pixel series-generating unit 52 of FIG. 18 instead of the neighboring pixel series-generating unit 52 of FIG. 17 involves four steps to store the neighboring pixel data "A", "B", "C", and "D" using the neighboring pixel series storage units 528, 529.

Similar to the use of the neighboring pixel series-generating unit 52 of FIG. 17, four steps are required to read out the neighboring pixel data "A", "B", "C", and "D" from the neighboring pixel series-generating unit 52 of FIG. 18. The inverse predictive processing using the inverse predictive processing unit 53 of FIG. 19 requires nineteen steps.

As a result, the use of the neighboring pixel series-generating unit 52 of FIG. 18 instead of the neighboring pixel series-generating unit 52 of FIG. 17 also results in a total of twenty-seven operation steps for the A-mode inverse predictive processing using the inverse prediction unit 8 of FIG. 14 when the inverse predictive processing unit 53 of FIG. 19 is employed.

Meanwhile, similar to A-mode predictive processing using the prior art prediction apparatus, A-mode inverse predictive processing using a prior art inverse prediction apparatus requires a total of forty-four steps.

As evidenced by the above, the present embodiment provides a substantially reduced number of operation steps for the A-mode inverse predictive processing, and thus provides a high level of processing performance.

Another discussion is now made as to the number of operation steps for the inverse predictive processing using the inverse predictive processing unit 53 of FIG. 20, which includes the single triple-input adder.

The readout of the neighboring pixel data "A", "B", "C", and "D" from the inverse candidate prediction block storage unit 51 of FIG. 17 involves four steps.

Four steps are required to store the neighboring pixel data "A", "B", "C", and "D" using the neighboring pixel storage unit 520 of FIG. 17.

Eighteen steps are required to conduct the inverse predictive processing using the inverse predictive processing unit 53 of FIG. 20.

As a result, the A-mode inverse predictive processing using the inverse prediction unit 8 of FIG. 14 involves a total of twenty-six operation steps when the inverse predictive processing unit 53 of FIG. 20 is employed.

When the single triple-input adder 537 is used as practiced in the inverse predictive processing unit 53 of FIG. 20, then the number of operation steps results in two plus the number of pixels to be processed.

The use of the neighboring pixel series-generating unit 52 of FIG. 18 instead of the neighboring pixel series-generating unit 52 of FIG. 17 also results in a total of twenty-six operation steps for the A-mode inverse predictive processing using the inverse prediction unit 8 of FIG. 14 when the inverse predictive processing unit 53 of FIG. 20 is employed.

As seen from the above, in the two-stage addition processing using the inverse predictive processing unit 53, the use of the single triple-input adder (FIG. 20) eliminates one register (the register 533 of FIG. 19), when compared with use of the two double-input adders (FIG. 19). This feature reduces the total number of operation steps by one step, and thus provides a higher level of processing performance.

As discussed above, in the inverse prediction unit 8 according to the present embodiment, the neighboring pixel series-generating unit 52 in receipt of the neighboring pixel data "A", "B", "C", and "D" selects the data therefrom in the order in which the neighboring pixel data "A", "B", "C", and "D" are arithmetically operated. At this time, such a data selection is made for each of the series (the first and second series) that respectively correspond to algebraic vales "Y", "Z" included in the predetermined algebraic expression ((2X+Y+Z)/2). The neighboring pixel series-generating unit 52 feeds the selected data into the inverse predictive processing unit 53 for each of the series in the order in which the neighboring pixel data "A", "B", "C", and "D" are arithmetically operated.

More specifically, the neighboring pixel series-generating unit 52 generates the first and second neighboring pixel series, and then feeds them into the inverse predictive processing unit 53.

The inverse predictive processing unit 53 receives the inverse candidate prediction pixel data in the order in which these data are arithmetically operated. The inverse predictive processing unit 53 also receives the neighboring pixel data that are fed from the neighboring pixel series-generating unit 52 for each of the series in the order in which the neighboring pixel data are arithmetically operated. The inverse predictive processing unit 53 arithmetically operates the received inverse candidate prediction pixel data and the received neighboring pixel data together.

More specifically, the inverse predictive processing unit 53 receives the inverse candidate prediction pixel data in the order in which these data are arithmetically operated, and further receives the first and second neighboring pixel series, thereby arithmetically operating the received inverse candidate prediction pixel data and the received the first and second neighboring pixel series together.

Accordingly, the inverse prediction unit 8 according to the present embodiment generates the first and second neighboring pixel series, thereby practicing the inverse predictive processing.

As a result, steps of storing and generating inverse predictive pixel data as practiced by the prior art inverse prediction apparatus are eliminated. This feature provides the inverse prediction unit 8 (inverse prediction apparatus) that requires fewer operation steps and that provides a high level of processing performance.

The decoding apparatus of FIG. 14 incorporating the inverse prediction unit 8 realizes enhanced processing performance.

In the present embodiment, the step of entering the neighboring pixel data "A", "B", "C", and "D" into the neighboring pixel series-generating unit 52 in order to practice vertical inverse predictive processing is described as an example. Alternatively, the neighboring pixel data "E", "F", "G", and "H" may be entered into the neighboring pixel series-generating unit 52 in order to practice horizontal predictive processing.

In the present embodiment, the inverse candidate prediction block storage unit 51 of FIG. 16 is described as a memory, but alternatively may be a gang of registers.

Such an alternative eliminates the switching unit 525 of FIG. 18, and connects the input line for the neighboring pixel data "A", read out from the gang of registers, to the line "AL". Similarly, the input lines for the neighboring pixel data "B", "C", and "D" are connected to the lines "BL", "CL", and "DL", respectively.

In the present embodiment, the neighboring pixel storage unit 520 of FIG. 17 is described as a gang of registers, but alternatively may be a memory that outputs the stored data according to the address signals.

In such an alternative, a gang of registers is followed by the switching unit 522 in order to permit the gang of registers to retain the neighboring pixel data that are read out from the memory. The gang of registers feeds the retained neighboring pixel data into the switching unit 522.

In the present embodiment the inverse candidate prediction block storage unit 51 stores the five-by-five pixel area to practice the inverse predictive processing. Alternatively, the inverse candidate prediction block storage unit 51 may store a seventeen-by-seventeen pixel area to conduct the inverse predictive processing in order to process a sixteen-by-sixteen pixel area A moving picture is encoded for each of the sixteen-by-sixteen pixel areas. As a result, this alternative provides similar beneficial effects.

In the present embodiment the expression ((2X+Y+Z)/2) is described as a predetermined algebraic expression. This expression is exemplified as being suitable for inverse predictive processing matched to the A-mode predictive processing that would possibly be incorporated by the H.26L-coding system.

Accordingly, the predetermined algebraic expression can be set to meet the inverse predictive processing matched to the predictive processing that is decided on being incorporated by the H.26L-encoding system.

The predetermined algebraic expression is not limited to meeting the inverse predictive processing matched to the predictive processing according to the H.26L-coding system.

Accordingly, any algebraic expression may be set as a predetermined algebraic expression. As a result, a series that corresponds to each algebra included in the algebraic expression can be set.

For example, a predetermined algebraic expression can be set to meet inverse predictive processing that is matched to predictive processing employed by another encoding system.

In the predetermined algebraic expression ((2X+Y+Z)/2) as an illustration, the multiplier 2 for multiplying "X" is an example of a predetermined multiplier. The divisor 2 is an example of a predetermined divisor.

Embodiment 4

A fourth embodiment illustrates a decoding apparatus for decoding encoded data that is obtained by orthogonally transforming, quantizing, and variable length-encoding predicted pixel data. The predicted pixel data are produced using the predictive processing according to the second embodiment, i.e., using the B-mode predictive processing according to the H.26L-coding system.

The encoding apparatus according to the present embodiment is similar in entire construction to that according to the third embodiment as illustrated in FIG. 14.

Therefore, the encoding apparatus of FIG. 14 is hereinafter described as one according to the present embodiment.

Figure 21:
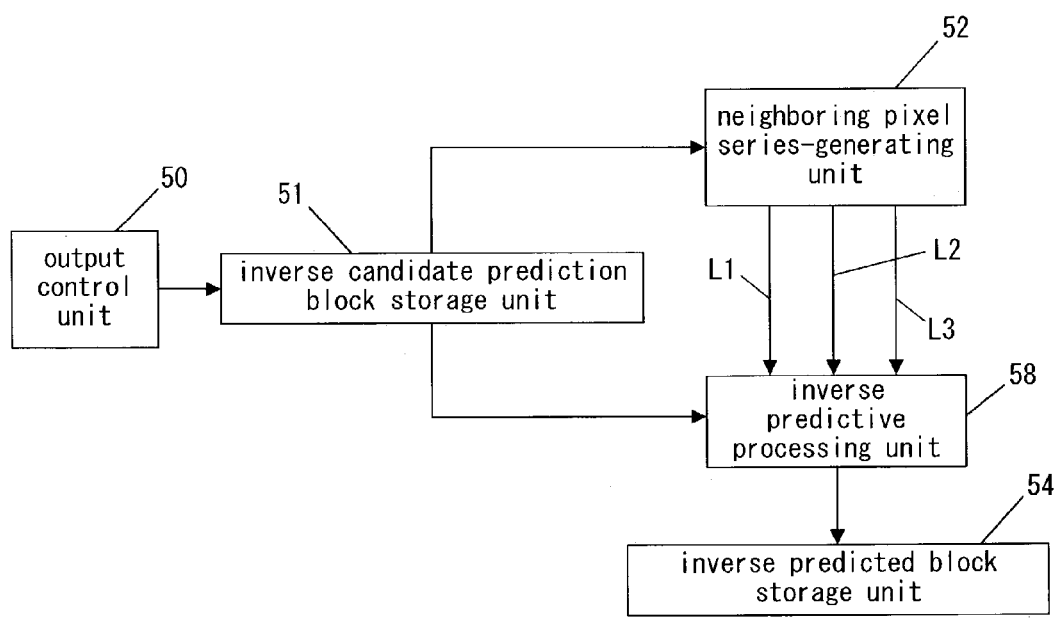
FIG. 21 is a block diagram, illustrating an exemplary inverse prediction unit according to a fourth embodiment.

FIG. 21 is a block diagram, illustrating an exemplary inverse prediction unit 8 according to the present embodiment. In FIG. 21, components similar to those of FIG. 15 are identified by the same reference characters, and descriptions related thereto are omitted.

As illustrated in FIG. 21, the inverse prediction unit 8 includes an output control unit 50, an inverse candidate prediction block storage unit 51, a neighboring pixel series-generating unit 52, an inverse predictive processing unit 58, and an inverse predicted block storage unit 54.

Figure 22:
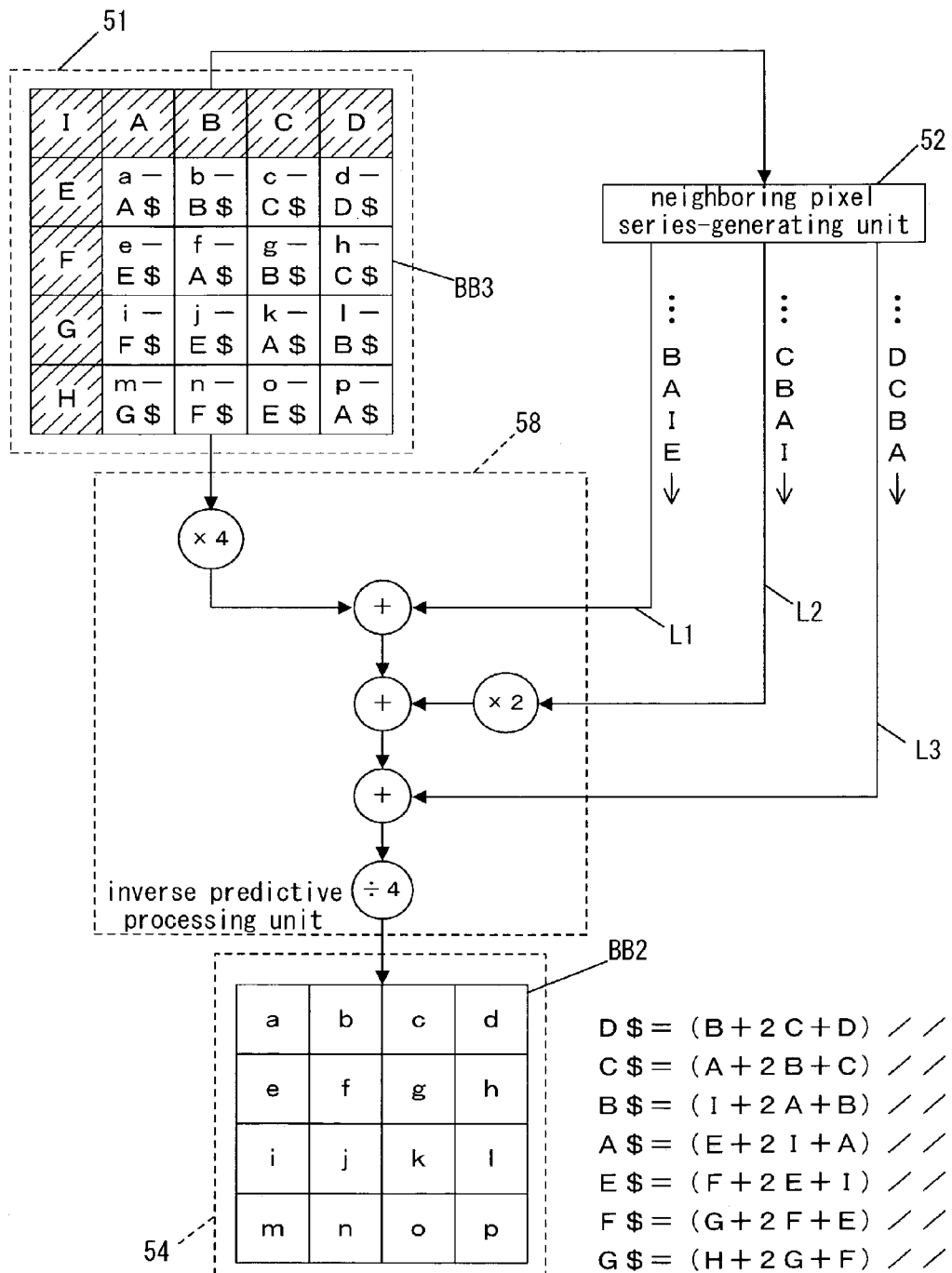
FIG. 22 is a descriptive illustration, showing the inverse prediction unit.

FIG. 22 is a descriptive illustration, showing how the exemplary components of FIG. 21 work. In FIG. 22, the same components as those of FIG. 21 are identified by the same reference characters.

The following describes, with reference to FIGS. 21 and 22, how the inverse prediction unit 8 of FIG. 14 works according to the present embodiment.

As illustrated in FIG. 22, the inverse candidate prediction block storage unit 51 stores sixteen pieces (a four-by-four area) of inverse candidate prediction pixel data {a–A$, b–B$, c–C$, d–D$, e–E$, f–A$. g–B$, h–C$, i–F$, j–E$, k–A$, l–B$, m–G$, n–F$, o–E$, and p–A$}. The sixteen pieces of inverse candidate prediction pixel data forms an inverse candidate prediction block BB3.

The inverse candidate prediction block storage unit 51 stores nine pieces of neighboring pixel data {A, B, C, D, E, F, G, H, and I} adjacent to the inverse candidate prediction block BB3.

The inverse candidate prediction block storage unit 51 is a memory that outputs the stored inverse candidate prediction pixel data or the stored neighboring pixel data in response to address signals from the output control unit 50 of FIG. 15.

More specifically, the inverse candidate prediction block storage unit 51 feeds the inverse candidate prediction pixel data {a–A$, b–B$, c–C$, d–D$, e–E$, f–A$. g–B$, h–C$, i–F$, j–E$, k–A$, l–B$, m–G$, n–F$, o–E$, and p–A$} into the inverse predictive processing unit 58 in response to the address signals from the output control unit 50. At this time, the inverse candidate prediction pixel data {a–A$, b–B$, c–C$, d–D$, e–E$, f–A$. g–B$, h–C$, i–F$, j–E$, k–A$, l–B$, m–G$, n–F$, o–E$, and p–A$} are entered into the inverse predictive processing unit 58 in the order in which the inverse predictive processing unit 58 arithmetically operates these data.

The inverse predictive processing unit 58 arithmetically operates the inverse candidate prediction pixel data in the order of "a–A$" to "p–A$".

The inverse candidate prediction block storage unit 51 feeds the neighboring pixel data {A, B, C, D, E, F, G, H, and I} into the neighboring pixel series-generating unit 52 in response to the address signals from the output control unit 50.

The neighboring pixel series-generating unit 52 in receipt of the neighboring pixel data {A, B, C, D, E, F, G, H, and I} selects the data therefrom in the order in which the inverse predictive processing unit 58 arithmetically operate the neighboring pixel data {A, B, C, D, E, F, G, H, and I}. At this time, such a line selection is made for each series that corresponds to an algebra included in a predetermined algebraic expression. The neighboring pixel series-generating unit 52 feeds the selected data into the inverse predictive processing unit 58 for each of the series in the order in which the inverse predictive processing unit 58 arithmetically operates the neighboring pixel data {A, B, C, D, E, F, G, H, and I}.

The predetermined algebraic expression is ((4R+X–+2Y+Z)/4), where "R", "X", "Y", and "Z" are algebras.

The predetermined algebraic expression is set to produce inverse predicted pixel data {"a" to "p"} of FIG. 22 using the inverse candidate prediction pixel data {"a–A$" to "p–A$"} of FIG. 22 and the neighboring pixel data {"A" to "I"} of FIG. 22.

Such inverse predictive processing for producing the inverse predicted pixel data {"a" to "p"} of FIG. 22 using the inverse candidate prediction pixel data {"a–A$" to "p–A$"} of FIG. 22 and the neighboring pixel data {"A" to "I"} of FIG. 22 is adapted for the B-mode predictive processing that would possibly be incorporated by the H.26L-encoding system.

The algebraic expression as discussed above provides one series that corresponds to algebra "X" (called "a first series" according to the present embodiment), another series that corresponds to algebra "Y" (called "a second series"), and yet another series that corresponds to algebra "Z" (called "a third series").

More specifically, the neighboring pixel series-generating unit 52 selects the data from the neighboring pixel data {A, B, C, D, E, F, G, H, and I} in the order in which the inverse predictive processing unit 58 arithmetically operates the first series, and then produces a first neighboring pixel series {E, I, A, B, F, E, I, A, G, F, E, I, H, G, F, and E} in accordance with the selected data. The neighboring pixel series-generating unit 52 feeds the first neighboring pixel series {E, I, A, B, F, E, I, A, G, F, E, I, H, G, F, and E} into a first series-related line "L1".

For the first series, the inverse predictive processing unit 58 arithmetically operates the neighboring pixel data in the first neighboring pixel series in sequence from "E" to "E".

The neighboring pixel series-generating unit 52 selects the data from the neighboring pixel data {A, B, C, D, E, F, G, H, and I} in the order in which the inverse predictive processing unit 58 arithmetically operates the second series, and then produces a second neighboring pixel series {I, A, B, C, E, I, A, B, F, E, I, A, G, F, E, and I} in accordance with the selected data. The neighboring pixel series-generating unit 52 feeds the second neighboring pixel series {I, A, B, C, E, I, A, B, F, E, I, A, G, F, E, and I} into a second series-related line "L2".

For the second series, the inverse predictive processing unit 58 arithmetically operates the neighboring pixel data in the second neighboring pixel series in sequence from "I" to "I".

The neighboring pixel series-generating unit 52 selects the data from the neighboring pixel data {A, B, C, D, E, F, G, H, and I} in the order in which the inverse predictive processing unit 58 arithmetically operates the third series, and then produces a third neighboring pixel series {A, B, C, D, I, A, B, C, E, I, A, B, F, E, I, and A} in accordance with the selected data. The neighboring pixel series-generating unit 52 feeds the third neighboring pixel series {A, B, C, D, I, A, B, C, E, I, A, B, F, E, I, and A} into a third series-related line "L3".

For the third series, the inverse predictive processing unit 58 arithmetically operates the neighboring pixel data in the third neighboring pixel series in sequence from "A" to "A".

The inverse predictive processing unit 58 carries out the inverse predictive processing in accordance with the predetermined algebraic expression as mentioned above. The following more specifically discusses the inverse predictive processing.

The inverse predictive processing unit 58 receives the inverse candidate prediction pixel data {"a–A$" to "p–A$"} in the order in which these data are arithmetically operated.

The inverse predictive processing unit 58 receives the first neighboring pixel series {"E" to "E"} through the first series-related line "L1" in the order in which these data are arithmetically operated.

The inverse predictive processing unit 58 receives the second neighboring pixel series {"I" to "I"} through the second series-related line "L2" in the order in which these data are arithmetically operated.

The inverse predictive processing unit 58 receives the third neighboring pixel series {"A" to "A"} through the third series-related line "L3" in the order in which these data are arithmetically operated.

The inverse predictive processing unit 58 adds the neighboring pixel data in the first neighboring pixel series to multiplied data that is obtained by multiplying the inverse candidate prediction pixel data by four. As a result, first added data is provided.

The inverse predictive processing unit 58 adds the first added data to multiplied data that is obtained by multiplying the neighboring pixel data in the second neighboring pixel series by two. As a result, second added data is provided.

The inverse predictive processing unit 58 adds the second added data to the neighboring pixel data in the third neighboring pixel series, thereby providing third added data The inverse predictive processing unit 58 divides the third added data by four, thereby providing inverse predicted pixel data {a, b, c, d, e, f, g, h, i, j, k, l, m, n, o, and p}.

These sixteen pieces of inverse predicted pixel data {"a" to "p"} form an inverse predicted block BB2.

The inverse predicted block storage unit 54 stores the inverse predicted block BB2 that is provided by the inverse predictive processing unit 58. The inverse predicted block storage unit 54 is a gang of registers, or alternatively a memory that outputs the data in response to the address signals.

The predicted pixel data {"D$", "C$", "B$", "A$", "E$", "F$", and "G$"} are expressed as follows: D$=(B+2C+D)//4; C$=(A+2B+C)//4; B$=(1+2A+B)//4; A$=(E+2I+A)//4; E$=(F+2E+1)//4; F$=(G+2F+E)//4; and G$=(H+2G+F)//4. The symbol "//" denotes round-off after division.

The following describes details of the neighboring pixel series-generating unit 52 of FIG. 22. A first example of the neighboring pixel series-generating unit 52 is initially discussed.

Figure 23:
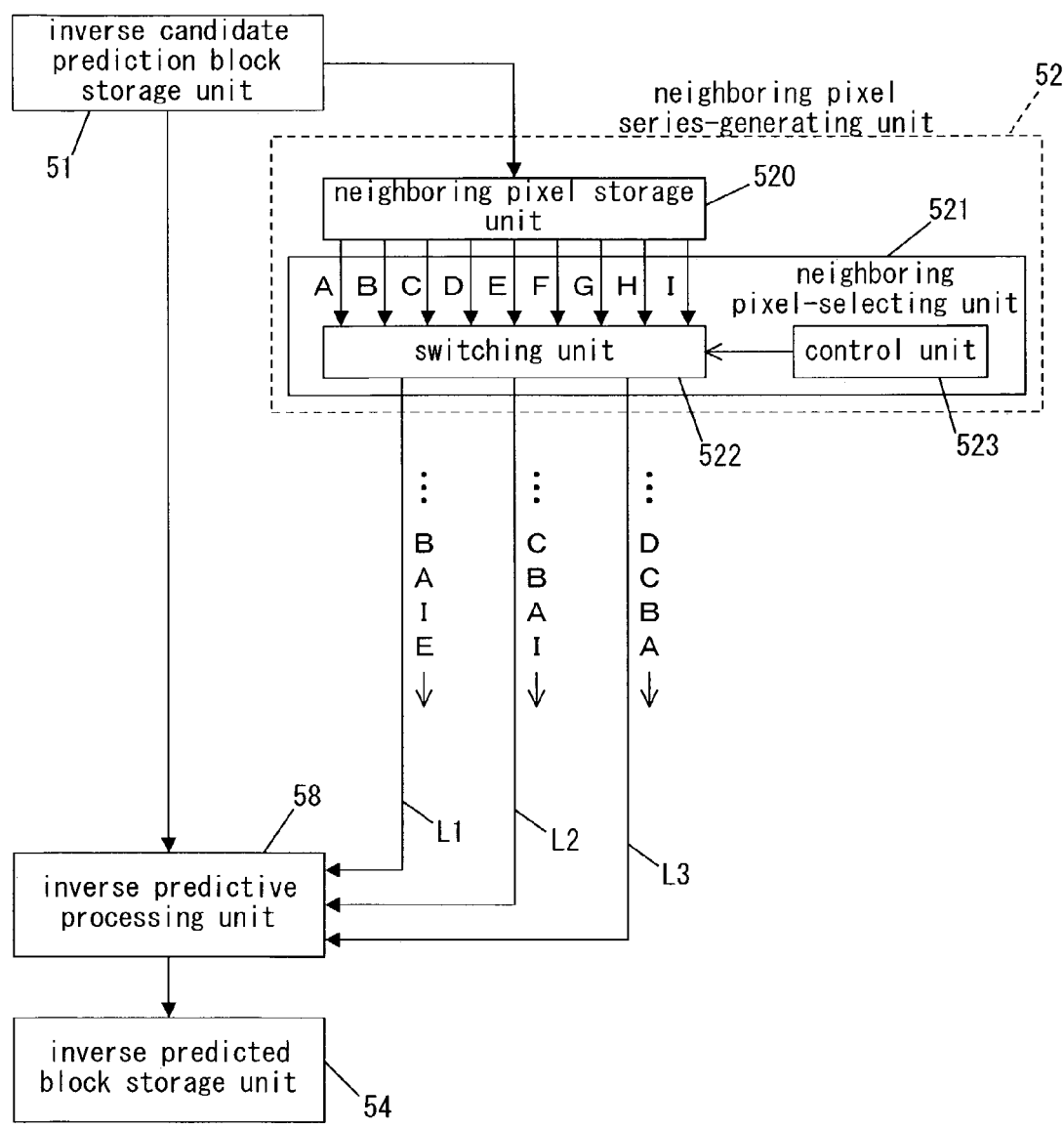
FIG. 23 is an illustration, showing an exemplary example of a neighboring pixel series-generating unit of FIG. 21.

FIG. 23 is an illustration, showing the exemplary first example of the neighboring pixel series-generating unit 52 of FIG. 22. In FIG. 23, the same components as those of FIG. 22 are identified by the same reference characters, and descriptions related thereto are omitted.

As illustrated in FIG. 23, the neighboring pixel series-generating unit 52 includes a neighboring pixel storage unit 520 and a neighboring pixel-selecting unit 521.

The neighboring pixel-selecting unit 521 includes a switching unit 522 and a control unit 523.

The neighboring pixel series-generating unit 52 receives the nine pieces of neighboring pixel data {A, B, C, D, E, F, G, H, and I} in sequence from the inverse candidate prediction block storage unit 51.

The neighboring pixel storage unit 520 stores the sequentially entered neighboring pixel data {A, B, C, D, E, F, G, H, and I}. The neighboring pixel storage unit 520 is a gang of registers.

The neighboring pixel storage unit 520 parallel-feeds the neighboring pixel data {A, B, C, D, E, F, G, H, and I} into the switching unit 522.

The switching unit 522 connects each line selected from nine lines in which the neighboring pixel data {A, B, C, D, E, F, G, H, and I} are entered, to the first series-related line "L1" in response to instructions from the control unit 523. At this time, such a line selection is made in the order in which the inverse predictive processing unit 58 arithmetically operates the first series.

As a result, the neighboring pixel data are fed into the line "L1" in the order in which the first series is arithmetically operated.

More specifically, the data selected in the order in which the first series is arithmetically operated provide the first neighboring pixel series {"E" to "E"}. The first neighboring series {"E" to "E"} is entered into the first series-related line "L1".

The switching unit 522 connects each line selected from the nine lines in which the neighboring pixel data {A, B, C, D, E, F, G, H, and I} are entered, to the second series-related line "L2" in response to instructions from the control unit 523. At this time, such a line selection is made in the order in which the inverse predictive processing unit 58 arithmetically operates the second series.

As a result, the neighboring pixel data are fed into the line "L2" in the order in which the second series is arithmetically operated.

More specifically, the data selected in the order in which the second series is arithmetically operated provide the second neighboring pixel series {"I" to "I"}. The second neighboring pixel series {"I" to "I"} is entered into the second series-related line "L2"

The switching unit 522 connects each line selected from the nine lines in which the neighboring pixel data {A, B, C, D, E, F, G, H, and I} are entered, to the third series-related line "L3" in response to instructions from the control unit 523. At this time, such a line selection is made in the order in which the inverse predictive processing unit 58 arithmetically operates the third series.

As a result the neighboring pixel data are fed into the line "L3" in the order in which the third series is arithmetically operated.

More specifically, the data selected in the order in which the third series is arithmetically operated provide the third neighboring pixel series {"A" to "A"}. The third neighboring pixel series {"A" to "A"} is entered into the third series-related line "L3"

The first, second, and third neighboring pixel series are delayed by the control of the control unit 523, thereby feeding the delayed first, second and third neighboring pixel series into the lines "L1", "L2", and "L3" from the switching unit 522, respectively. This step is described later in detail.

A second example of the neighboring pixel series-generating unit 52 of FIG. 22 is now described.

Figure 24:
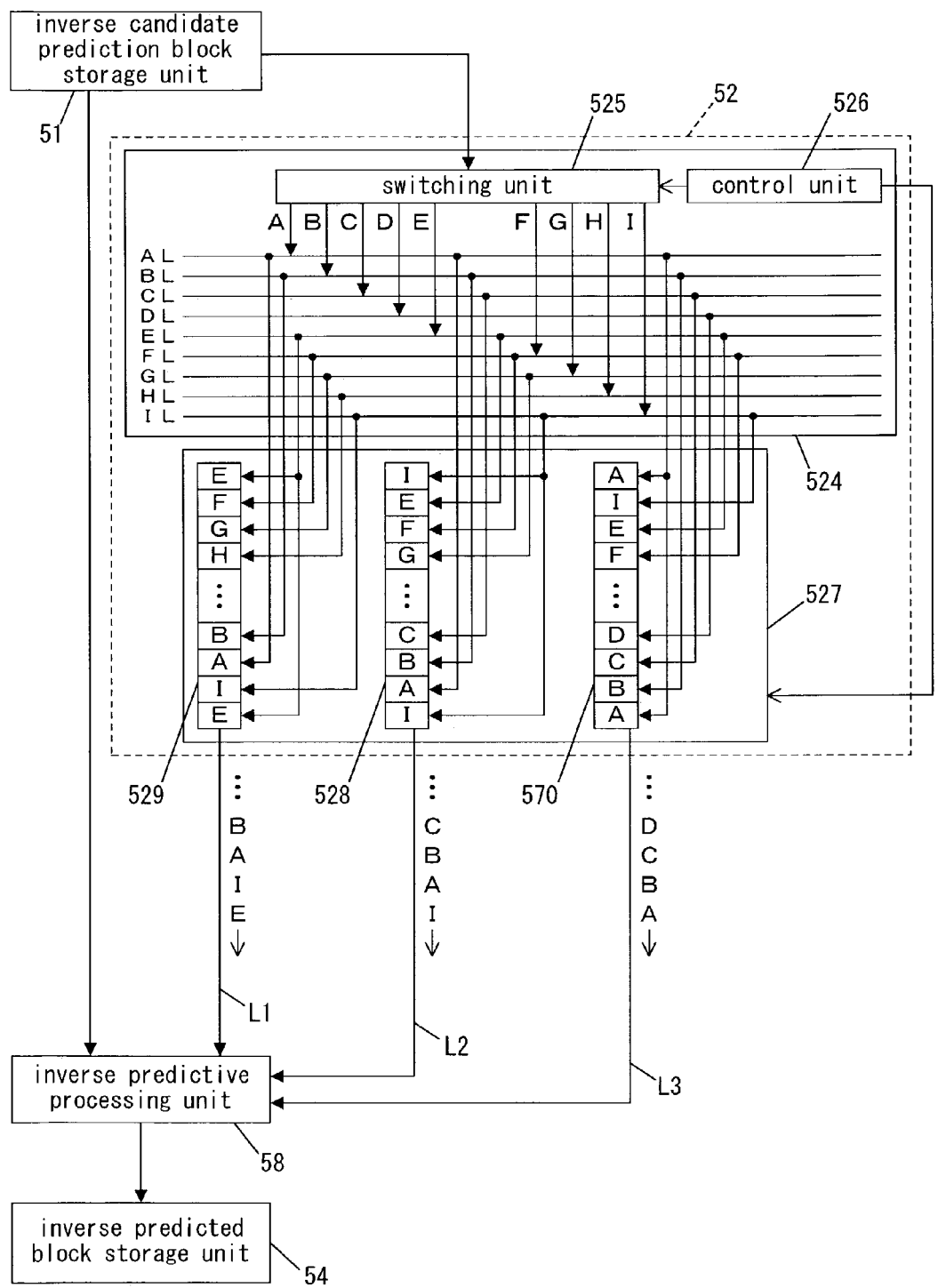
FIG. 24 is an illustration, showing another exemplary example of the neighboring pixel series-generating unit.

FIG. 24 is an illustration, showing the exemplary second example of the neighboring pixel series-generating unit 52 of FIG. 22. In FIG. 24, the same components as those of FIG. 22 are identified by the same reference characters, and descriptions related thereto are omitted.

As illustrated in FIG. 24, the neighboring pixel series-generating unit 52 includes a neighboring pixel-selecting unit 524 and a neighboring pixel storage unit 527.

The neighboring pixel-selecting unit 524 includes a switching unit 525 and a control unit 526.

The neighboring pixel storage unit 527 includes neighboring pixel series storage units 529, 528, 570 that correspond to the lines "L1", "L2", "L3", respectively.

When the neighboring pixel data "A" enters the neighboring pixel series-generating unit 52, then the switching unit 525 connects a line in which the neighboring pixel data "A" is entered, to a line "AL" in response to instructions from the control unit 526.

When the neighboring pixel data "B" enters the neighboring pixel series-generating unit 52, then the switching unit 525 connects a line in which the neighboring pixel data "B" is entered, to a line "BL" in response to instructions from the control unit 526.

When the neighboring pixel data "C" enters the neighboring pixel series-generating unit 52, then the switching unit 525 connects a line in which the neighboring pixel data "C" is entered, to a line "CL" in response to instructions from the control unit 526.

When the neighboring pixel data "D" enters the neighboring pixel series-generating unit 52, then the switching unit 525 connects a line in which the neighboring pixel data "D" is entered, to a line "DL" in response to instructions from the control unit 526.

When the neighboring pixel data "E" enters the neighboring pixel series-generating unit 52, then the switching unit 525 connects a line in which the neighboring pixel data "E" is entered, to a line "EL" in response to instructions from the control unit 526.

When the neighboring pixel data "F" enters the neighboring pixel series-generating unit 52, then the switching unit 525 connects a line in which the neighboring pixel data "F" is entered, to a line "FL" in response to instructions from the control unit 526.

When the neighboring pixel data "G" enters the neighboring pixel series-generating unit 52, then the switching unit 525 connects a line in which the neighboring pixel data "G" is entered, to a line "GL" in response to instructions from the control unit 526.

When the neighboring pixel data "H" enters the neighboring pixel series-generating unit 52, then the switching unit 525 connects a line in which the neighboring pixel data "H" is entered, to a line "HL" in response to instructions from the control unit 526.

When the neighboring pixel data "I" enters the neighboring pixel series-generating unit 52, then the switching unit 525 connects a line in which the neighboring pixel data "I" is entered, to a line "IL" in response to instructions from the control unit 526.

As described above, the switching unit 525 feeds the neighboring pixel data {A, B, C, D, E, F, G, H, and I} into the lines "AL" to "IL" that correspond to the neighboring pixel data {A, B, C, D, E, F, G, H, and I}, respectively.

Some of the lines "AL" to "IL" are wired to the first series-related neighboring pixel series storage unit 529 at predetermined storage positions in the order in which the inverse predictive processing unit 58 arithmetically operates the first series. Some of the lines "AL" to "IL" are wired to the second series-related neighboring pixel series storage unit 528 at predetermined storage positions in the order in which the inverse predictive processing unit 58 arithmetically operates the second series. Some of the lines "AL" to "IL" are wired to the third series-related neighboring pixel series storage unit 570 at predetermined storage positions in the order in which the inverse predictive processing unit 58 arithmetically operates the third series.

Accordingly, the first series-related neighboring pixel series storage unit 529 stores the neighboring pixel data in the order in which the first series is arithmetically operated.

More specifically, the first series-related neighboring pixel series storage unit 529 stores the first neighboring pixel series {"E" to "E"} that consists of the neighboring pixel data aligned in the order in which the first series is arithmetically operated.

Similarly, the second series-related neighboring pixel series storage unit 528 stores the neighboring pixel data in the order in which the second series is arithmetically operated.

More specifically, the second series-related neighboring pixel series storage unit 528 stores the second neighboring pixel series {"I" to "I"} that consists of the neighboring pixel data aligned in the order in which the second series is arithmetically operated.

The third series-related neighboring pixel series storage unit 570 stores the neighboring pixel data in the order in which the third series is arithmetically operated.

More specifically, the third series-related neighboring pixel series storage unit 570 stores the third neighboring pixel series {"A" to "A"} that consists of the neighboring pixel data aligned in the order in which the third series is arithmetically operated.

The wired lines "AL" to "L" as discussed above permit the neighboring pixel data "A" to be concurrently written to the neighboring pixel series storage units 528, 529, and 570 at corresponding storage positions. Similarly, the other neighboring pixel data are concurrently written thereto at corresponding storage positions.

This means that the neighboring pixel data "A" can be written at a single step to the neighboring pixel series storage units 528, 529, and 570 at corresponding storage positions. Similarly, the remaining neighboring pixel data can be written at a single step thereto at corresponding storage positions.

The first series-related neighboring pixel series storage unit 529 feeds the stored neighboring pixel data into the first series-related line "L1" in the order in which these data are subjected to inverse predictive processing.

More specifically, the first series-related neighboring pixel series storage unit 529 feeds the stored first neighboring pixel series into the first series-related line "L1".

Similarly, the second series-related neighboring pixel series storage unit 528 feeds the stored neighboring pixel data into the second series-related line "L2" in the order in which these data experience the inverse predictive processing.

More specifically, the second series-related neighboring pixel series storage unit 528 feeds the stored second neighboring pixel series into the second series-related line "L2".

Similarly, the third series-related neighboring pixel series storage unit 570 feeds the stored neighboring pixel data into the third series-related line "L3" in the order in which these data experience the inverse predictive processing.

More specifically, the third series-related neighboring pixel series storage unit 570 feeds the stored third neighboring pixel series into the third series-related line "L3".

The first, second, and third neighboring pixel series are delayed by the control of the control unit 526, thereby entering the delayed first, second, and third neighboring pixel series into the lines "L1", "L2", and "L3" from the neighboring pixel series storage units 529, 528, and 570, respectively. This step is described later in detail.

Next, details of the predictive processing unit 58 of FIG. 22 are described. A first example of the predictive processing unit 58 of FIG. 22 is initially described. In the following description, the inverse candidate prediction pixel data "a–A$" of FIG. 22 is illustrated as data subject to the inverse predictive processing.

Figure 25:
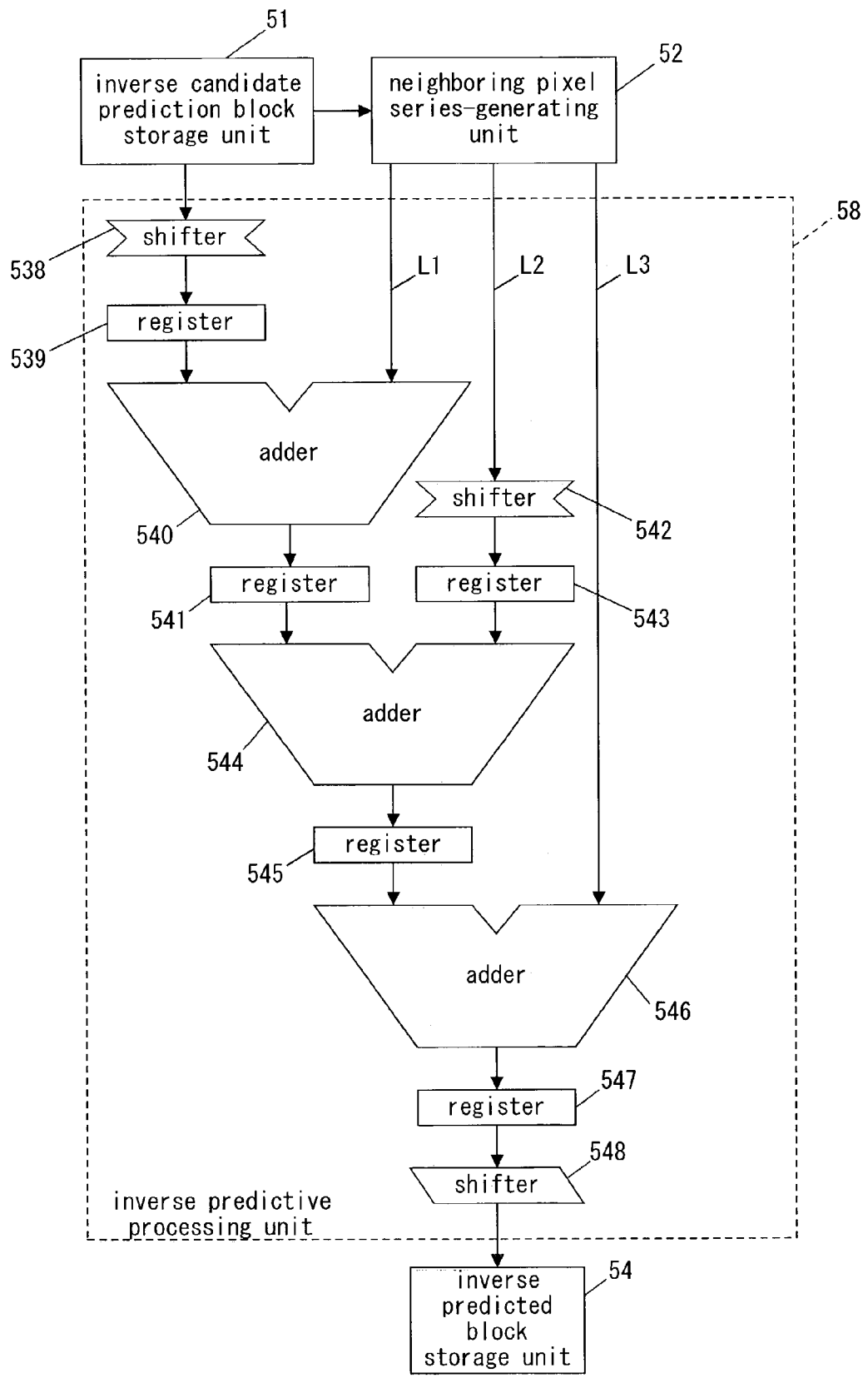
FIG. 25 is an illustration, showing an exemplary example of an inverse predictive processing unit of FIG. 21.

FIG. 25 is an illustration, showing the exemplary first example of the inverse predictive processing unit 58 of FIG. 22. In FIG. 25, the same components as those of FIG. 22 are identified by the same reference characters, and descriptions related thereto are omitted.

As illustrated in FIG. 25, the inverse predictive processing unit 58 includes shifters 538 and 542 registers 539, 541, 543, 545, and 547, double-input subtracters 540, 544, and 546 and a shifter 548.

As illustrated in FIG. 25, the inverse candidate prediction block storage unit 51 reads out the inverse candidate prediction pixel data "a–A$=a–(E+2I+A)//4" into the shifter 538.

The shifter 538 multiplies the inverse candidate prediction pixel data "a–(E+2I+A)//4" by four, thereby providing multiplied data "4a–E–2I–A". The shifter 538 is a multiplying unit. The shifter 538 is able to horizontally shift.

The shifter 538 feeds the multiplied data "4a–E–2I–A" into the register 539.

The adder 540 receives the multiplied data "4a–E–2I–A" from the register 539. The adder 540 also receives the neighboring pixel data "E" from the first neighboring pixel series through the first series-related line "L1".

At this time, the first neighboring pixel series is delayed by time "t" with reference to the output of the inverse candidate prediction pixel data from the inverse candidate prediction block storage unit 51, thereby supplying the delayed first neighboring pixel series to the adder 540. As a result, the adder 540 concurrently receives the multiplied data "4a–E–2I–A" from the shifter 538 and the neighboring pixel data "E" from the first neighboring pixel series.

The adder 540 adds the neighboring pixel data "E" and the multiplied data "4a–E–2I–A" together, thereby providing added data "4a–2I–A".

The adder 540 feeds the added data "4a–2I–A" into the register 541.

The shifter 542 receives the neighboring pixel data "I" from the second neighboring pixel series through the line "L2".

At this time, the second neighboring pixel series is delayed by time "t" with reference to the output of the inverse candidate prediction pixel data from the inverse candidate prediction block storage unit 51, thereby entering the delayed second neighboring pixel series into the shifter 542.

As a result, the neighboring pixel data "I" is entered into the shifter 542 from the second neighboring pixel series in simultaneous with the moment when the neighboring pixel data "E" is fed into the adder 540 from the first neighboring pixel series.

The shifter 542 multiplies the entered neighboring pixel data "I" by two, thereby providing multiplied data "2I".

The shifter 542 feeds the multiplied data "2I" into the register 543. The shifter 542 is a multiplying unit. The shifter 542 is designed for horizontal shifting.

The adder 544 simultaneously receives the added data "4a–2I–A" from the register 541 and the multiplied data "2I" from the register 543.

The adder 544 adds the multiplied data "2I" and the added data "4a–2I–A" together, thereby providing added data "4a–A".

The adder 544 feeds the added data "4a–A" into the register 545.

The adder 546 receives the added data "4a–A" from the register 545. The adder 546 also receives the neighboring pixel data "A" from the third neighboring pixel series through the line "L3".

At this time, the third neighboring pixel series is delayed by time "t" with reference to the output of the added data from the adder 544, thereby supplying the delayed third neighboring pixel series to the adder 546.

As a result, the adder 546 concurrently receives the added data "4a–A" from the adder 544 and the neighboring pixel data "A" from the third neighboring pixel series.

The adder 546 adds the neighboring pixel data "A" and the added data "4a–A" together, thereby providing added data "4a".

The adder 546 feeds the added data "4a" into the register 547.

The shifter 548 receives the added data "4a" from the register 547.

The shifter 548 divides the added data "4a" by four, thereby providing inverse predicted pixel data "a". The shifter 548 is a dividing unit. The shifter 548 is limited to rightward shifting.

The shifter 548 feeds the inverse predicted pixel data "a" into the inverse predicted block storage unit 54.

In this way, the inverse predictive processing unit 58 arithmetically operates together the sequentially entered inverse candidate prediction pixel data, the sequentially entered neighboring pixel data from the first neighboring pixel series, the sequentially entered neighboring pixel data from the second neighboring pixel series, and the sequentially entered neighboring pixel data from the third neighboring pixel series. As a result, the inverse predicted pixel data are produced in sequence.

Next a second example of the predictive processing unit 58 of FIG. 22 is described. In this example, the inverse candidate prediction pixel data "a–A$" of FIG. 22 is illustrated as data subject to the inverse predictive processing.

Figure 26:
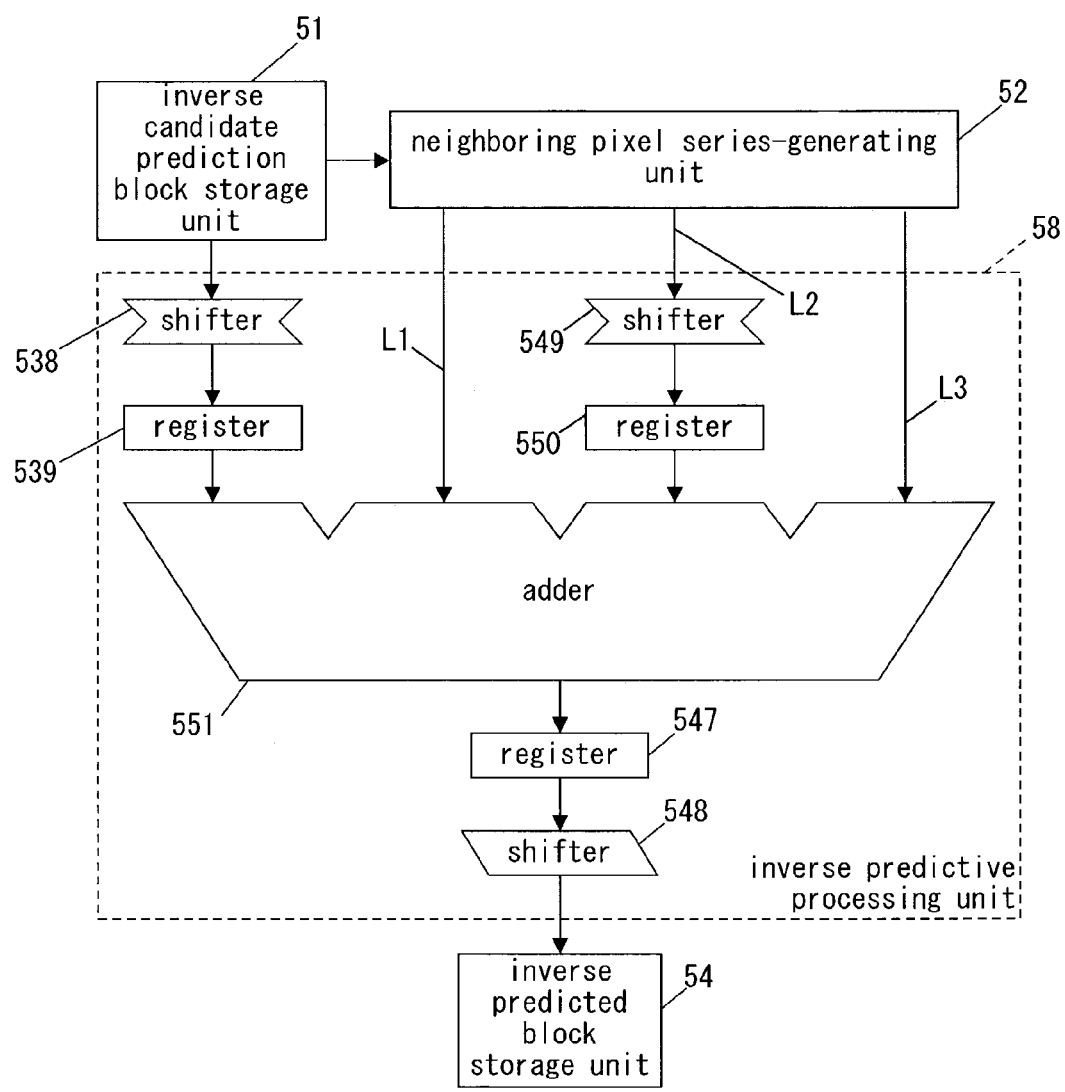
FIG. 26 is an illustration, showing another exemplary example of the inverse predictive processing unit.

FIG. 26 is an illustration, showing the exemplary second example of the inverse predictive processing unit 58 of FIG. 22. In FIG. 26, the same components as those of FIG. 22 or FIG. 25 are identified by the same reference characters, and description related thereto are omitted.

As illustrated in FIG. 26, the inverse predictive processing unit 58 includes shifters 538 and 549, registers 539, 550, and 547, a quadruple-input adder 551, and a shifter 548.

As illustrated in FIG. 26, the shifter 549 receives the neighboring pixel data "I" from the second neighboring pixel series through the line "L2" in concurrent with the moment when the shifter 538 receives the inverse candidate prediction pixel data "a–A$".

The shifter 549 multiplies the neighboring pixel data "I" by two, thereby providing multiplied data "2I".

The shifter 549 feeds the multiplied data "2I" into the register 550. The shifter 549 is a multiplying unit. The shifter 549 is designed for horizontal shifting.

The adder 551 receives the following: multiplied data "4a–E–2I–A" from the shifter 538 through the register 539; neighboring pixel data "E" from the first neighboring pixel series through the first series-related line "L1"; the multiplied data "2I" from the register 550; and neighboring pixel data "A" from the third neighboring pixel series through the third series-related line "L3".

At this time, the first and third neighboring pixel series are delayed by time "t" with reference to the output of the inverse candidate prediction pixel data from the inverse candidate prediction block storage unit 51, thereby supplying the delayed first and third neighboring pixel series to the adder 551. As a result, the adder 551 concurrently receives the multiplied data "4a–E–2I–A" from the shifter 538, the neighboring pixel data "E" from the first neighboring pixel series, the multiplied data "2I" from the shifter 549, and the neighboring pixel data "A" from the third neighboring pixel series.

The adder 551 adds the neighboring pixel data "E" and the multiplied data "4a–E–2I–A" together, thereby providing subtracted data "4a–2I–A". The adder 551 then adds the multiplied data "2I" and the added data "4a–2I–A" together, thereby providing added data "4a–A". The adder 551 adds the neighboring pixel data "A" and the added data "4a–A" together, thereby providing ultimately added data "4a".

The adder 551 feeds the ultimately added data "4a" into the register 547.

The shifter 548 receives the ultimately added data "4a" from the register 547.

The shifter 548 divides the ultimately added "4a" by four, thereby providing inverse predicted pixel data "a".

The shifter 548 feeds the inverse predicted pixel data "a" into the inverse predicted block storage unit 54.

In this way, the inverse predictive processing unit 58 arithmetically operates together the sequentially entered candidate prediction pixel data, the sequentially entered neighboring pixel data from the first neighboring pixel series, the sequentially entered neighboring pixel data from the second neighboring pixel series, and the sequentially entered neighboring pixel data from the third neighboring pixel series. As a result, the inverse predicted pixel data are produced in sequence.

Next, the number of operation steps is discussed for the inverse predictive processing using the inverse predictive processing unit 58 of FIG. 25, which includes the three double-input adders.

The readout of the neighboring pixel data {A, B, C, D, E, F, G, H, and I} from the inverse candidate prediction block storage unit 51 of FIG. 23 involves nine steps.

Nine steps are required to store the neighboring pixel data {A, B, C, D, E, F, G, H, and I} using the neighboring pixel storage unit 520 of FIG. 23.

Twenty steps are required to conduct the inverse predictive processing using the inverse predictive processing unit 58 of FIG. 25.

As a result, the B-mode inverse predictive processing using the inverse prediction unit 8 of FIG. 14 involves a total of thirty-eight operation steps when the inverse predictive processing unit 58 of FIG. 25 is employed.

The adders 540, 544, and 546 in the inverse predictive processing unit 58 of FIG. 25 support vector instructions. In this case, the number of operation steps is equal to four plus the number of pixels to be processed.

The use of the neighboring pixel series-generating unit 52 of FIG. 24 instead of the neighboring pixel series-generating unit 52 of FIG. 23 involves nine steps to store the neighboring pixel data {A, B, C, D, E, F, G, H, and I} using the neighboring pixel series storage units 528, 529, and 570.

Similar to the use of the neighboring pixel series-generating unit 52 of FIG. 23, nine steps are required to read out the neighboring pixel data {A, B, C, D, E, F, G, H, and I} from the neighboring pixel series-generating unit 52 of FIG. 24. The inverse predictive processing using the inverse predictive processing unit 58 of FIG. 25 requires twenty steps.

As a result, the use of the neighboring pixel series-generating unit 52 of FIG. 24 instead of the neighboring pixel series-generating unit 52 of FIG. 23 also results in a total of thirty-eight operation steps for the B-mode inverse predictive processing using the inverse prediction unit 8 of FIG. 14 when the inverse predictive processing unit 58 of FIG. 25 is employed.

Meanwhile, similar to B-mode predictive processing using the prior art prediction apparatus, B-mode inverse predictive processing using a prior art inverse prediction unit requires a total of seventy-one steps.

As evidenced by the above, the present embodiment provides a substantially reduced number of operation steps for the B-mode inverse predictive processing, and thus provides a high level of processing performance.

Another discussion is now made as to the number of operation steps for the inverse predictive processing using the inverse predictive processing unit 58 of FIG. 26, which includes the single quadruple-input adder.

The readout of the neighboring pixel data {A, B, C, D, E, F, G, H, and I} from the inverse candidate prediction block storage unit 51 of FIG. 23 involves nine steps.

Nine steps are required to store the neighboring pixel data {"A, B, C, D, E, F, G, H, and I} using the neighboring pixel storage unit 520 of FIG. 23.

Eighteen steps are required to practice the inverse predictive processing using the inverse predictive processing unit 58 of FIG. 26.

As a result, the B-mode inverse predictive processing using the inverse prediction unit 8 of FIG. 14 involves a total of thirty-six operation steps when the inverse predictive processing unit 58 of FIG. 26 is employed.

When the single quadruple-input adder 551 is used as practiced in the inverse predictive processing unit 58 of FIG. 26, then the number of operation steps results in two plus the number of pixels to be processed.

The use of the neighboring pixel series-generating unit 52 of FIG. 24 instead of the neighboring pixel series-generating unit 52 of FIG. 23 also results in a total of thirty-six operation steps for the B-mode inverse predictive processing using the inverse prediction unit 8 of FIG. 14 when the inverse predictive processing unit 58 of FIG. 26 is employed.

As seen from the above, in the three-stage addition processing using the inverse predictive processing unit 58, the use of the single quadruple-input adder (FIG. 26) eliminates two registers (the registers 541, 545 of FIG. 25), when compared with use of the three double-input adders (FIG. 25). This feature reduces the total number of operation steps by two steps, and thus provides a higher level of processing performance.

As discussed above, in the inverse prediction unit 8 according to the present embodiment, the neighboring pixel series-generating unit 52 in receipt of the neighboring pixel data {A, B, C, D, E, F, G, H, and I} selects the data therefrom in the order in which these data {A, B, C, D, E, F, G, H, and I} are arithmetically operated. At this time, such a data selection is made for each of the series (the first, second, and third series) that respectively correspond to algebraic vales "X", "Y", "Z" included in the predetermined algebraic expression ((4R+X+2Y+Z)/4). The neighboring pixel series-generating unit 52 feeds the selected data for each of the series in the order in which the neighboring pixel data {A, B, C, D, E, F, G, H, and I} are arithmetically operated.

More specifically, the neighboring pixel series-generating unit 52 generates the first, second, and third neighboring pixel series, and then feeds them into the inverse predictive processing unit 58.

The inverse predictive processing unit 58 receives the inverse candidate prediction pixel data in the order in which these data are arithmetically operated. The inverse predictive processing unit 58 also receives the neighboring pixel data that are fed from the neighboring pixel series-generating unit 52 for each of the series in the order in which the neighboring pixel data are arithmetically operated. The inverse predictive processing unit 58 arithmetically operates the received inverse candidate prediction pixel data and the received neighboring pixel data together.

More specifically, the inverse predictive processing unit 58 receives the inverse candidate prediction pixel data in the order in which these data are arithmetically operated, and further receives the first, second, and third neighboring pixel series. As a result, the received inverse candidate prediction pixel data and the received the first, second, and third neighboring pixel series are arithmetically operated together in the inverse predictive processing unit 58.

As seen from the above, the inverse prediction unit 8 according to the present embodiment generates the first, second, and third neighboring pixel series, thereby practicing the inverse predictive processing.

As a result, steps of storing and generating inverse predictive pixel data as practiced by the prior art inverse prediction apparatus are eliminated. This feature provides the prediction unit 8 (prediction apparatus) that requires fewer operation steps and thus that provides an increased level of processing performance.

The decoding apparatus of FIG. 14 that incorporates the inverse prediction unit 8 therein realizes enhanced processing performance.

In the present embodiment, the inverse candidate prediction block storage unit 51 of FIG. 22 is described as a memory, but alternatively may be a gang of registers.

Such an alternative eliminates the switching unit 525 of FIG. 24, and connects the input line for the neighboring pixel data "A", read out from the gang of registers, to the line "AL". Similarly, the input lines for the neighboring pixel data "B", "C", "D", "E", "F", "G", "H", and "I" are connected to the lines "BL", "CL", "DL", "EL", "FL", "GL", "HL", and "IL", respectively.

In the present embodiment, the neighboring pixel storage unit 520 of FIG. 23 is described as a gang of registers, but alternatively may be a memory that outputs the stored data according to the address signals.

In such an alternative, the switching unit 522 follows a gang of registers in order to permit the gang of registers to retain the neighboring pixel data that are read out from the memory. The gang of registers feeds the retained neighboring pixel data into the switching unit 522.

In the present embodiment, the inverse candidate prediction block storage unit 51 stores the five-by-five pixel area to practice the inverse predictive processing. Alternatively, the inverse candidate prediction block storage unit 51 may store a seventeen-by-seventeen pixel area to practice the inverse predictive processing in order to process a sixteen-by-sixteen pixel area. A moving picture is encoded for each of the sixteen-by-sixteen pixel areas. As a result, this alternative provides similar beneficial effects.

The inverse predictive processing unit 53 of FIG. 15 is used. The first and second neighboring pixel series as described in the third embodiment are produced using the neighboring pixel series-generating unit 52 of FIG. 21. The produced first and second neighboring pixel series are entered into the inverse predictive processing unit 53 of FIG. 15. As a result, the A-mode inverse predictive processing according to the H.26L-coding system is executable.

In the present embodiment, the expression $((4R+X+2Y+Z)/4)$ is illustrated as a predetermined algebraic expression. This expression is exemplified as being suitable for inverse predictive processing matched to the B-mode predictive processing that would possibly be incorporated by the H.26L-coding system.

Accordingly, the predetermined algebraic expression can be set to meet the inverse predictive processing matched to the predictive processing that is decided on being incorporated by the H.26L-encloding system.

The predetermined algebraic expression is not limited to meeting the inverse predictive processing matched to the predictive processing according to the H.26L-coding system.

Accordingly, any algebraic expression may be set as a predetermined algebraic expression. As a result, a series that corresponds to each algebra included in the algebraic expression can be set.

For example, a predetermined algebraic expression can be set to meet inverse predictive processing matched to predictive processing that is incorporated by another coding system.

In the predetermined algebraic expression $((4R+X+2Y+Z)/4)$ as an illustration, the multiplier 4 for multiplying "R" is an example of a predetermined first multiplier. The multiplier 2 for multiplying "Y" is an example of a predetermined second multiplier. The divisor 4 is an example of a predetermined divisor.

The prediction unit 1 according to the first and second embodiments and the inverse prediction unit 8 according to the third and fourth embodiments may be considered as computing apparatuses.

In this instance, the neighboring pixel series-generating units 13, 52 are comparable to series data-generating units. The predictive processing units 14, 16 and the inverse predictive processing units 53, 58 are all comparable to computing units.

The computing unit performs arithmetic operation in accordance with a predetermined algebraic expression. The series data-generating unit enters data into the computing unit for each series that corresponds to an algebra included in the predetermined algebraic expression.

More specifically, the series data-generating unit selects data from an entered first plurality of data for each of the series in the order in which the first plurality of data is arithmetically operated. The series data-generating unit feeds the selected data into the computing unit for each of the series in the order in which the first plurality of data is arithmetically operated.

The computing unit arithmetically operates together the first plurality of data fed from the series data-generating unit in the order in which the first plurality of data is arithmetically operated, and a second plurality of data that is entered into the computing unit in the order in which the second plurality of data is arithmetically operated.

As just described above, the data selected from the first plurality of data in the order in which the first plurality of data is arithmetically operated are entered into the computing unit for each of the series in the order in which the first plurality of data is arithmetically operated.

This feature provides a computing apparatus that requires fewer operation steps and thus that attains a high level of processing performance.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A prediction apparatus comprising:
   a plurality of candidate prediction pixel data;
   a plurality of neighboring pixel data adjacent to a candidate prediction block that includes the plurality of candidate prediction pixel data, in which said prediction apparatus performs predictive processing based on the plurality of candidate prediction pixel data and the plurality of neighboring pixel data in accordance with a predetermined algebraic expression;
   a neighboring pixel series-generating unit operable to, upon receipt of the plurality of neighboring pixel data, select the data from the plurality of neighboring pixel data in the order in which the plurality of neighboring pixel data is arithmetically operated in the predictive processing, such data selection being made for each series that corresponds to an algebra included in the predetermined algebraic expression;
   said neighboring pixel series-generating unit operable to output the selected data for each of said series in the order in which the plurality of neighboring pixel data is arithmetically operated in the predictive processing; and
   a predictive processing unit operable to practice the predictive processing based on the plurality of candidate prediction pixel data received by said predictive processing unit in the order in which the plurality of candidate prediction pixel data is arithmetically operated in the predictive processing and the selected data received by said predictive processing unit from said neighboring pixel series-generating unit for each of said series in the order in which the plurality of neighboring pixel data is arithmetically operated in the predictive processing.

2. A prediction apparatus as defined in claim 1, wherein said neighboring pixel series-generating unit includes a neighboring pixel storage unit and a neighboring pixel-selecting unit, in which said neighboring pixel storage unit is operable to store the plurality of neighboring pixel data upon receipt of the plurality of neighboring pixel data, and said neighboring pixel-selecting unit is operable to select the data from the plurality of neighboring pixel data that are parallel-fed from said neighboring pixel storage unit, such data selection being made for each of said series in the order in which the plurality of neighboring pixel data is arithmetically operated in the predictive processing, said neighboring pixel-selecting unit being operable to feed the selected data into each series-related line in the order in which the plurality of neighboring pixel data is arithmetically operated in the predictive processing,
   and wherein said predictive processing unit is operable to receive the selected data from said neighboring pixel-selecting unit through each of said series-related lines.

3. A prediction apparatus as defined in claim 1, wherein said neighboring pixel series-generating unit includes a neighboring pixel-selecting unit operable to feed each of the neighboring pixel data into a neighboring pixel data-related line and a neighboring pixel series storage unit provided for each of said series, in which each of said neighboring pixel series storage units, in receipt of the plurality of neighboring pixel data through said neighboring pixel data-related lines, is operable to store the plurality of neighboring pixel data as corresponding series-related data at predetermined storage positions, said neighboring pixel data-related lines being wired to said predetermined storage positions in the order in which the plurality of neighboring pixel data is arithmetically operated in the predictive processing, and each of said neighboring pixel series storage units is operable to feed the stored plurality of neighboring pixel data into a corresponding series-related line in the order in which the plurality of neighboring pixel data is arithmetically operated in the predictive processing,
   and wherein said predictive processing unit is operable to receive the stored plurality of neighboring pixel data from said neighboring pixel series storage units through said series-related lines.

4. A prediction apparatus as defined in claim 1, wherein said series includes first and second series,
   and wherein said predictive processing unit includes a multiplying unit, first and second subtracting units, and a dividing unit, in which said multiplying unit, in receipt of the candidate prediction pixel data, is operable to multiply the candidate prediction pixel data by a predetermined multiplier, thereby providing multiplied data that is then sent to said first subtracting unit, said first subtracting unit is operable to subtract first series-related neighboring pixel data from the multiplied data, thereby providing first subtracted data that is then sent to said second subtracting unit, said second subtracting unit is operable to subtract second series-related neighboring pixel data from the first subtracted data, thereby providing second subtracted data that is then sent to said dividing unit, and said dividing unit is operable to divide the second subtracted data by a predetermined divisor, the first and second series-related neighboring pixel data being the neighboring pixel data that are related to said first and second series, respectively, and that are entered from said neighboring pixel series-generating unit into said predictive processing unit.

5. A prediction apparatus as defined in claim 1, wherein said series includes first and second series,
   and wherein said predictive processing unit includes a multiplying unit, a subtracting unit, and a dividing unit, in which said multiplying unit, in receipt of the candidate prediction pixel data, is operable to multiply the candidate prediction pixel data by a predetermined multiplier, thereby providing multiplied data that is then sent to said subtracting unit, said subtracting unit is operable to subtract first series-related neighboring pixel data from the multiplied data, thereby providing subtracted data, said subtracting unit is operable to subtract second series-related neighboring pixel data from the subtracted data, thereby providing ultimately subtracted data that is then sent to said dividing unit, and said dividing unit is operable to divide the ultimately subtracted data by a predetermined divisor, the first and second series-related neighboring pixel data being the neighboring pixel data that are related to said first and second series, respectively, and that are entered from said neighboring pixel series-generating unit into said predictive processing unit.

6. A prediction apparatus as defined in claim 1, wherein said series includes first, second, and third series, and wherein said predictive processing unit includes first and second multiplying units, first, second, and third subtracting units, and a dividing unit, in which said first multiplying unit, in receipt of the candidate prediction pixel data, is operable to multiply the candidate prediction pixel data by a predetermined first multiplier, thereby providing first multiplied data that is then sent to said first subtracting unit, said first subtracting unit is operable to subtract first series-related neighboring pixel data from the first multiplied data, thereby providing first subtracted data that is then sent to said second subtracting unit, said second multiplying unit is operable to multiply second series-related neighboring pixel data by a predetermined second multiplier, thereby providing second multiplied data that is then sent to said second subtracting unit, said second subtracting unit is operable to subtract the second multiplied data from the first subtracted data, thereby providing second subtracted data that is then sent to said third subtracting unit, said third subtracting unit is operable to subtract third series-related neighboring pixel data from the second subtracted data, thereby providing third subtracted data that is then sent to said dividing unit, and said dividing unit is operable to divide the third subtracted data by a predetermined divisor, the first, second, and third series-related neighboring pixel data being the neighboring pixel data that are related to said first, second, and third series, respectively, and that are entered from said neighboring pixel series-generating unit into said predictive processing unit.

7. A prediction apparatus as defined in claim 1, wherein said series includes first, second, and third series, and wherein said predictive processing unit includes first and second multiplying units, a subtracting unit, and a dividing unit, in which said first multiplying unit, in receipt of the candidate prediction pixel data, is operable to multiply the candidate prediction pixel data by a predetermined first multiplier, thereby providing first multiplied data that is then sent to said subtracting unit, said second multiplying unit is operable to multiply second series-related neighboring pixel data by a predetermined second multiplier, thereby providing second multiplied data that is then sent to said subtracting unit, said subtracting unit is operable to subtract first series-related neighboring pixel data from the first multiplied data, thereby providing subtracted data, said subtracting unit is operable to subtract the second multiplied data from the subtracted data, thereby providing further subtracted data, said subtracting unit is operable to subtract third series-related neighboring pixel data from the further subtracted data, thereby providing ultimately subtracted data that is then sent to said dividing unit, and said dividing unit is operable to divide the ultimately subtracted data by a predetermined divisor, the first, second, and third series-related neighboring pixel data being the neighboring pixel data that are related to said first, second, and third series, respectively, and that are entered from said neighboring pixel series-generating unit into said predictive processing unit.

8. An encoding apparatus comprising:
a plurality of candidate prediction pixel data;
a plurality of neighboring pixel data adjacent to a candidate prediction block that includes the plurality of candidate prediction pixel data;
a prediction unit operable to practice predictive processing based on the plurality of candidate prediction pixel data and the plurality of neighboring pixel data in accordance with a predetermined algebraic expression, thereby providing predicted pixel data;
an orthogonal transform unit operable to orthogonally transform the predicted pixel data from said prediction unit, thereby providing orthogonally transformed data;
a quantizing unit operable to quantize the orthogonally transformed data from said orthogonal transform unit, thereby providing quantized data; and
a variable length-encoding unit operable to variable length encode the quantized data from said quantizing unit,
wherein said prediction unit includes:
a neighboring pixel series-generating unit operable to, upon receipt of the plurality of neighboring pixel data, select the data from the plurality of neighboring pixel data in the order in which the plurality of neighboring pixel data is arithmetically operated in the predictive processing, such data selection being made for each series that corresponds to an algebra included in the predetermined algebraic expression;
said neighboring pixel series-generating unit operable to output the selected data for each of said series in the order in which the plurality of neighboring pixel data is arithmetically operated in the predictive processing; and
a predictive processing unit operable to practice the predictive processing based on the plurality of candidate prediction pixel data received by said predictive processing unit in the order in which the plurality of candidate prediction pixel data is arithmetically operated in the predictive processing and the selected data received by said predictive processing unit from said neighboring pixel series-generating unit for each of said series in the order in which the plurality of neighboring pixel data is arithmetically operated in the predictive processing.

9. An inverse prediction apparatus comprising:
a plurality of inverse candidate prediction pixel data;
a plurality of neighboring pixel data adjacent to an inverse candidate prediction block that includes the plurality of inverse candidate prediction pixel data, in which said inverse prediction apparatus performs inverse predictive processing based on the plurality of inverse candidate prediction pixel data and the plurality of neighboring pixel data in accordance with a predetermined algebraic expression;
a neighboring pixel series-generating unit operable to, upon receipt of the plurality of neighboring pixel data, select the data from the plurality of neighboring pixel data in the order in which the plurality of neighboring pixel data is arithmetically operated in the inverse predictive processing, such data selection being made for each series that corresponds to an algebra included in the predetermined algebraic expression;
said neighboring pixel series-generating unit operable to output the selected data for each of said series in the order in which the plurality of neighboring pixel data is arithmetically operated in the inverse predictive processing; and
an inverse predictive processing unit operable to practice the inverse predictive processing based on the plurality of inverse candidate prediction pixel data received by said inverse predictive processing unit in the order in which the plurality of inverse candidate prediction pixel data is arithmetically operated in the inverse predictive processing and the selected data received by said inverse predictive processing unit from said neighboring pixel series-generating unit for each of said series in the order in which the plurality of neighboring pixel data is arithmetically operated in the inverse predictive processing.

10. An inverse prediction apparatus as defined in claim 9, wherein said neighboring pixel series-generating unit includes a neighboring pixel storage unit and a neighboring pixel-selecting unit, in which said neighboring pixel storage unit is operable to store the plurality of neighboring pixel data upon receipt of the plurality of neighboring pixel data, and said neighboring pixel-selecting unit is operable to select the data from the plurality of neighboring pixel data that is parallel-fed from said neighboring pixel storage unit, such data selection being made for each of said series in the order in which the plurality of neighboring pixel data is arithmetically operated in the inverse predictive processing, said neighboring pixel-selecting unit being operable to feed the selected data into each series-related line in the order in which the plurality of neighboring pixel data is arithmetically operated in the inverse predictive processing, and wherein said inverse predictive processing unit is operable to receive the selected data from said neighboring pixel-selecting unit through each of said series-related lines.

11. An inverse prediction apparatus as defined in claim 9, wherein said neighboring pixel series-generating unit includes a neighboring pixel-selecting unit operable to feed each of the neighboring pixel data into a neighboring pixel data-related line, and a neighboring pixel series storage unit disposed for each of said series, in which each of said neighboring pixel series storage units, in receipt of the plurality of neighboring pixel data through said neighboring pixel data-related lines, is operable to store the neighboring pixel data as corresponding series-related data at predetermined storage positions, said neighboring pixel data-related lines being wired to said predetermined storage positions in the order in which the plurality of neighboring pixel data is arithmetically operated in the inverse predictive processing, and each of said neighboring pixel series storage units is operable to feed the stored plurality of neighboring pixel data into a corresponding series-related line in the order in which the plurality of neighboring pixel data is arithmetically operated in the inverse predictive processing, and wherein said inverse predictive processing unit is operable to receive the stored plurality of neighboring pixel data from said neighboring pixel series storage units through said series-related lines.

12. An inverse prediction apparatus as defined in claim 9, wherein said series includes first and second series, and wherein said inverse predictive processing unit includes a multiplying unit, first and second adding units, and a dividing unit, in which said multiplying unit, in receipt of the inverse candidate prediction pixel data, is operable to multiply the inverse candidate prediction pixel data by a predetermined multiplier, thereby providing multiplied data that is then sent to said first adding unit, said first adding unit is operable to add the multiplied data to first series-related neighboring pixel data, thereby providing first added data that is then sent to said second adding unit, said second adding unit is operable to add the first added data to second series-related neighboring pixel data, thereby providing second added data that is then sent to said dividing unit, and said dividing unit is operable to divide the second added data by a predetermined divisor, the first and second series-related neighboring pixel data being the neighboring pixel data that are related to said first and second series, respectively, and that are entered from said neighboring pixel series-generating unit into said inverse predictive processing unit.

13. An inverse prediction apparatus as defined in claim 9, wherein said series includes first and second series, and wherein said inverse predictive processing unit includes a multiplying unit, an adding unit, and a dividing unit, in which said multiplying unit, in receipt of the inverse candidate prediction pixel data, is operable to multiply the inverse candidate prediction pixel data by a predetermined multiplier, thereby providing multiplied data that is then sent to said adding unit, said adding unit is operable to add the multiplied data to first series-related neighboring pixel data, thereby providing added data, said adding unit is operable to add the added data to second series-related neighboring pixel data, thereby providing ultimately added data that is then sent to said dividing unit, and said dividing unit is operable to divide the ultimately added data by a predetermined divisor, the first and second series-related neighboring pixel data being the neighboring pixel data that are related to said first and second series, respectively, and that are entered from said neighboring pixel series-generating unit into said inverse predictive processing unit.

14. An inverse prediction apparatus as defined in claim 9, wherein said series includes first, second, and third series, and wherein said inverse predictive processing unit includes first and second multiplying units, first, second, and third adding units, and a dividing unit, in which said first multiplying unit, in receipt of the inverse candidate prediction pixel data, is operable to multiply the inverse candidate prediction pixel data by a predetermined first multiplier, thereby providing first multiplied data that is then sent to said first adding unit, said first adding unit is operable to add the first multiplied data to first series-related neighboring pixel data, thereby providing first added data that is then sent to said second adding unit, said second multiplying unit is operable to multiply second series-related neighboring pixel data by a predetermined second multiplier, thereby providing second multiplied data that is then sent to said second adding unit, said second adding unit is operable to add the second multiplied data and the first added data together, thereby providing second added data that is then sent to said third adding unit, said third adding unit is operable to add the second added data to third series-related neighboring pixel data, thereby providing third added data that is then sent to said dividing unit, and said dividing unit is operable to divide the third added data by a predetermined divisor, the first, second, and third series-related neighboring pixel data being the neighboring pixel data that are related to said first, second, and third series, respectively, and that are entered from said neighboring pixel series-generating unit into said inverse predictive processing unit.

15. An inverse prediction apparatus as defined in claim 9, wherein said series includes first, second, and third series, and wherein said inverse predictive processing unit includes first and second multiplying units, an adding unit, and a dividing unit, in which said first multiplying unit, in receipt of the inverse candidate prediction pixel data, is operable to multiply the inverse candidate prediction pixel data by a predetermined first multiplier, thereby providing first multiplied data that is then sent to said adding unit, said second multiplying unit is operable to multiply second series-related neighboring pixel data by a predetermined second multiplier, thereby providing second multiplied data that is then sent to said adding unit, said adding unit is operable to add the first multiplied data to first series-related neighboring pixel data, thereby providing added data, said adding unit is operable to add the added data and the second multiplied data together, thereby providing further added data, said adding unit is operable to add the further added data to third series-related neighboring pixel data, thereby providing ultimately added data that is then sent to said dividing unit, and said dividing unit is operable to divide the ultimately added data by a predetermined divisor, the first, second, and third series-related neighboring pixel data being the neighboring pixel data that are related to said first, second, and third series, respectively, and that are entered from said neighboring pixel series-generating unit into said inverse predictive processing unit.

16. A decoding apparatus comprising:

a plurality of inverse candidate prediction pixel data;

a plurality of neighboring pixel data adjacent to an inverse candidate prediction block that includes the plurality of inverse candidate prediction pixel data, in which said decoding apparatus performs inverse predictive processing based on the plurality of inverse candidate prediction pixel data and the plurality of neighboring pixel data in accordance with a predetermined algebraic expression in order to decode encoded data;

a variable length-decoding unit operable to variable length decode the encoded data, thereby providing decoded data;

an inverse quantizing unit operable to inversely quantize the decoded data, thereby providing inversely quantized data;

an inverse orthogonal transform unit operable to inversely orthogonally transform the inversely quantized data, thereby providing inversely orthogonally transformed data; and an inverse prediction unit operable to practice inverse predictive processing of the inverse candidate prediction pixel data that is the inversely orthogonally transformed data, wherein said inverse prediction unit includes:

a neighboring pixel series-generating unit operable to, upon receipt of the plurality of neighboring pixel data, select the data from the plurality of neighboring pixel data in the order in which the plurality of neighboring pixel data is arithmetically operated in inverse predictive processing, such data selection being made for each series that corresponds to an algebra included in the predetermined algebraic expression;

said neighboring pixel series-generating unit operable to output the selected data for each of said series in the order in which the plurality of neighboring pixel data is arithmetically operated in the inverse predictive processing; and an inverse predictive processing unit operable to practice the inverse predictive processing based on the plurality of inverse candidate prediction pixel data received by said inverse predictive processing unit in the order in which the plurality of inverse candidate prediction pixel data is arithmetically operated in the inverse predictive processing and the selected data received by said inverse predictive processing unit from said neighboring pixel series-generating unit for each of said series in the order in which the plurality of neighboring pixel data is arithmetically operated to experience the inverse predictive processing.

17. A computing apparatus comprising:

a computing unit operable to perform arithmetical operation in accordance with a predetermined algebraic expression; and a series data-generating unit operable to feed data into said computing unit for each series that corresponds to an algebra included in the predetermined algebraic expression, wherein said series data-generating unit, in receipt of a plurality of first data, is operable to select the data from the plurality of first data for each of said series in the order in which the plurality of first data is arithmetically operated, and said series data-generating unit is operable to feed the selected data into said computing unit for each of said series in the order in which the plurality of first data is arithmetically operated, and wherein said computing unit is operable to arithmetically operate together a plurality of second data received by said computing unit in the order in which the plurality of second data is arithmetically operated and the selected data received by said computing unit from said series data-generating unit in the order in which the plurality of first data is arithmetically operated.

* * * * *